United States Patent
Tabibian et al.

(10) Patent No.: US 11,468,007 B1
(45) Date of Patent: Oct. 11, 2022

(54) PREDICTIVE REVISION RECOMMENDATIONS

(71) Applicant: Reasonal, Inc., Rockville, MD (US)

(72) Inventors: Behzad Tabibian, Menlo Park, CA (US); Utkarsh Upadhyay, Berlin (DE); Raffi Enficiaud, Berlin (DE)

(73) Assignee: Reasonal, Inc., Rockville, MD (US)

(*) Notice: Subject to any disclaimer, the term of this patent is extended or adjusted under 35 U.S.C. 154(b) by 0 days.

(21) Appl. No.: 17/485,230

(22) Filed: Sep. 24, 2021

(51) Int. Cl.
*G06F 16/14* (2019.01)
*G06F 16/176* (2019.01)
*G06F 16/16* (2019.01)
*G06F 16/17* (2019.01)

(52) U.S. Cl.
CPC .......... *G06F 16/152* (2019.01); *G06F 16/168* (2019.01); *G06F 16/176* (2019.01); *G06F 16/1734* (2019.01)

(58) Field of Classification Search
CPC .... G06F 16/152; G06F 16/176; G06F 16/169; G06F 16/1734; G06F 21/6245; G06F 11/008; G06F 21/31; G06F 21/552; G06F 21/554
See application file for complete search history.

(56) References Cited

U.S. PATENT DOCUMENTS

| | | | |
|---|---|---|---|
| 11,145,017 B1* | 10/2021 | Wu | G06Q 50/16 |
| 2018/0143975 A1* | 5/2018 | Casal | G06F 40/58 |
| 2019/0303139 A1* | 10/2019 | Pechacek | G06F 8/36 |
| 2019/0303158 A1* | 10/2019 | Brar | G06F 8/658 |
| 2021/0099317 A1* | 4/2021 | Hilleli | G06N 3/0454 |

OTHER PUBLICATIONS

Calzarossa et al., Modeling and Predicting Temporal Patterns of Web Content Changes, Journal of Network and Computer Applications 56, 2015, pp. 115-123.
Radinsky et al., Predicting Content Change on the Web, Proceedings of the sixth ACM international conference on Web search and data mining, Feb. 2013, pp. 415-424.

* cited by examiner

*Primary Examiner* — Angelica Ruiz
(74) *Attorney, Agent, or Firm* — Van Pelt, Yi & James LLP

(57) ABSTRACT

Predictive revision recommendations are disclosed. A first tokenized file is received, as is a second tokenized file. An indication is received that a modification has been made to the first tokenized file. A determination that a token in the first tokenized file has an association with a token in the second tokenized file is made. Based at least in part on the received indication, a recommended action that should be taken with respect to the second tokenized file is generated. A change to at least one related token is predicted based on a past history of correlated events occurring to the first token and related tokens.

33 Claims, 35 Drawing Sheets

Contract - Reasonal Draft 1

File Edit View Insert Format Tools Add-ons Help  Last edit was 4 minutes ago

Software development, programming, debugging, or customization except as expressly specified in this Service Agreement;
Cost to bring Customer's environment up to minimum standards required by Seller;
Training and coaching;
Planning, project management, research, and advisory consulting services;
Shipping (including any staff transportation)

Pricing: In consideration for the Services contemplated by this Service Agreement, Customer shall pay Seller as follows:

Fees:
Silver Package - $2856 Per annum
Gold Package - $3293 Per annum

Package charges will be processed on the anniversary date of agreement unless client cancels services within 30 days of said date.

Hourly Rates for Services Not Covered by Fixed Fee: $1010 First hour, $6088 for each additional hour.

Payment Terms and Schedule: Visa, MasterCard, American Express, check

Reimbursement of Expenses:

Client will reimburse IPS for any shipping expenses related to replacement of warrantied parts on their existing Gaia Power Tower systems Client will reimburse IPS at .55 cents per mile for an

Changes | Linked Files

Incoming | Outgoing | Merged

Contract - Reasonal draft-2 specifications, [addenda, written amendments, and the like. in good order and annotated to show. all changes made during construction] which will be delivered to Owner upon Ⓐ By Adam - 4 hours ago
✓  ✗

⊞ Contract Numbers
Silver Package
$3056 Per Annum

Ⓓ By David - 12 hours ago
✓  ✗

⊞ Contract Numbers
Gold Package
$3496 Per Annum

Ⓓ By David - 12 hours ago
✓  ✗

FIG. 9

Contract - Reasonal Draft 1

File Edit View Insert Format Tools Add-ons Help  Last edit was 4 minutes ago

Software development, programming, debugging, or customization except as expressly specified in this Service Agreement;
Cost to bring Customer's environment up to minimum standards required by Seller;
Training and coaching;
Planning, project management, research, and advisory consulting services;
Shipping (including any staff transportation)

Pricing: In consideration for the Services contemplated by this Service Agreement, Customer shall pay Seller as follows:

Fees:
Silver Package - $2856 Per annum
Gold Package - $3293 Per annum

Package charges will be processed on the anniversary date of agreement unless client cancels services within 30 days of said date.

Hourly Rates for Services Not Covered by Fixed Fee: $1010 First hour, $6088 for each additional hour.

Payment Terms and Schedule: Visa, MasterCard, American Express, check

Reimbursement of Expenses:

Client will reimburse IPS for any shipping expenses related to replacement of warrantied parts on their existing Gaia Power Tower systems Client will reimburse IPS at .55 cents per mile for an

Changes | Linked Files

[ Incoming | Outgoing | Merged ]

Contract - Reasonal draft-2
specifications, addenda, written amendments and the like; in good order and annotated to show all changes made during construction, which will be delivered to Owner upon Ⓐ By Adam - 4 hours ago ⊞ Contract Numbers
Silver Package
$3056 Per Annum Ⓓ By David - 12 hours ago ⊞ Contract Numbers
Gold Package
$3496 Per Annum Ⓓ By David - 12 hours ago

Citi Agreement
File Edit View Insert Format Tools Add-ons Help

Devices / Products Covered: Gaia PowerTower
The Following services, products and parts are not covered by this Service Agreement: Damage from flooding, lighting, fire, theft, vandalism, and other acts of God.
Excluded Services:
Customer understands and agrees that services required to recover from failures and/or incidents caused by any of the following circumstances are not considered normal maintenance and are not covered under this services Agreement:
- Service and repair made necessary due to accidents or acts of God, damage from fire, water, wind, earthquakes, lightning, terrorism, transporting equipment, vandalism, or burglary;
- Service and repair made necessary by the alteration or modification of equipment other than that authorized by Seller;
- Service and repair of damage or problems caused by neglect, malicious activity, or misuse including, without limitation, use of the system(s) for purpose other than which it was designed, by the Customer, its employees, or third party contractors;
- Service or repair due to electrical damage caused by electrical wiring at system location or resulting from electrical surges, sags, or spikes;
- Service and repair made necessary by bugs released by software vendors, e.g. adverse effects from installing updates or service packs;
- If in the reasonable opinion of Seller, as supported by its experience, any particular user's requests exceeds a normal and reasonable frequency, seller may advise the Customer that the user's requests are excluded until such time as the user has received additional training.

Excluded Third Party Costs:
Customer understands and agrees that the following third party costs are not covered by the fees set forth in this Service Agreement and shall be charged by Seller to Customer:
- Labor, parts, hardware and software not covered by warranties;
- Software licenses, subscription or upgrade fees;
- Manufacturer of vendor support fees, whether by annual contract or per incident;
- Shipping costs Shipping costs (including any staff transportation).

Reasonal
Today 10:39 AM
Replace: "Shipping costs" with "Shipping costs (including any staff transportation)"

ACME

ACME Systems Ltd
115 Wall Street,
Valhalla, NY 10595

| ACME Service Packages | | |
|---|---|---|
| Package | Services | Price |
| Silver | Includes an Annual General Diagnostic of Your Backup System to Include all Inverter Settings are Correct, Adjust as Needed, Voltage Test on Batteries, Perform Load Test on Inverters and Test System Overall Functionality. Cleaning of Unit Venting. Gold Package Includes Unlimited Telephone Support, Email Support and on Site Support (Metro Tri-state Area Only) | $[1489] Per Annum ── 1802 |
| Hourly Rate - First Hour | Service Support Call ── 1804 | $1097 for Each Additional Hours |
| Hourly Rate - Additional Hours | Service Support Call | $6089 First Hour |
| Gold | Silver Package with Unlimited Service Support Call | $3371 Per Annum |

FIG. 18A

ACME

ACME Systems Ltd
115 Wall Street,
Valhalla, NY 10595

Additional Projects:
Customer May Occasionally Require Additional or Amended Services Outside of the Terms of this Service Agreement (Collectively, "Additional Projects"). Seller Will Provide a Detailed Scope of Work and Labor Quote for Any Additional Project Required by Customer. Customer Will be Required to Execute a Change Order for Any Additional Project Before Any Work for Such Project is Performed and Understands that a Separate Invoice(s) Will be Generated for Such Work. Examples of Additional Projects include:

- Software Development, Programming, Debugging, or Customization Except as Expressly Specified in this Service Agreement;
- Cost to Bring Customer's Environment Up to Minimum Standards Required by Seller;
- Training and Coaching;
- Planning, Project Management, Research, and Advisory Consulting Services;
- Shipping (Including Any Staff Transportation)

1. Pricing: In Consideration for the Services Contemplated by this Service Agreement, Customer Shall Pay Seller as Follows: ── 1852

Fees:
Silver Package - $[1489] Per Annum
Gold Package - $3371 Per Annum

Package Charges Will be Processed on the Anniversary Date of Agreement Unless Client Cancels Services Within 30 Days if Said Date.
Hourly Rates for Services Not Covered by Fixed Fee: $1097 First Hour, $6089 for Each Additional Hour
Payment Terms and Schedule: Visa, Mastercard, American Express, Check

FIG. 18B

```
{
  "token": {
    "S": "ORG-UUID/1489"
  },
  "document_id": {
    "S": "DOCUMENT-ID-ON-CLOUD-STORAGE"
  },
  "document_prefix": {
    "S": "DOCUMENT-PATH-ON-REASONAL-STORAGE"
  },
  "token_instances": {
    "L": [
      {
        "M": {
          "created_revision": {
            "S": "DATETIME"
          },
          "created_start_index": {
            "N": "STARTING_INDEX"
          }
        }
      }
    ]
  }
}
```

FIG. 19

```
{
    "version": 1,
    "kind": "unique_token_activity",
    "org_uuid": "ORG-UUID",
    "file_id": "TARGET-DOCUMENT-ID-ON-CLOUD-STORAGE",
    "activity": {
        "action": "INITIATE/CANCEL",
        "action_id": "ACTION-UUID",
        "created_at": "DATETIME",
        "metadata": [
            {
                "kind": "text_diff",
                "file_id": "SOURCE-DOCUMENT-ID-ON-CLOUD-STORAGE",
                "changes": {
                    "additions": [
                        {
                            "content": "1489",
                            "location": LOCATION_IN_DOCUMENT,
                            "before": "Silver Package $",
                            "after": "Gold Package"
                        }
                    ],
                    "deletions": [
                        {
                            "content": "2489",
                            "location": LOCATION_IN_DOCUMENT,
                            "before": "Silver Package $",
                            "after": "Gold Package"
                        }
                    ]
                },
                "location_old": {
                    "revision_id": "REVISION_ID",
                    "start": LOCATION_IN_DOCUMENT
                },
                "location_new": {
                    "revision_id": "REVISION_ID",
                    "start": LOCATION_IN_DOCUMENT
                },
                "contents": [
                    {
                        "content_old": {
                            "kind": "text",
                            "text": "2489"
                        },
                        "content_new": {
                            "kind": "text",
                            "text": "1489"
                        }
                    }
                ]
            }
        ]
    }
}
```

PREDICTIVE REVISION RECOMMENDATIONS

BACKGROUND OF THE INVENTION

Organizations increasingly rely on a variety of disparate third party content creation and maintenance tools as part of their workflows. For example, in a given organization, a first vendor's tools might be used to generate/maintain one type of documents, while a second vendor's tools might be used to generate/maintain a different type of documents, and a third vendor's tools might be used to generate/maintain other content such as presentations. Unfortunately, it can be difficult for a given user of such tools to identify which service holds what content when that user attempts to perform a particular task. The situation is confounded when multiple users collaborate on shared content. Accordingly, there is an ongoing need to improve the efficiency with which users can interact with such tools.

BRIEF DESCRIPTION OF THE DRAWINGS

Various embodiments of the invention are disclosed in the following detailed description and the accompanying drawings.

FIGS. 1, 2, 3, 4A, 4B, 4C, 5A, 5B, 6A, 6B, 6C, 7, 8, 9, 10, 11, 12, 13, 14, 15, and 16 illustrate interfaces.

FIGS. 18A and 18B illustrate portions of documents.

FIG. 19 illustrates an example schema for storing tokens.

FIG. 21 illustrates sample JSON for representing an update notification.

FIGS. 25-35 illustrate interfaces.

DETAILED DESCRIPTION

Figure 1:
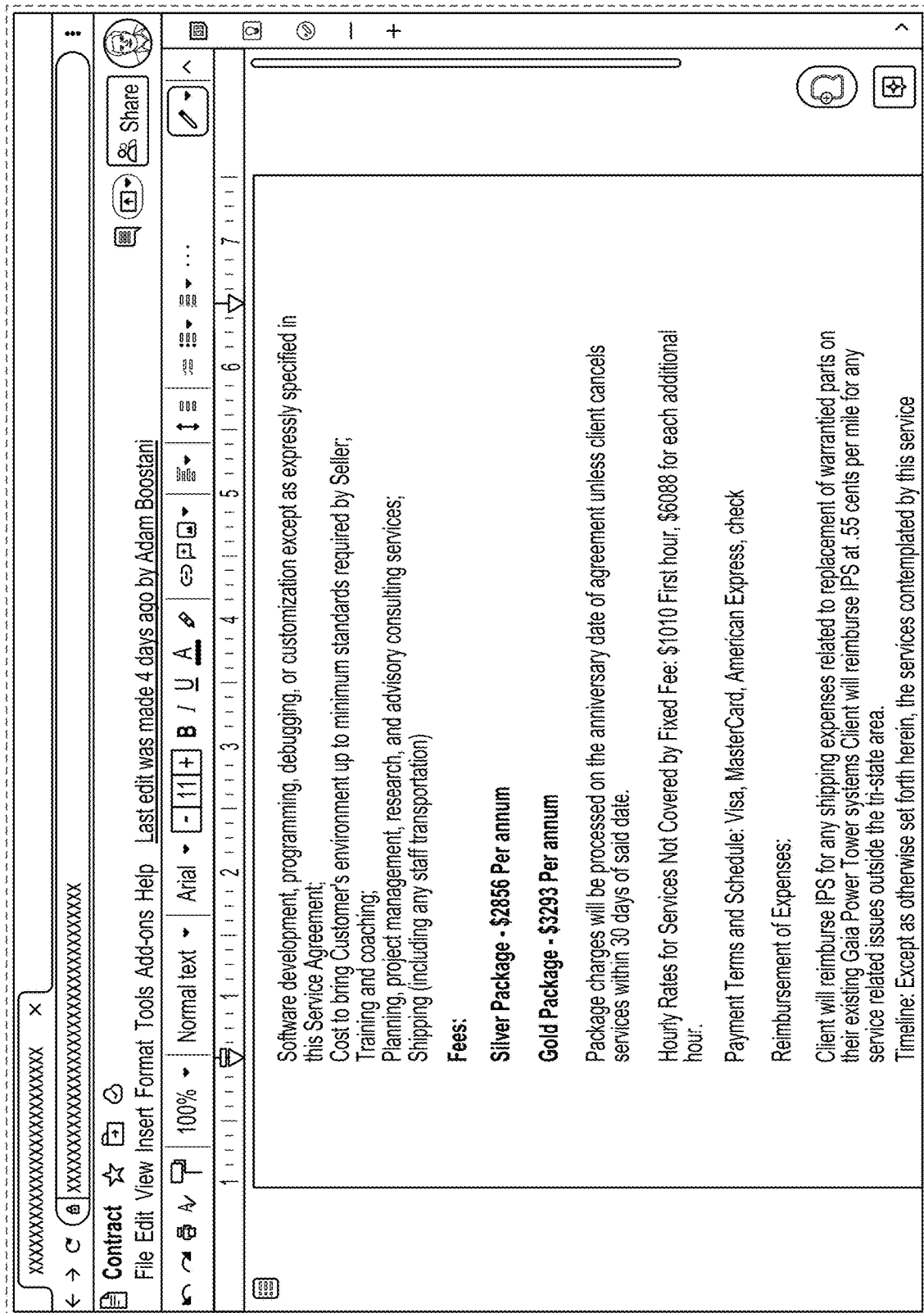

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Introduction

In the following discussion, suppose that a user ("Alice") is an employee of a business-to-business material supplies company ("ACME"). ACME currently uses a variety of third party content creation/collaboration tools (e.g., Google Drive, Slack, Sharepoint, etc.). Alice leads the sales team at ACME, and one task she is in charge of is keeping various proposals/contracts for ACME's services up to date. Suppose Alice currently is working on three different proposals for three different banks. Historically, if a change needs to be made (e.g., to a contract term), Alice must remember to make that change across (potentially) multiple places in multiple documents. As one example, suppose ACME maintains a price list of current prices for various offerings. Whenever changes are made to the price list, any pending contracts that include items on the price list need to be updated. If the shipping cost for a particular item was initially listed as $50 in various proposals, but instead should be listed as $75 (e.g., because the price list is updated), Alice would need to remember where that term appears in each applicable document and then make each change as applicable.

In an alternate approach, ACME (and Alice) could use the services of a predictive revision system. As described in more detail below, using techniques describe herein, the predictive revision system (e.g., predictive revision system 1702) can identify when Alice (and/or others with editor access) makes various changes (e.g., altering one or more terms in a first document) and recommend where other changes could be made (e.g., to other documents and/or to other content of other types).

A. Onboarding

Figure 2:
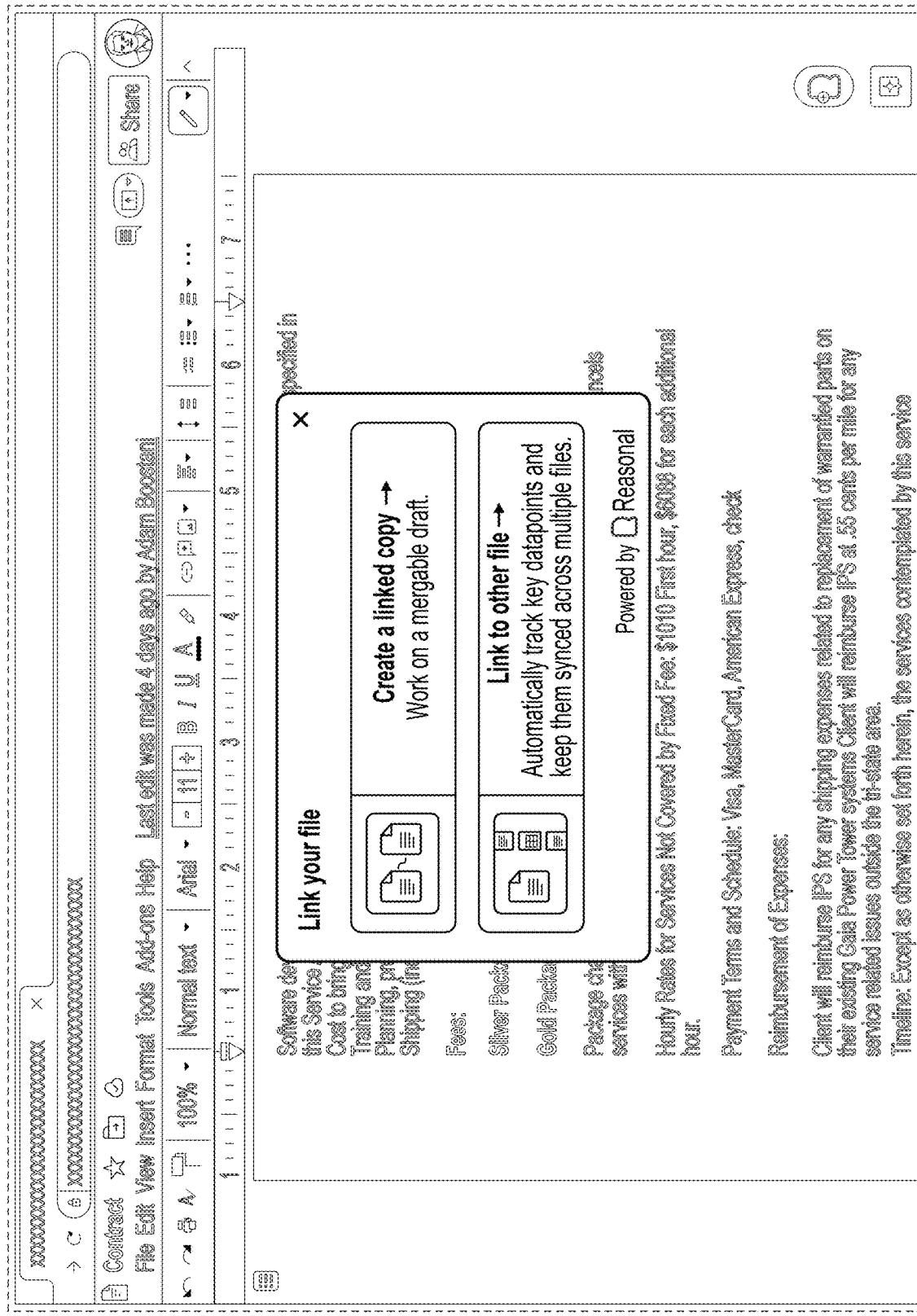
Figure 3:
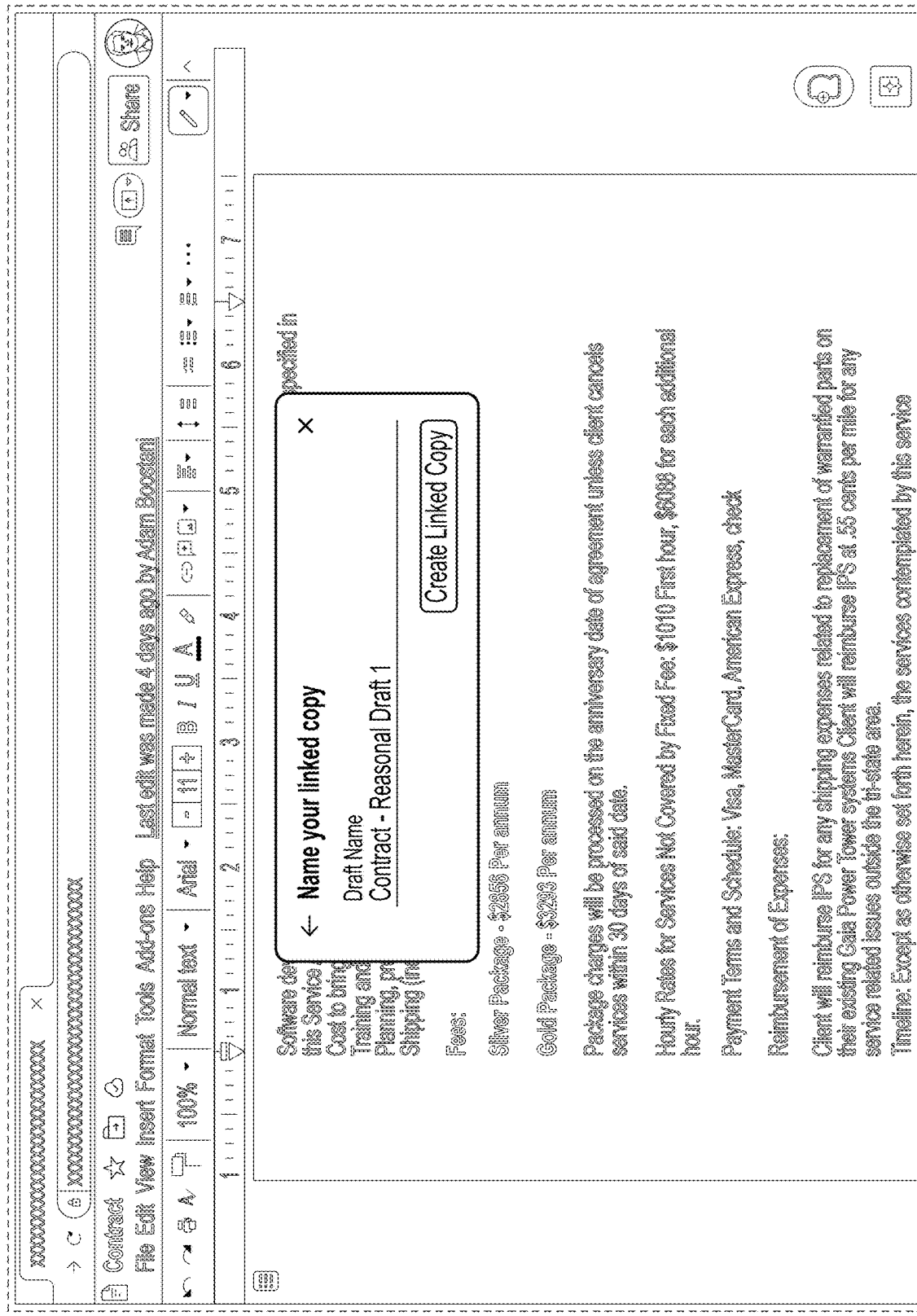
Figure 4:
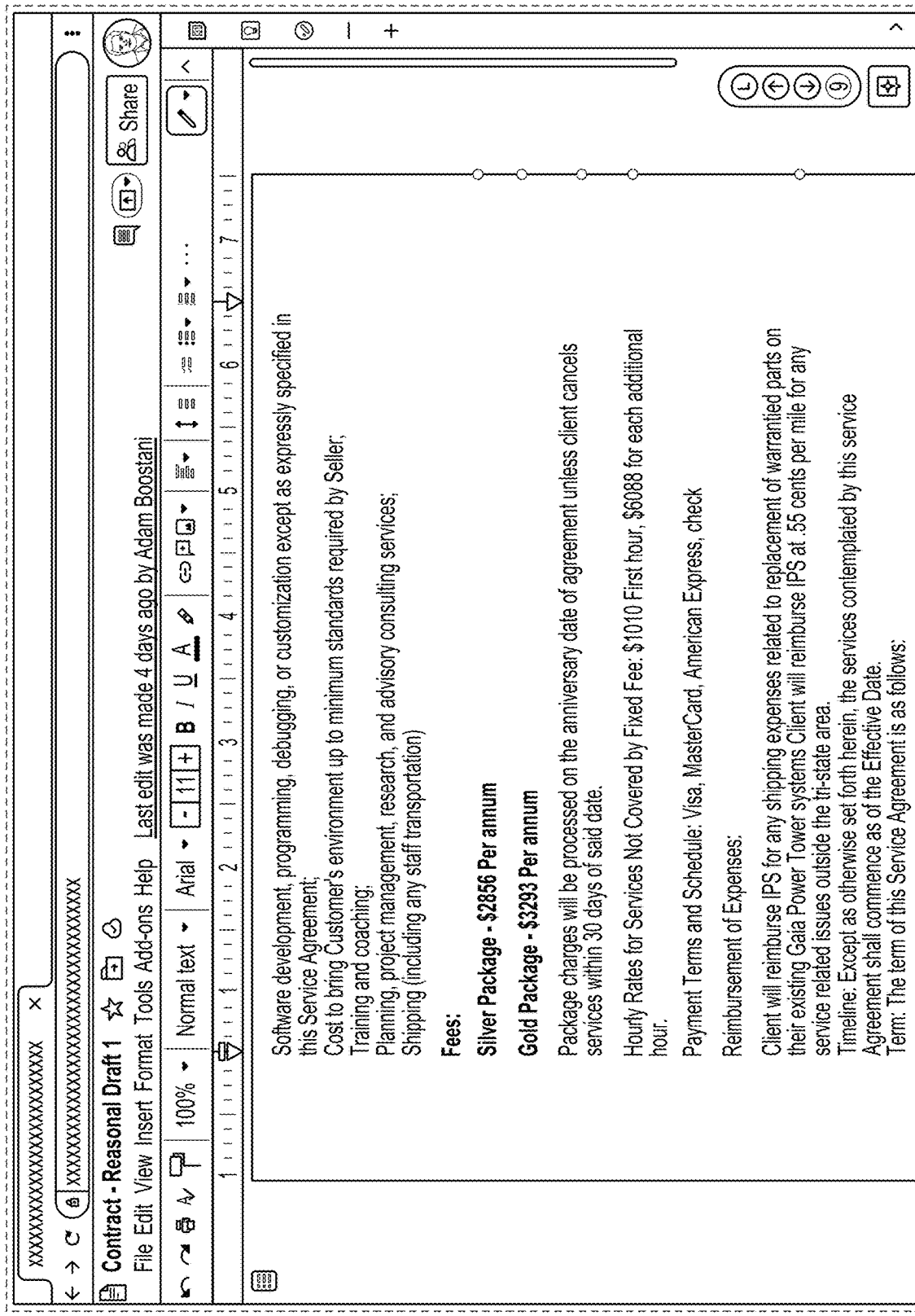
Figure 5:
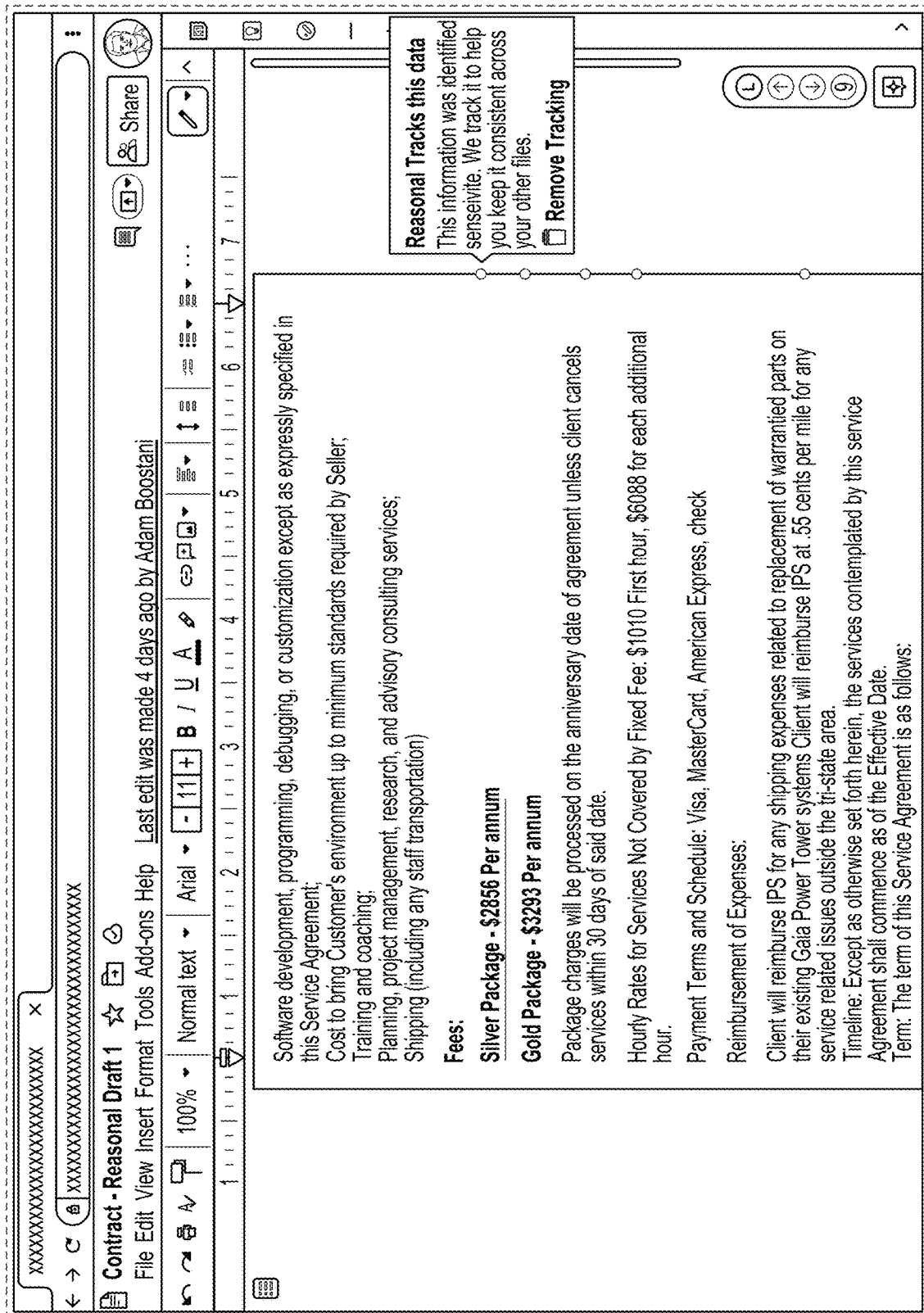
Figure 6:
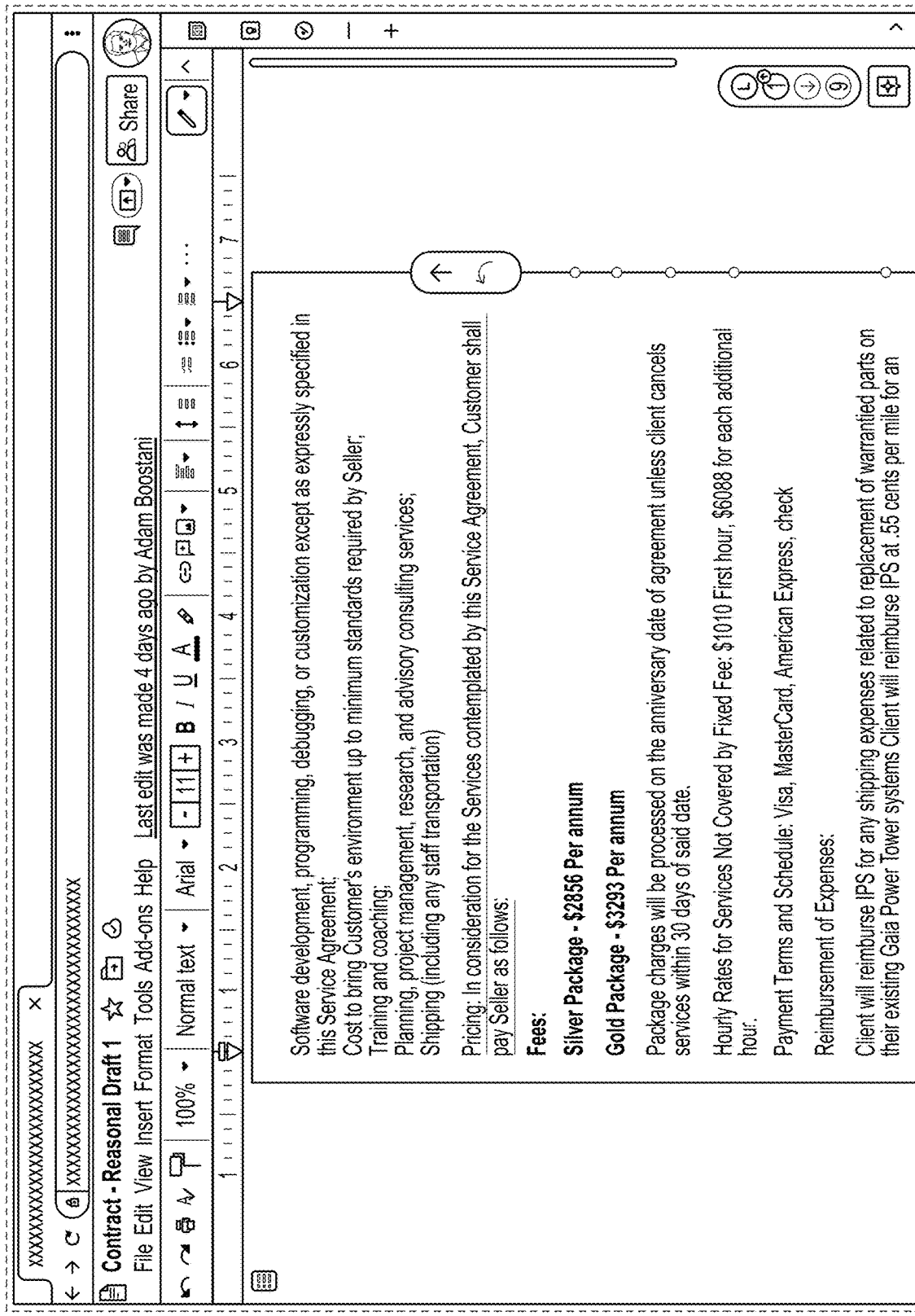

In an example embodiment, in order to use the services of the predictive revision system, Alice first visits a signup page, an example of which is depicted in FIG. 1. Alice can either provide sign-in credentials (e.g., for Google services or another applicable platform) or can create an account using an email address. Next, as illustrated in FIG. 2, Alice is asked to provide a name for her workspace (e.g., "ACME Contracts"). Next, as illustrated in FIG. 3, Alice is asked to indicate which various third party content/collaboration services she would like to connect with the predictive revision system. Examples shown include Google Drive (302), Slack (306), Microsoft Teams (308), Notion (310), Trello (312), Gmail (314), Figma (316), and Evernote (318). Other services (e.g., Salesforce) can also be used in conjunction with techniques described herein. For each of the services that Alice selects, the predictive revision system can use an application programming interface (API) provided by the respective service to establish a relationship between the service and the predictive revision system.

Figure 4A:
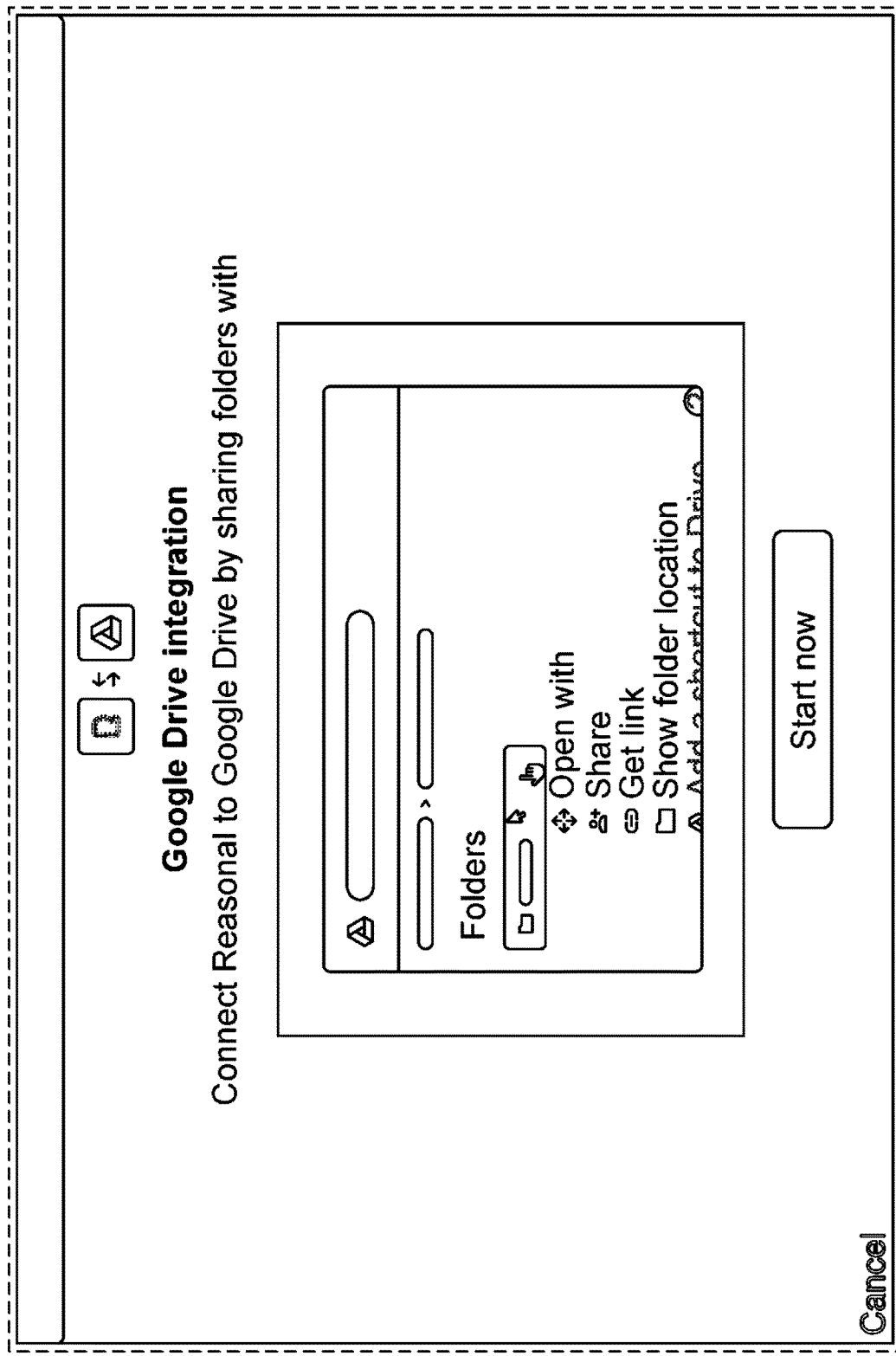
Figure 4B:
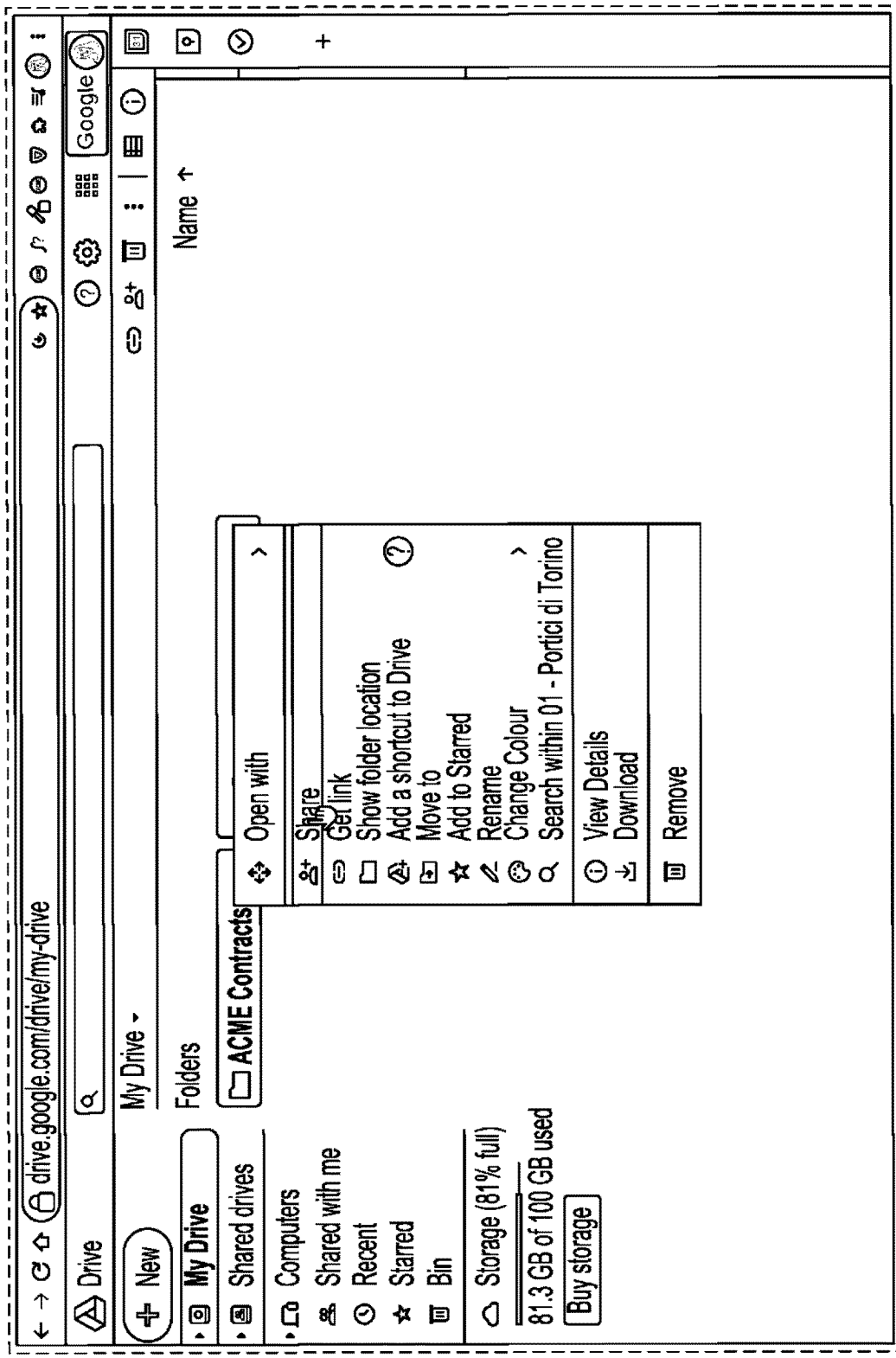
Figure 4C:
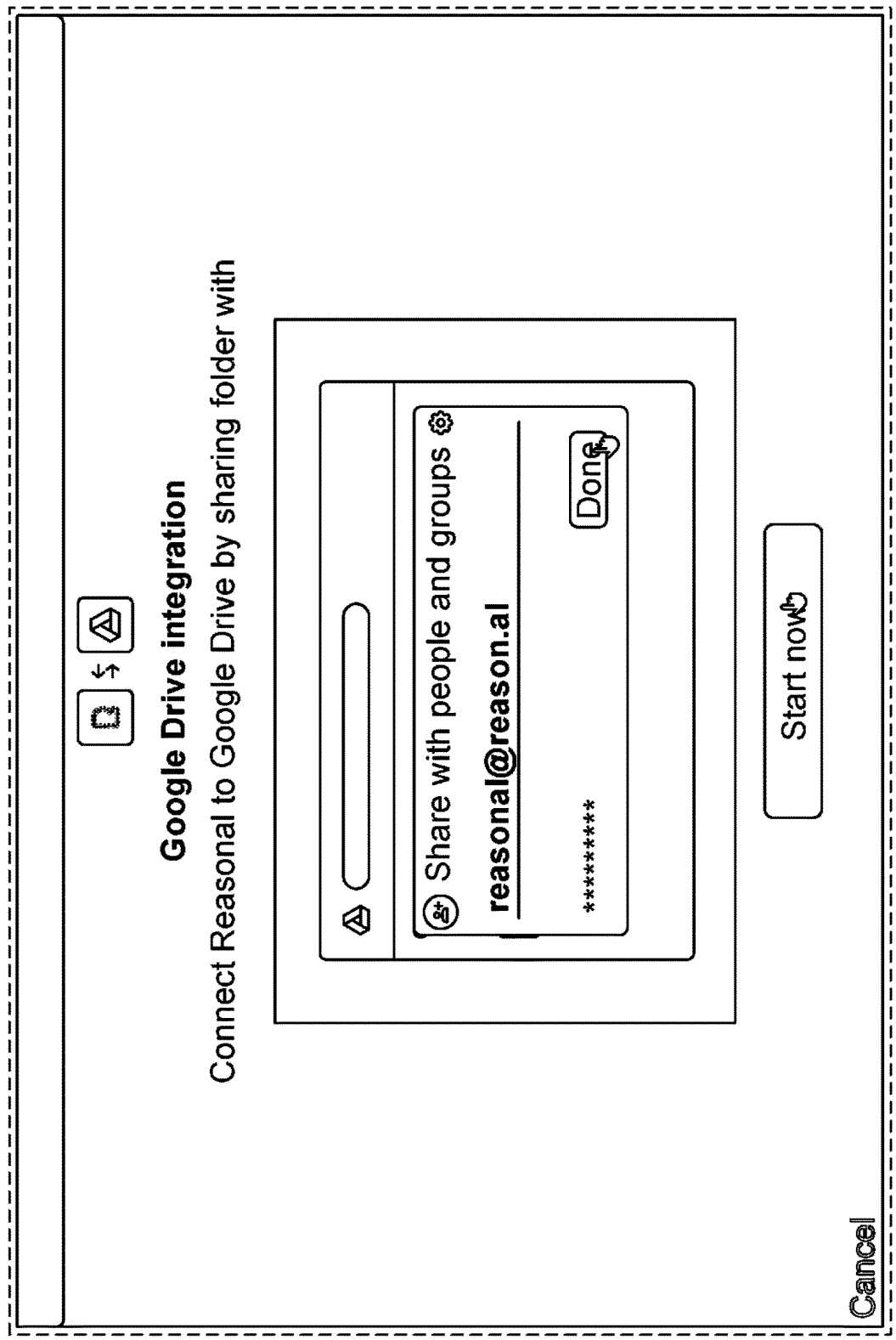

Suppose Alice has selected region 302—Google Drive integration. She is provided with instructions for completing the integration (illustrated in FIG. 4A) by the predictive revision system. Following those instructions, as shown in FIG. 4B, she then selects a specific folder within her Google Drive (e.g., "ACME Contracts") that she would like to share with the predictive revision system, and provides a designated email address associated with the predictive revision system to the interface (as indicated in FIG. 4C). As will be described in more detail below, the bridge created between Google Drive and the predictive revision system provides the predictive revision system with permissions to read historical file revision information (e.g., for documents, spreadsheets, images, etc.)—from the date of their creation to the current timeline—and use analysis of those historical revisions (and ongoing revisions) to recommend future changes.

Figure 5A:
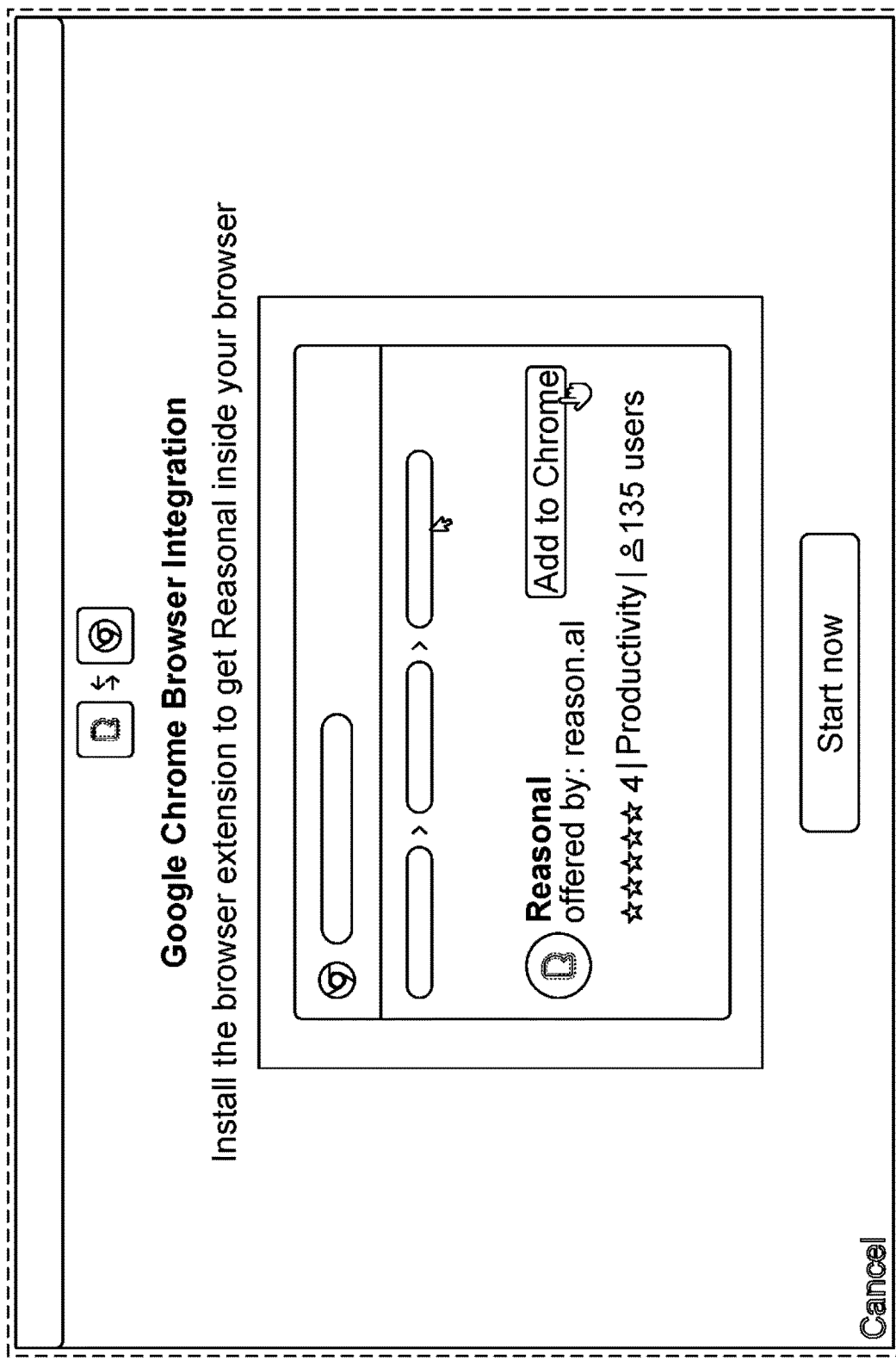
Figure 5B:
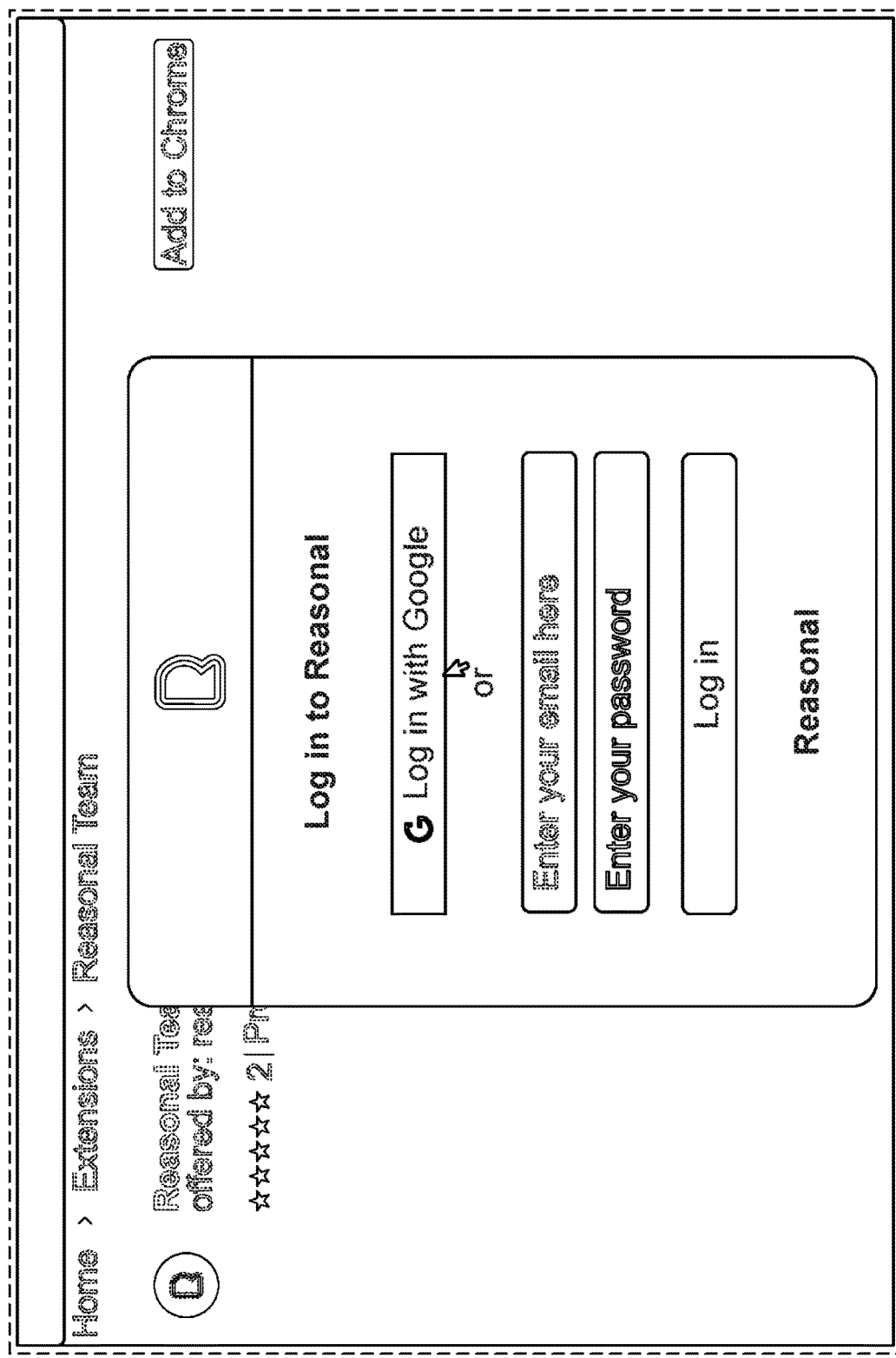
Figure 6A:
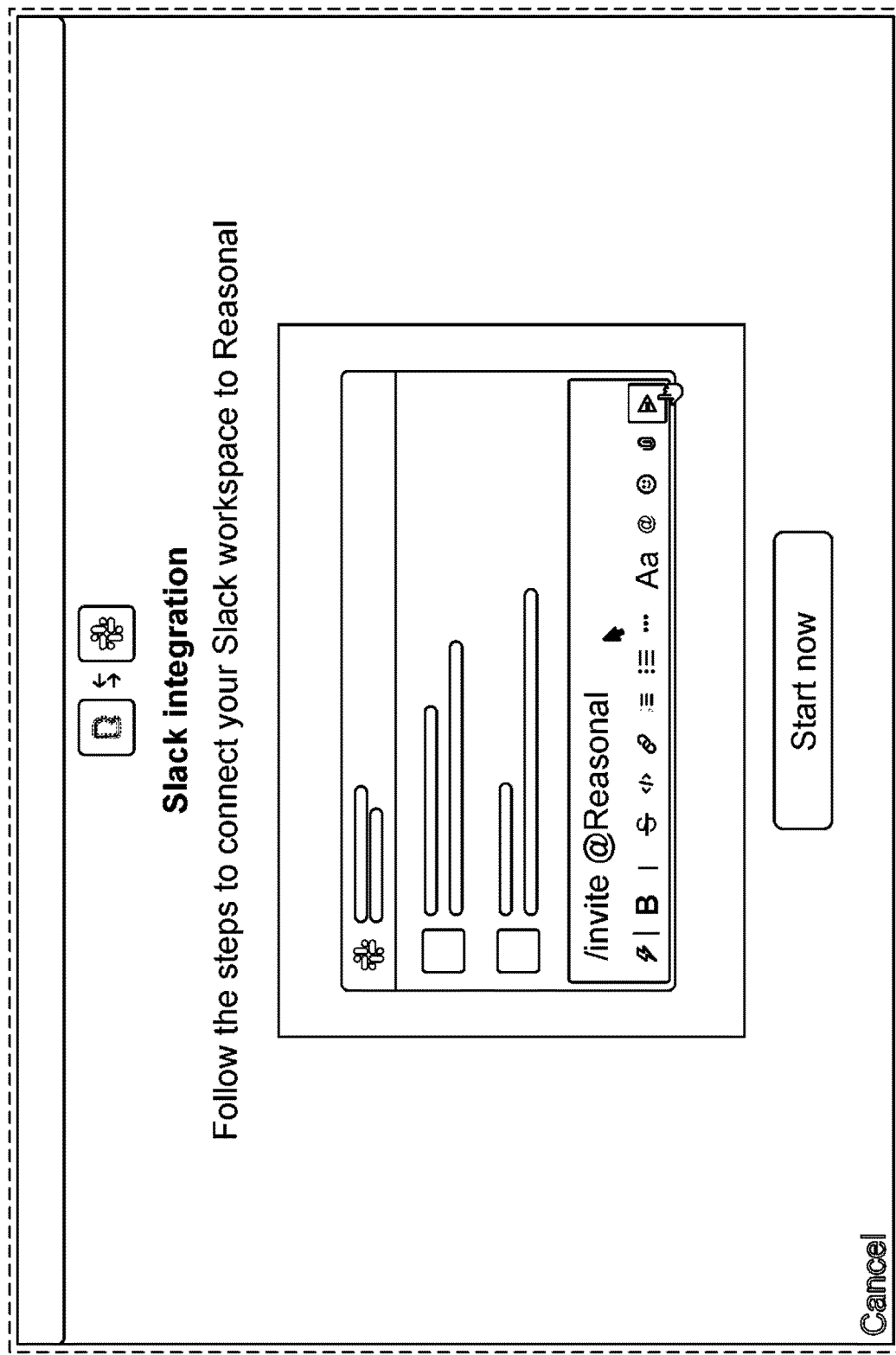
Figure 6B:
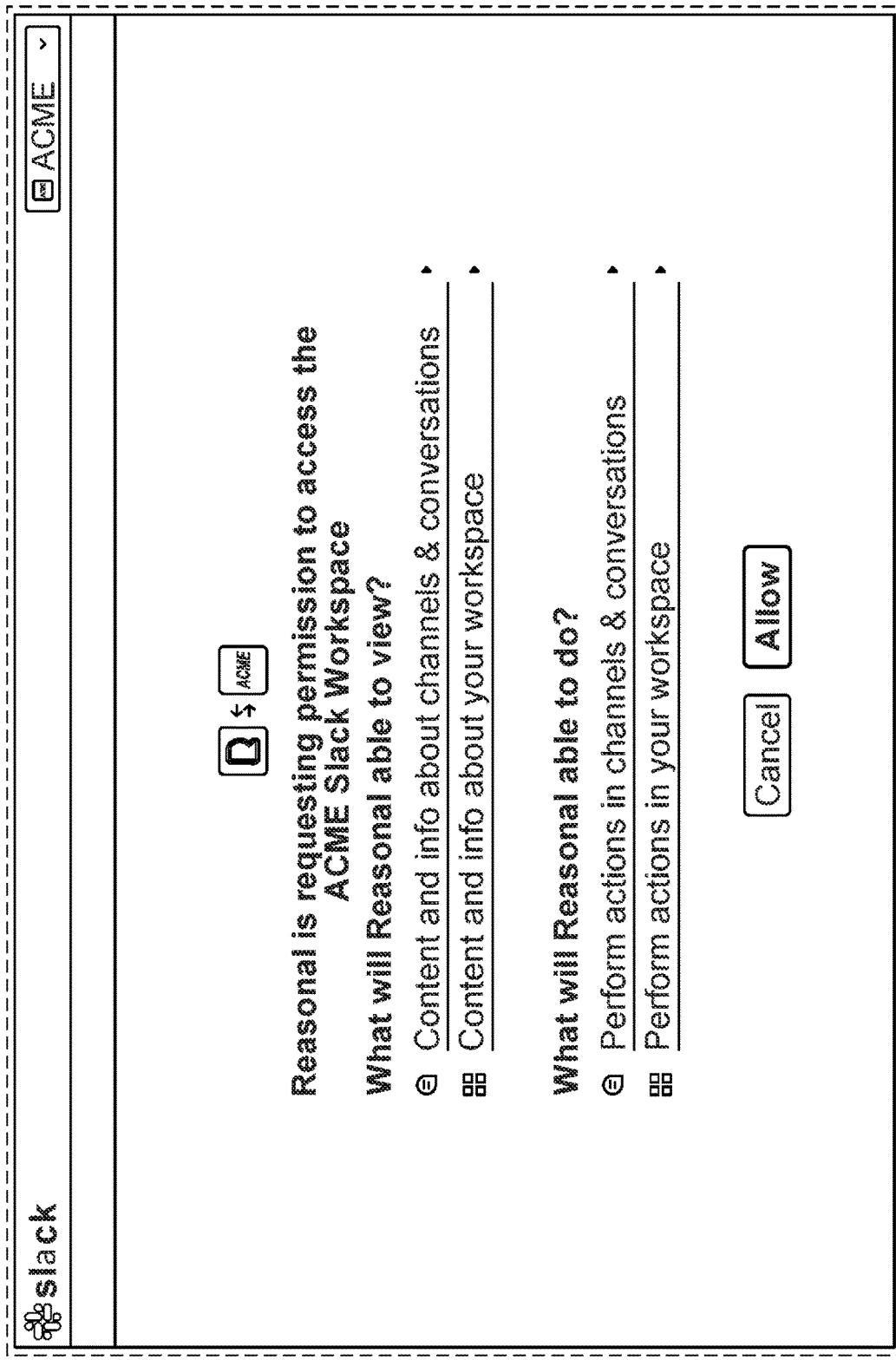
Figure 6C:
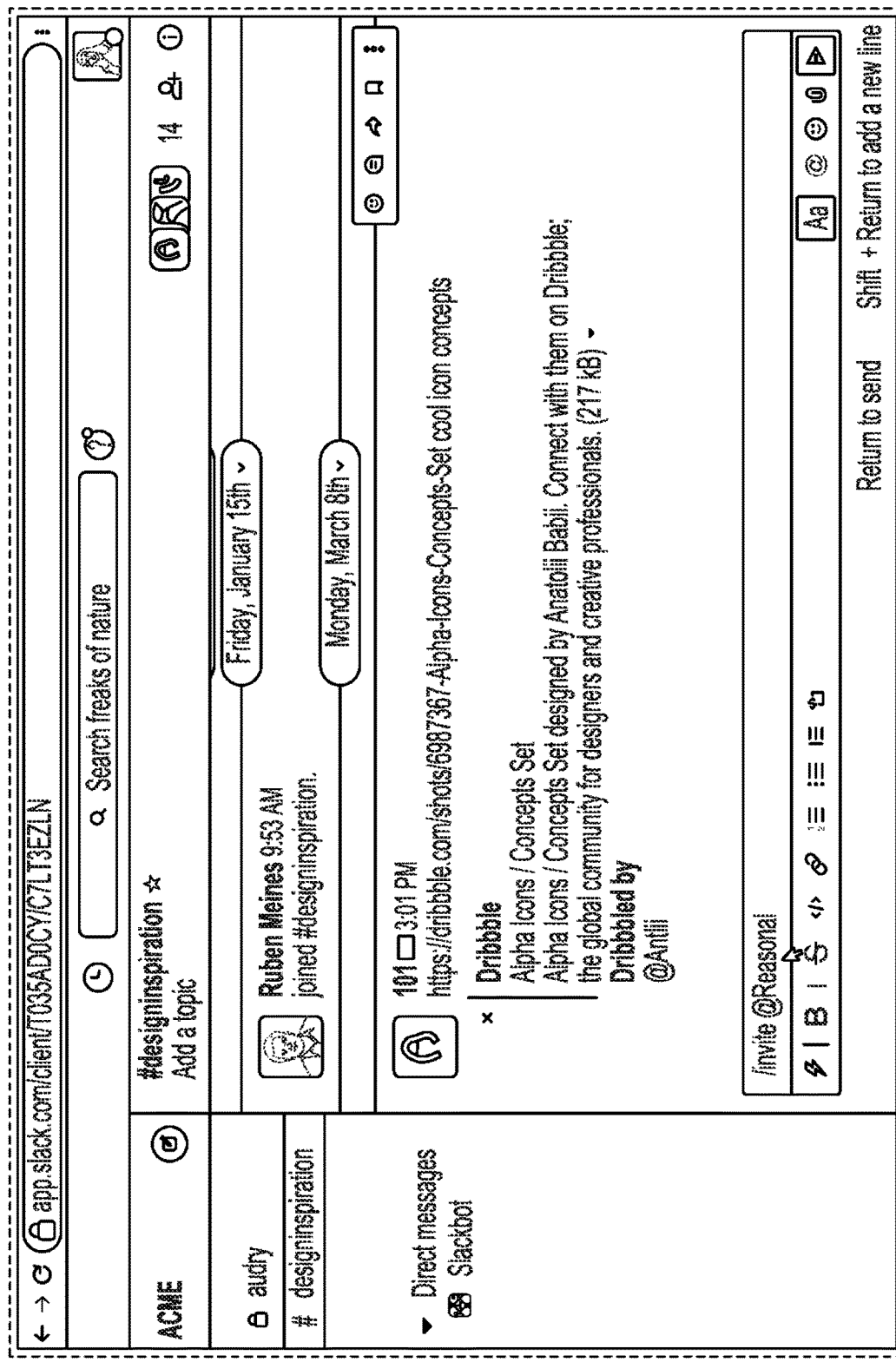
Figure 7:
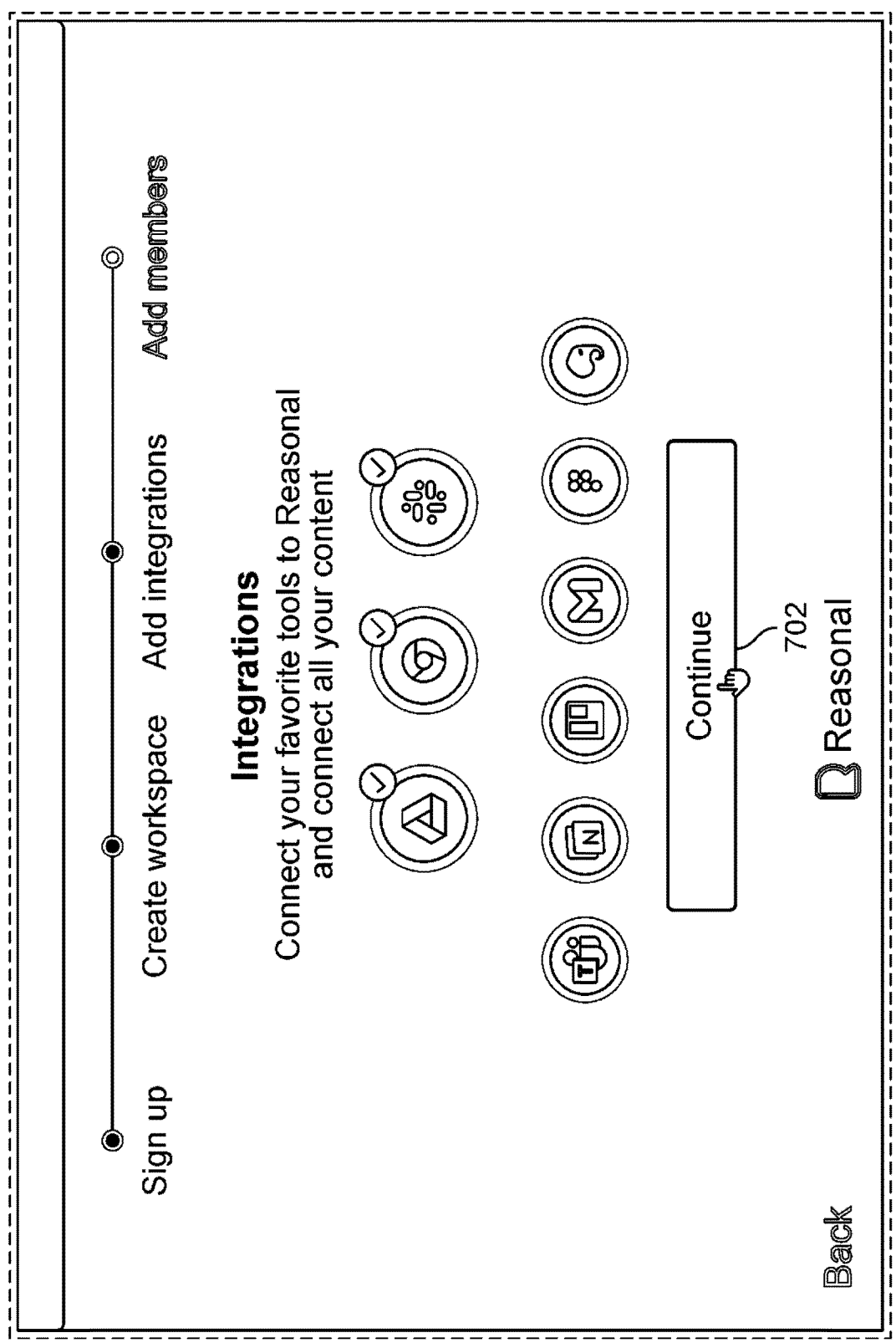

Alice can click on other regions of interface 300 to integrate other services with the predictive revision system. As an additional example, if Alice clicks in region 304, she is taken to the interface shown in FIG. 5A from which she can install a browser extension in her Chrome browser (including by interacting with the interface shown in FIG. 5B) that connects her browser with services provided by the predictive revision system (described in more detail below). And, if she clicks in region 306, Alice can connect her Slack account with the predictive revision system by following the presented instructions (as indicated in FIG. 6A), such as by interacting with the applicable interfaces shown in FIG. 6B and FIG. 6C.

Figure 7:
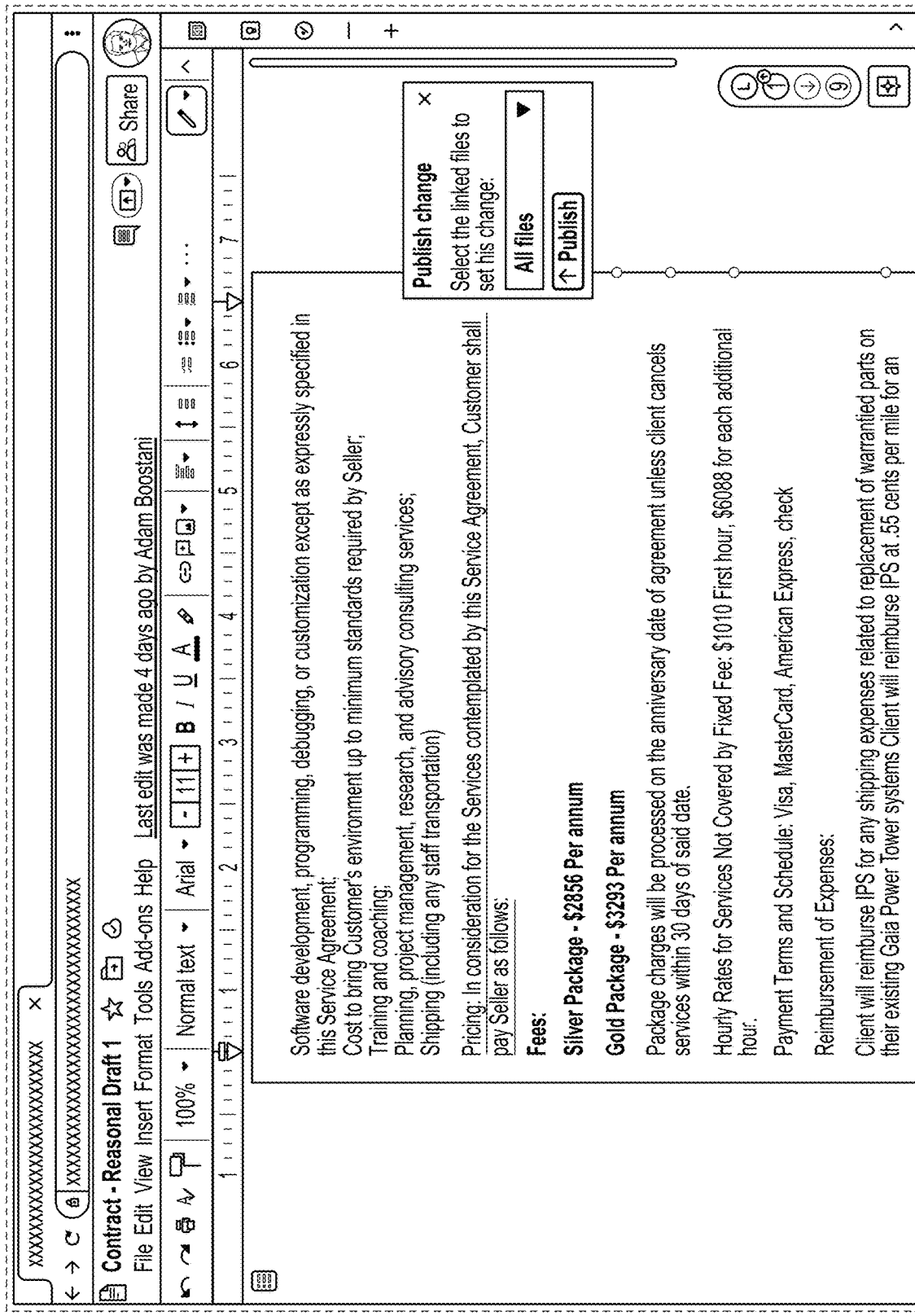
Figure 8:
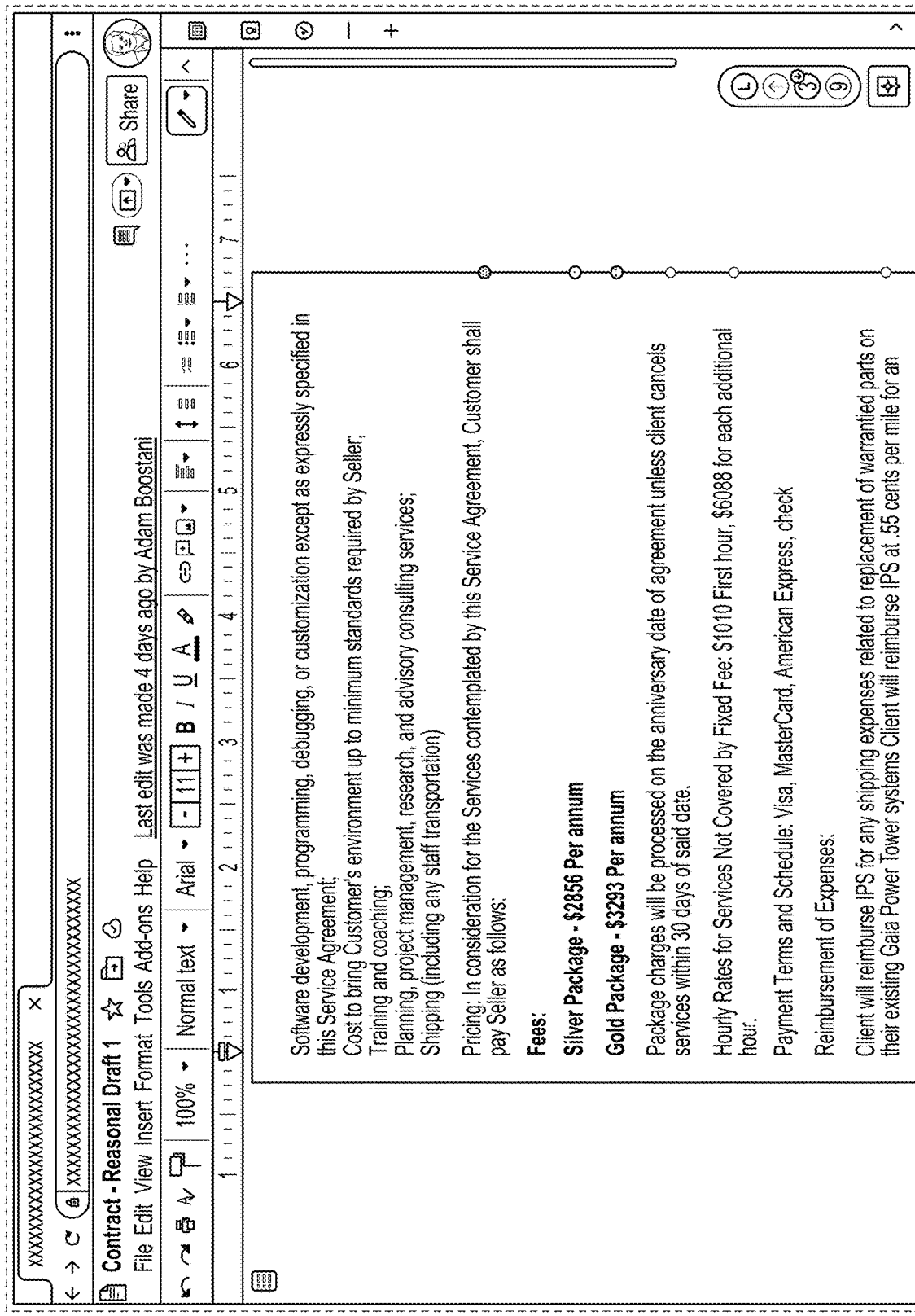

Once Alice is finished adding the services that she wishes to integrate with the predictive revision system (e.g., as illustrated in FIG. 7), she clicks in region 702 and then is prompted to (optionally) provide one or more identifiers of any collaborators which she plans on working with on the ACME Contracts project, as illustrated in FIG. 8. At this point, and as will be described in more detail below, any content (e.g., documents, spreadsheets, images, videos, instant messages, emails, etc.) accessible to Alice via any of the newly attached services will be processed by the predictive revision system. Insights about that content will be surfaced to Alice in a dashboard and also used, in various embodiments, to help predict/suggest future changes to content with which Alice interacts.

B. Dashboard

FIG. 9 illustrates an example of a dashboard interface made available by a predictive revision system in accordance with various techniques described herein, such as predictive revision system 1702. Interface 900 presents (e.g., to user Alice) a unified view of the various content associated with a user and analyzed/processed by the predictive revision system. As one example, in region 902, a representation of a document that Alice edited yesterday using Google Docs is presented (a draft of a proposed agreement with HSBC Bank). Other documents recently edited by Alice are similarly presented in row 904 (e.g., drafts of proposed agreements with Citi and Bank of America). As will be described in more detail below, the predictive revision system has access to contextual information about each of the pieces of content, including revision history information.

Figure 10:
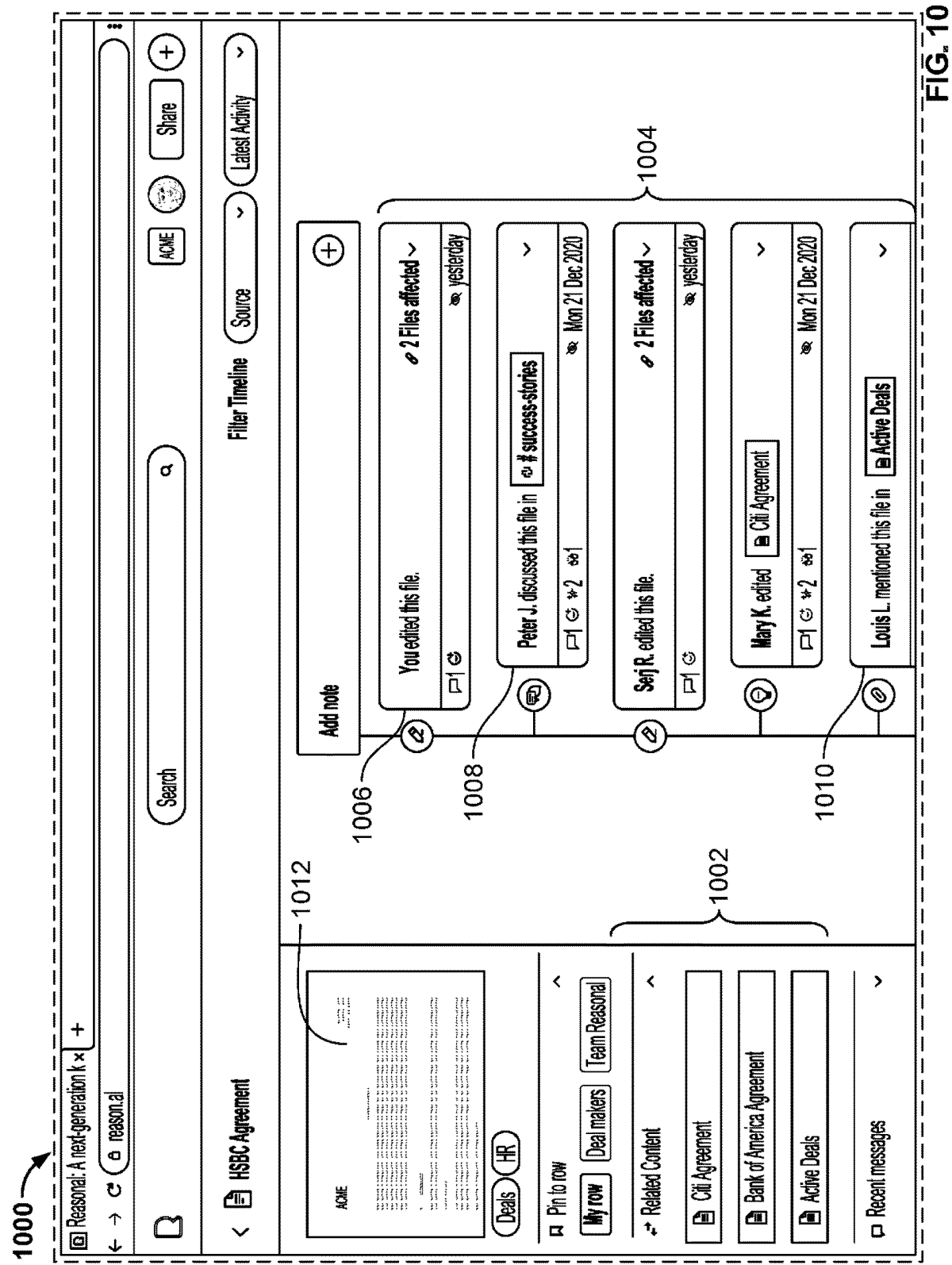

If Alice clicks in region 902, she will be shown various information associated with the document (the "HSBC Agreement") in interface 1000 illustrated in FIG. 10. For example, in region 1002, other content related to the HSBC Agreement is surfaced. Examples of these include similar documents (e.g., draft agreements with other banks) and other types of content associated with the HSBC Agreement (e.g., a spreadsheet of active deals). In region 1004, Alice is presented with a timeline of activities associated with the HSBC Agreement. Of note, the timeline information depicts a unified view of correlated activities across multiple third party content/collaboration services pertinent to the HSBC Agreement. For example, in addition to Alice's recent edits to the HSBC Agreement in Google Docs (1006), the HSBC Agreement was discussed by another user, Peter, in a Slack channel (1008), and a user Louis included it in a spreadsheet of "Active Deals" (1010). As will be described in more detail below, information such as is depicted in interface 1000 can be used to help Alice (and/or other applicable users) keep various content up-to-date, such that, for example, if a change is made to the HSBC Agreement, a corresponding change can be made (or suggested to be made) to the Active Deals spreadsheet or other agreements with other banks.

Figure 12:
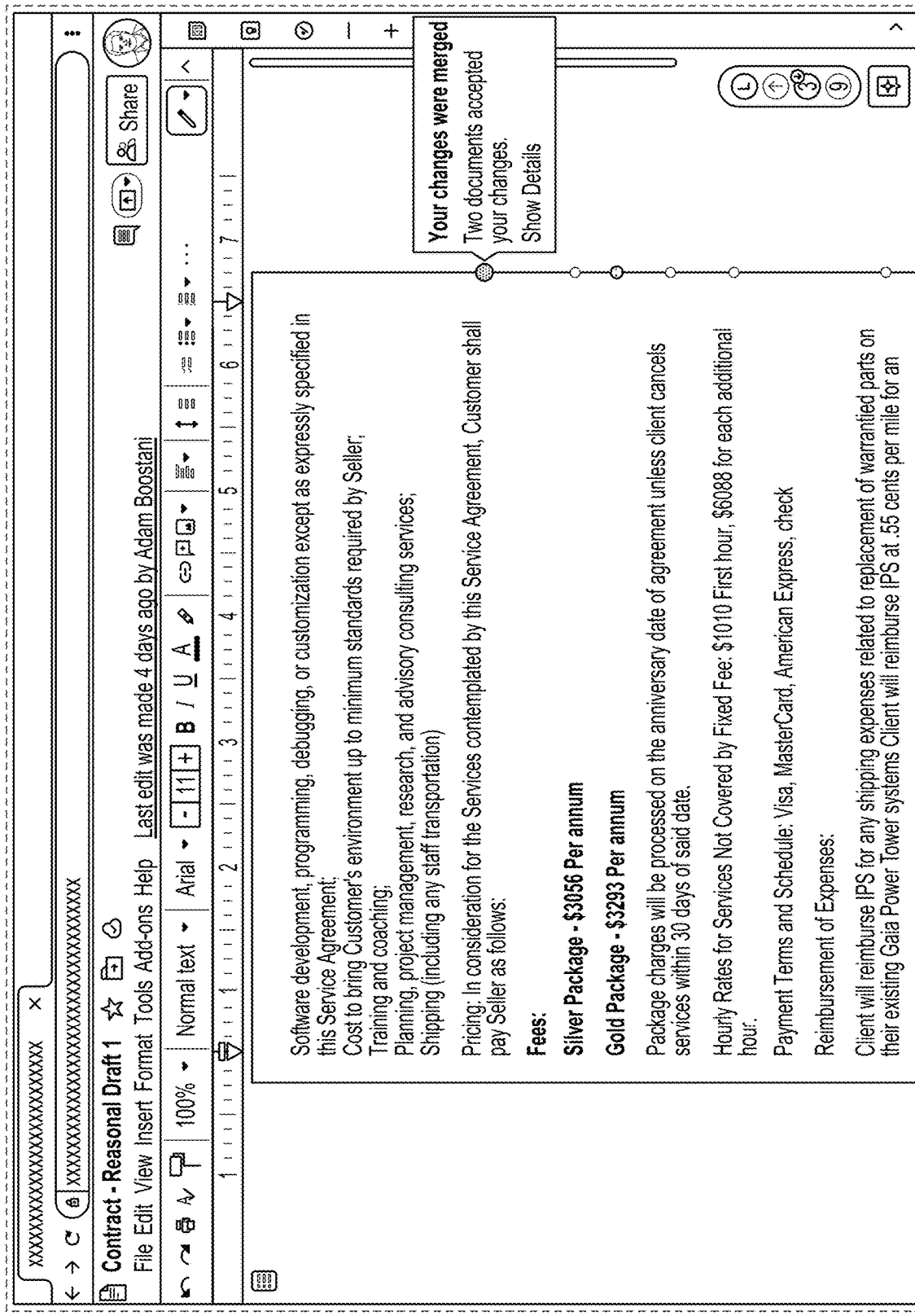
Figure 11:
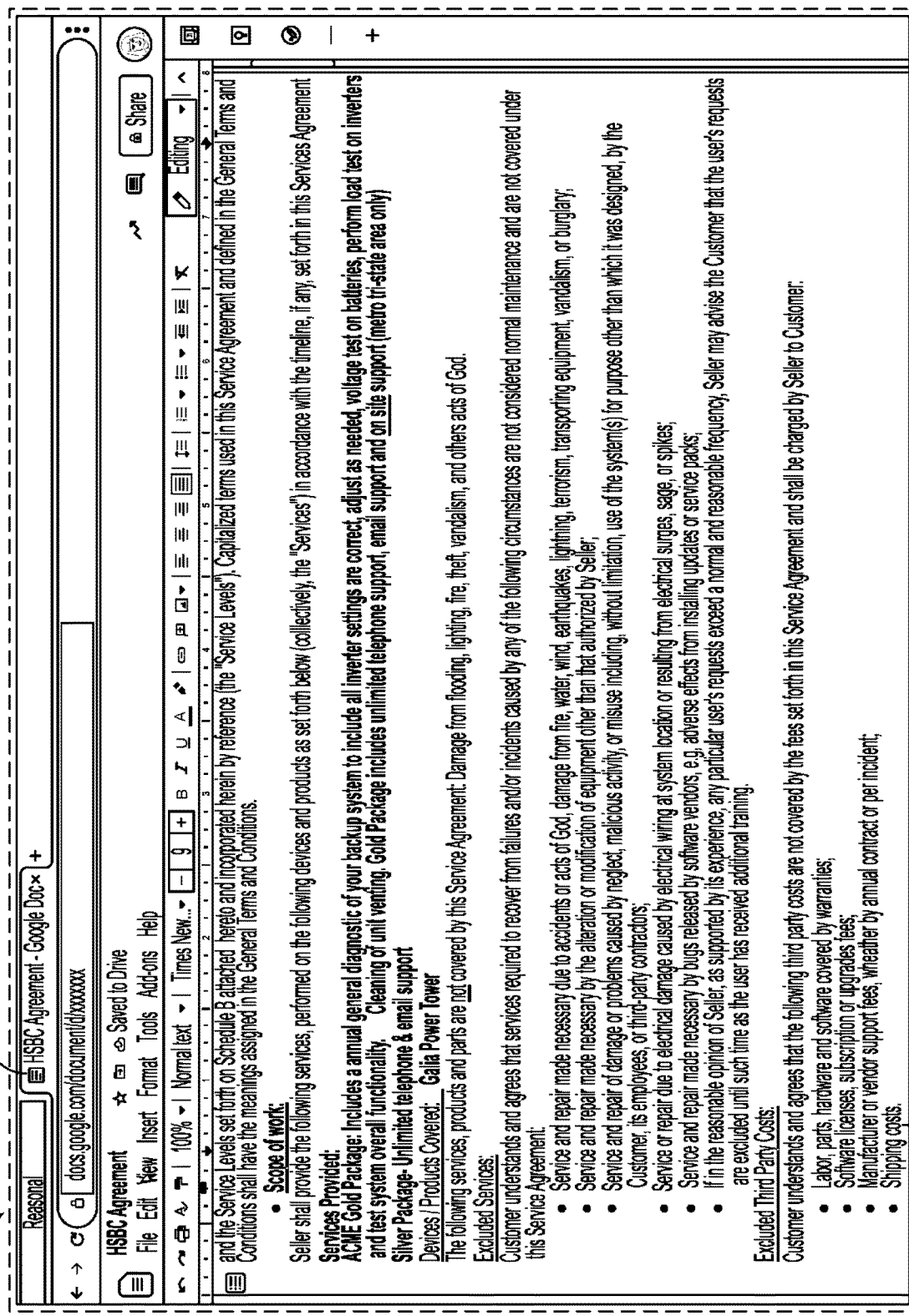
Figure 13:
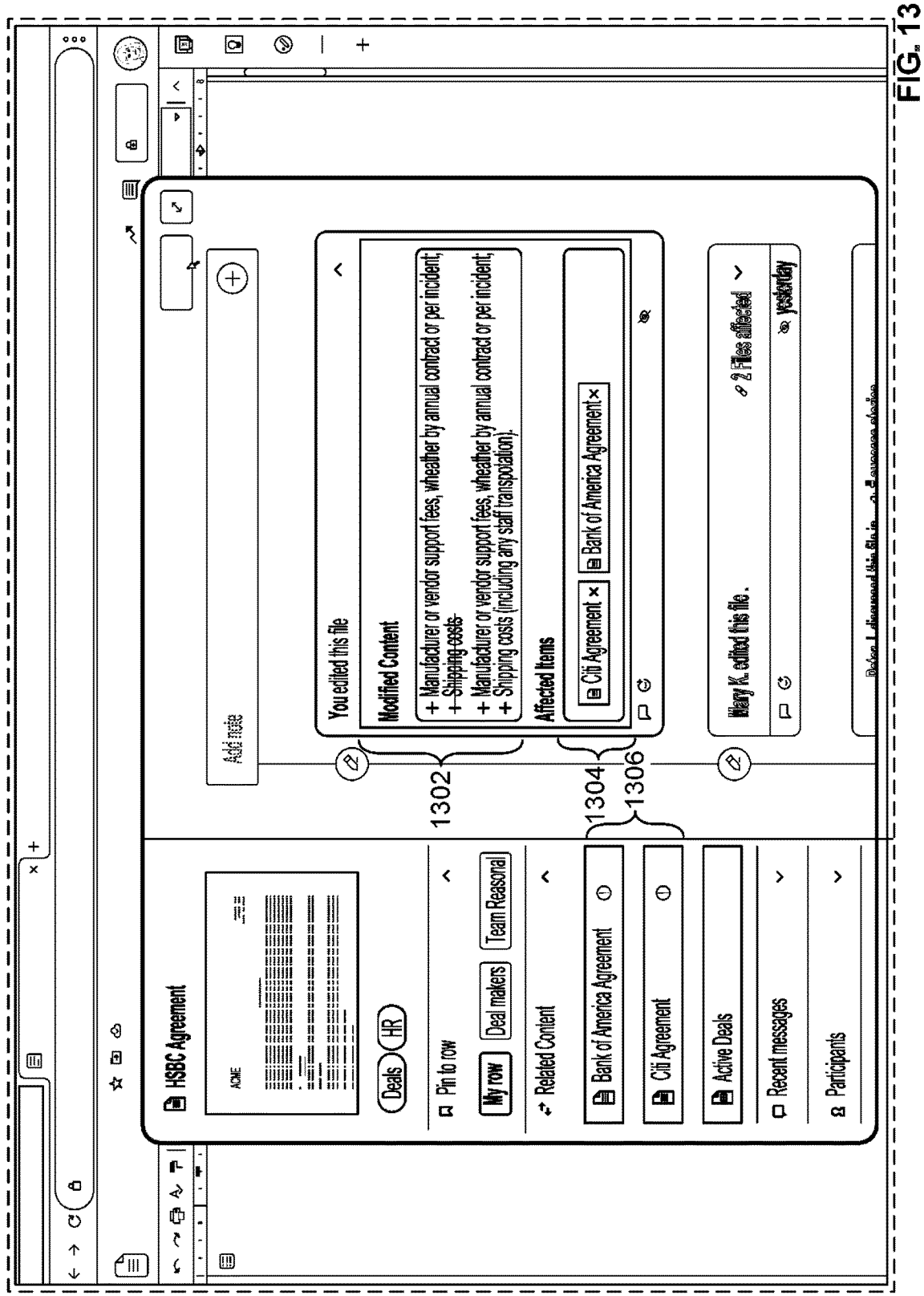
Figure 14:
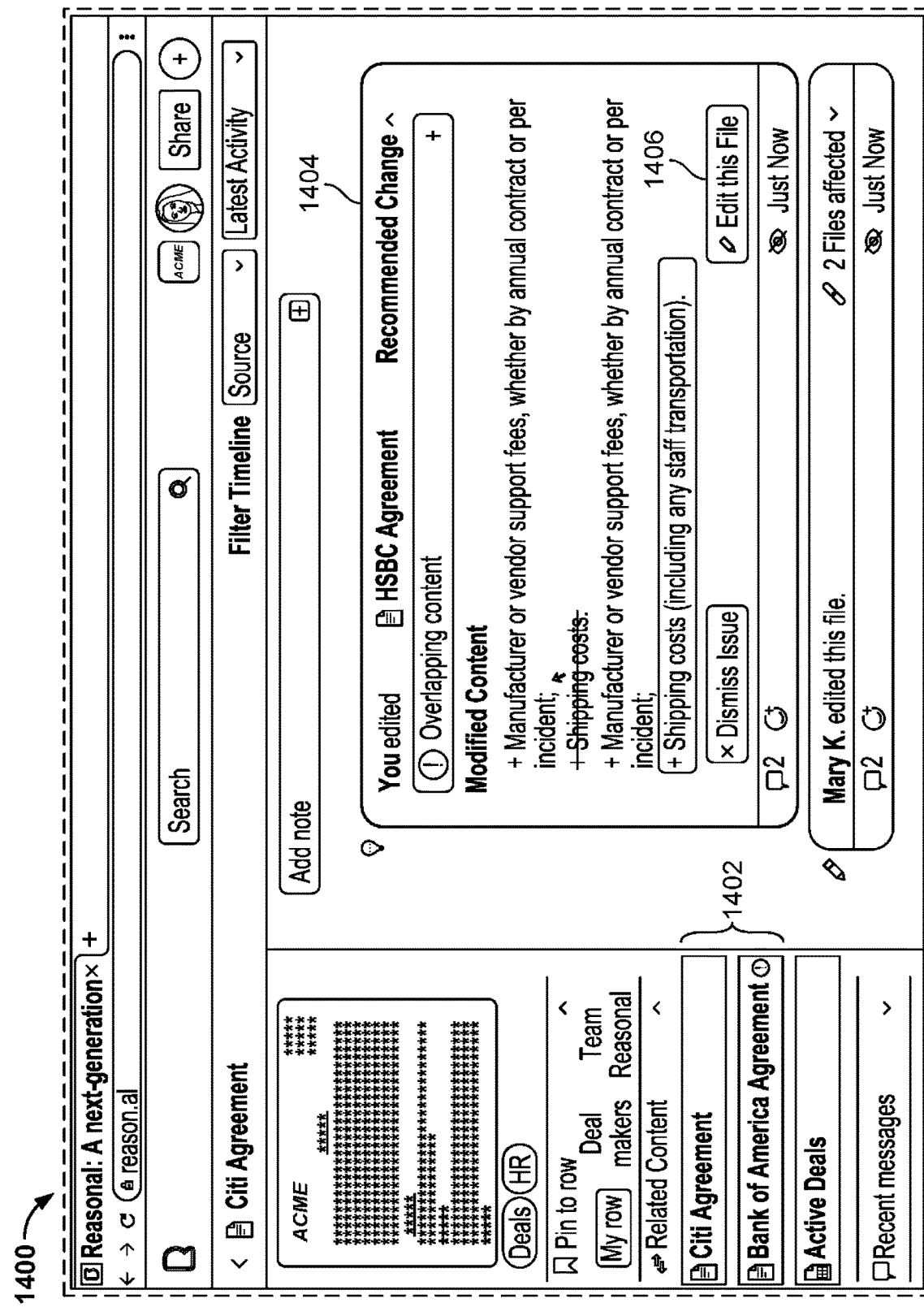

If Alice clicks in region 1012, Alice's browser will be directed (e.g., in a new tab 1102) to the Google Docs link for the HSBC Agreement (as illustrated in FIG. 11). Suppose that, while reviewing the document in interface 1100, Alice decides to make a change to a portion of the document. In particular, suppose she wishes to revise the portion of text that currently states "Shipping costs" in region 1104 to instead state "Shipping costs (including any staff transportation)." Alice having made this change is reflected in region 1202 of FIG. 12. When Alice makes that modification, the predictive revision system determines whether her changes implicate other content. As previously mentioned, Alice installed a Chrome browser extension that communicates with the predictive revision system. In the example shown in FIG. 12, she is alerted to potential actions that she should take (based on her current edits to the HSBC Agreement) by that extension via a pop-up notification shown in region 1204.

Figure 13:
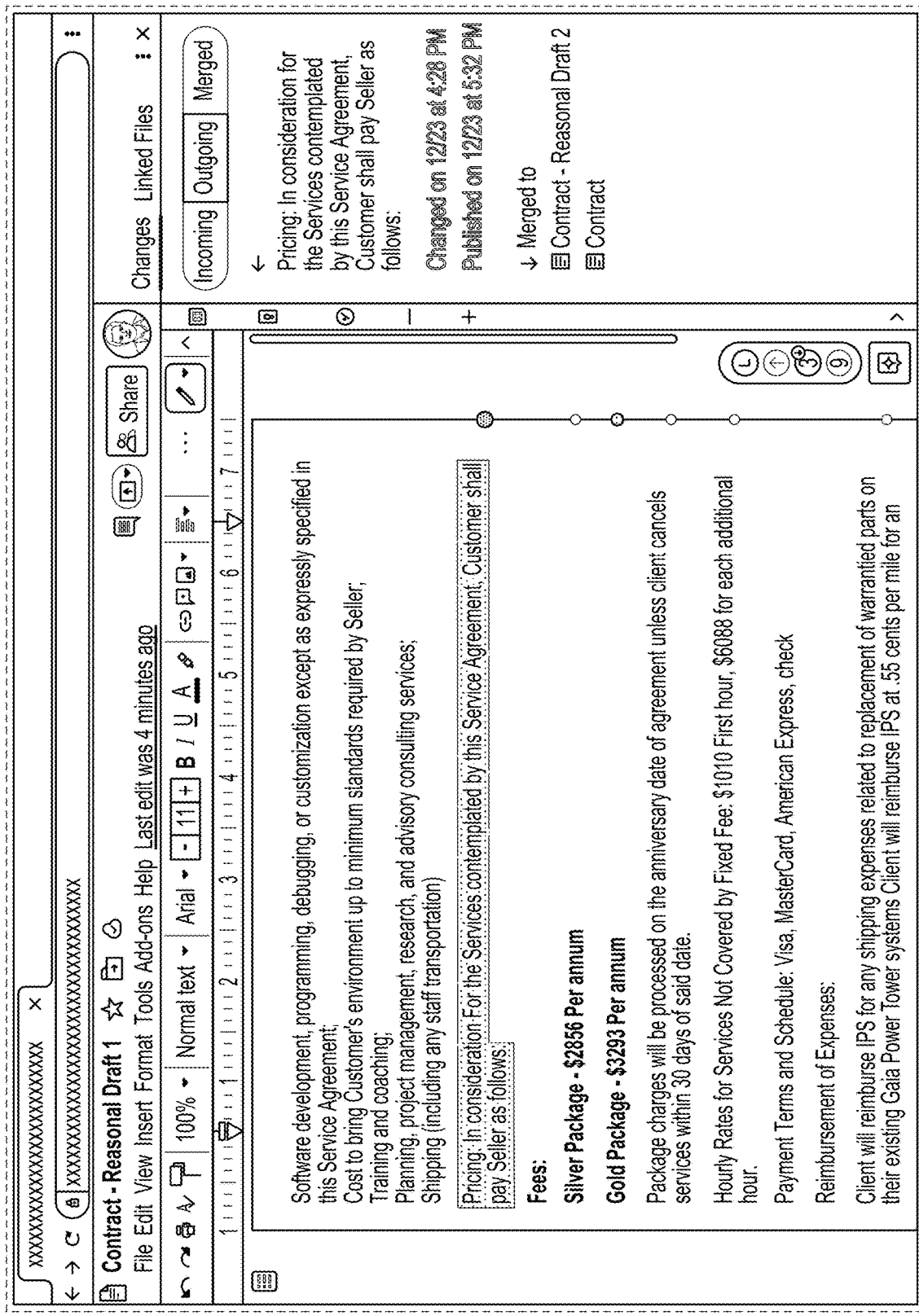

If Alice clicks on the "View Item" link in region 1206, the browser extension will surface the overlay shown in FIG. 13. Region 1302 shows the change(s) that she just made (from the text depicted in FIG. 11 to the text depicted in FIG. 12). Region 1304 depicts additional content items that (potentially) could be implicated by Alice's changes and which the predictive revision system has determined that it is likely that similar modifications should be made. As will be described in more detail below, these additional content items are ones that, for example, have similar templates and are also actively being worked on or modified. That other content might be implicated by Alice's changes is also reflected in region 1306, which has added/incremented badge counts (i.e., a badge count has been added and is set to "1").

Figure 14:
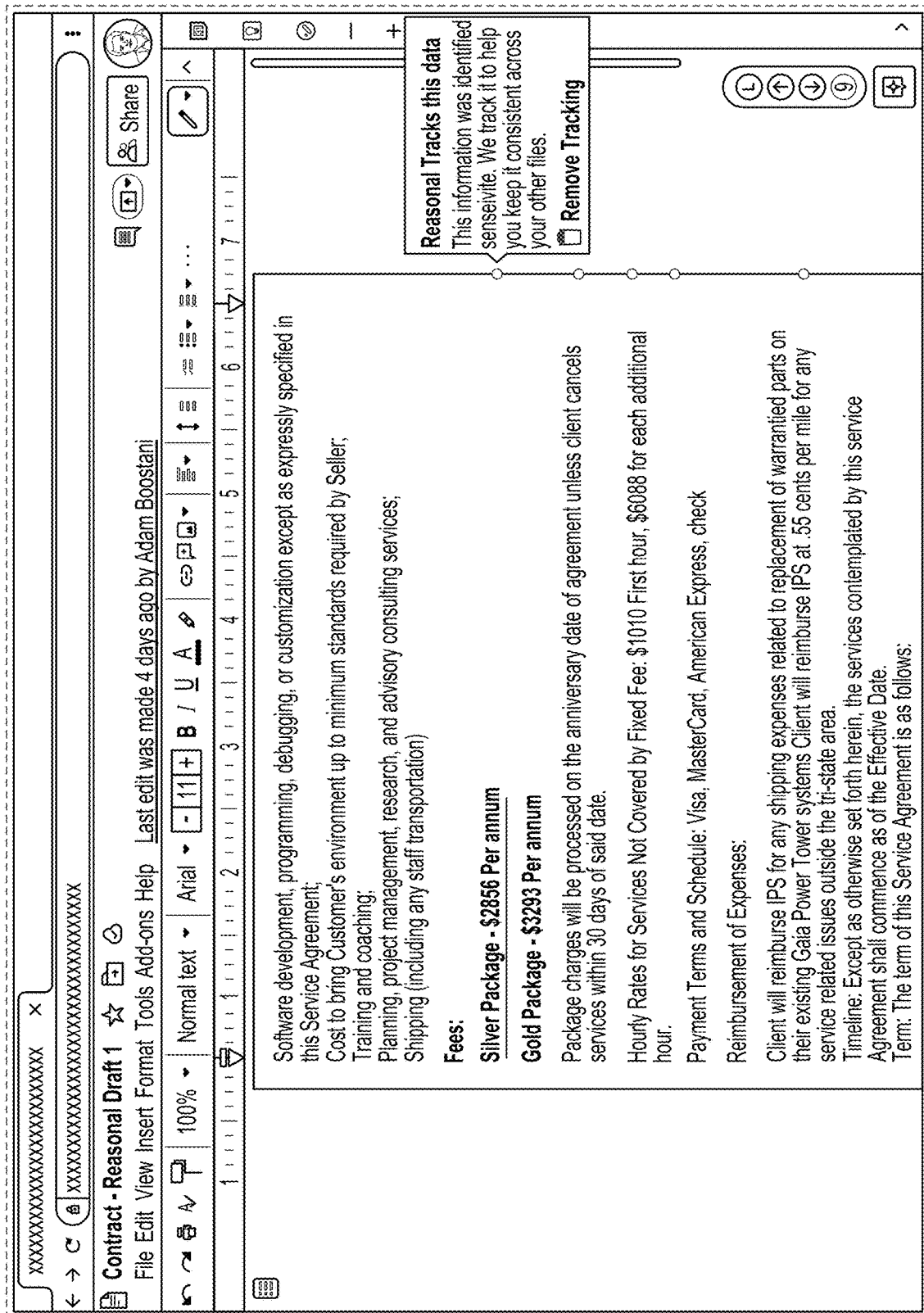

If Alice clicks on "Citi Agreement" in either region 1304 or 1306, she is shown the interface depicted in FIG. 14 (e.g., served by the predictive revision system). The badge next to "Citi Agreement" is removed from region 1402. In region 1404 of interface 1400, Alice is presented with information about why the "Citi Agreement" document was flagged after she made changes to the HSBC document (i.e., the documents share overlapping content). Further, region 1404 presents Alice with a recommended action to take, namely, making the same insertion of "(including any staff transportation)" into the "Citi Agreement" document.

Figure 20A:
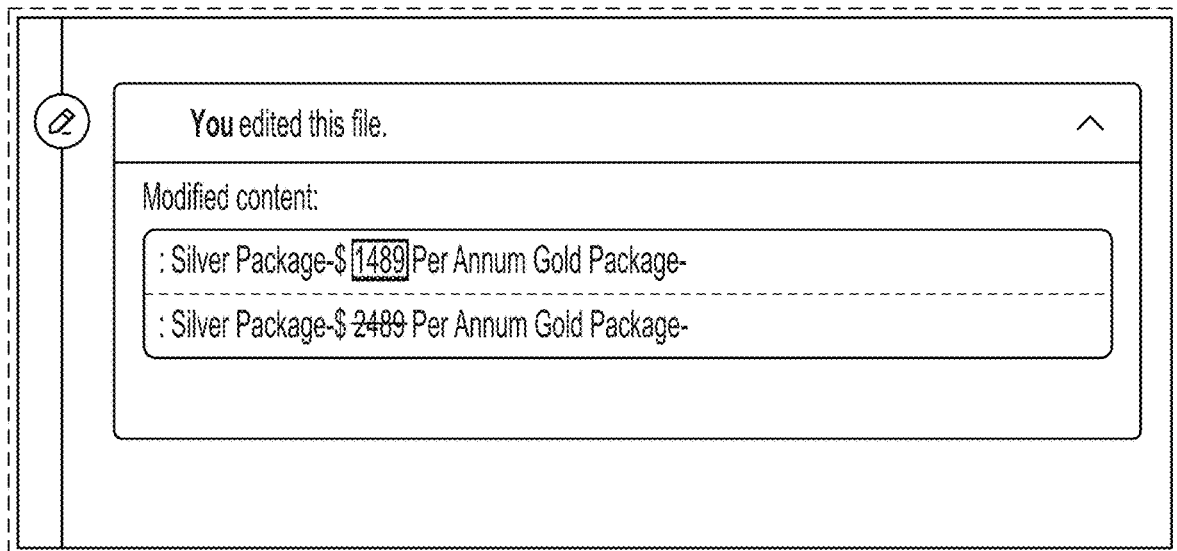
FIGS. 20A and 20B illustrate examples of portions of an interface.
Figure 20B:
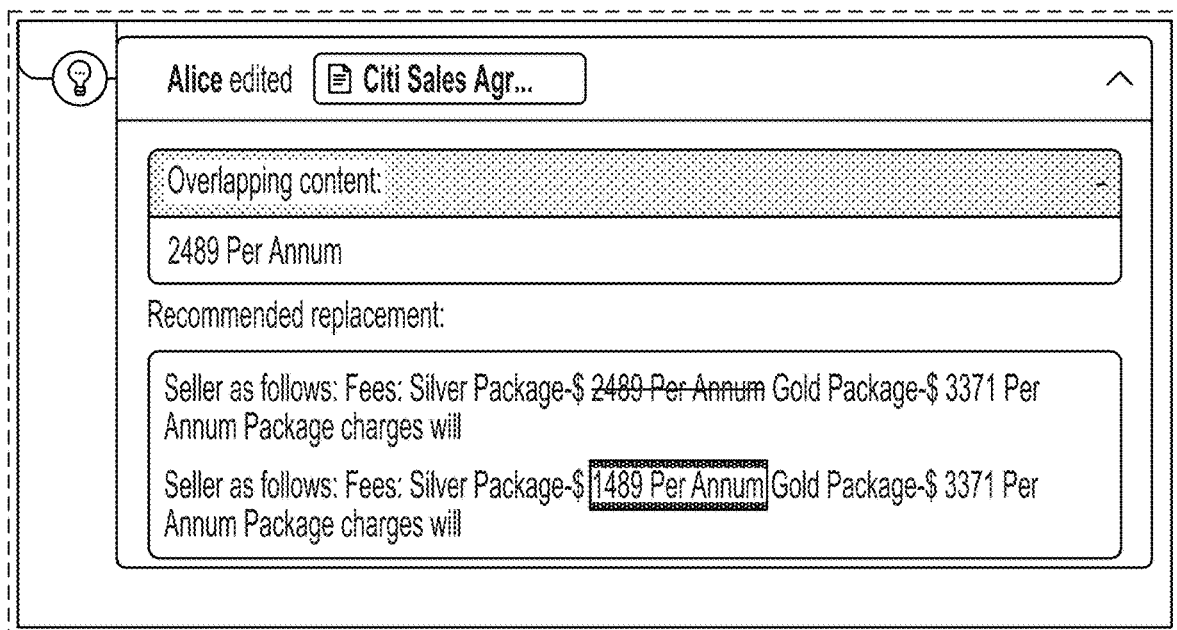

If Alice clicks on "Edit this File" button 1406, Alice's browser will be directed (e.g., in a new tab 1502) to the Google Docks link for the Citi Agreement (as illustrated in FIG. 15). In various embodiments, the predictive revision system uses an application programming interface (API) provided by Google services (or, in the case of other types of content, other applicable platforms) to modify the Citi Agreement to reflect the same changes that Alice made to the HSBC document as if the predictive revision system was an additional collaborator on the document. The changes are marked (via the API) for Alice's approval or rejection as shown in regions 1504 and 1506. Anyone else with access to the document (e.g., Peter or Louis) can similarly opt to accept or deny the proposed change if they have edit permissions on the document. Further, since the predictive revision system is acting as an additional collaborator on the Citi Agreement document (via the API), Peter and/or Louis need not themselves be enrolled to use the services of the predictive revision system to be able to accept or reject the changes that it makes. If the service does not support automating the changes directly, predictive revision system 1702 can still provide the user with meaningful recommended actions to take, e.g., in an interface provided by predictive revision system 1702 (an example of which is illustrated in FIG. 20B).

Figure 16:
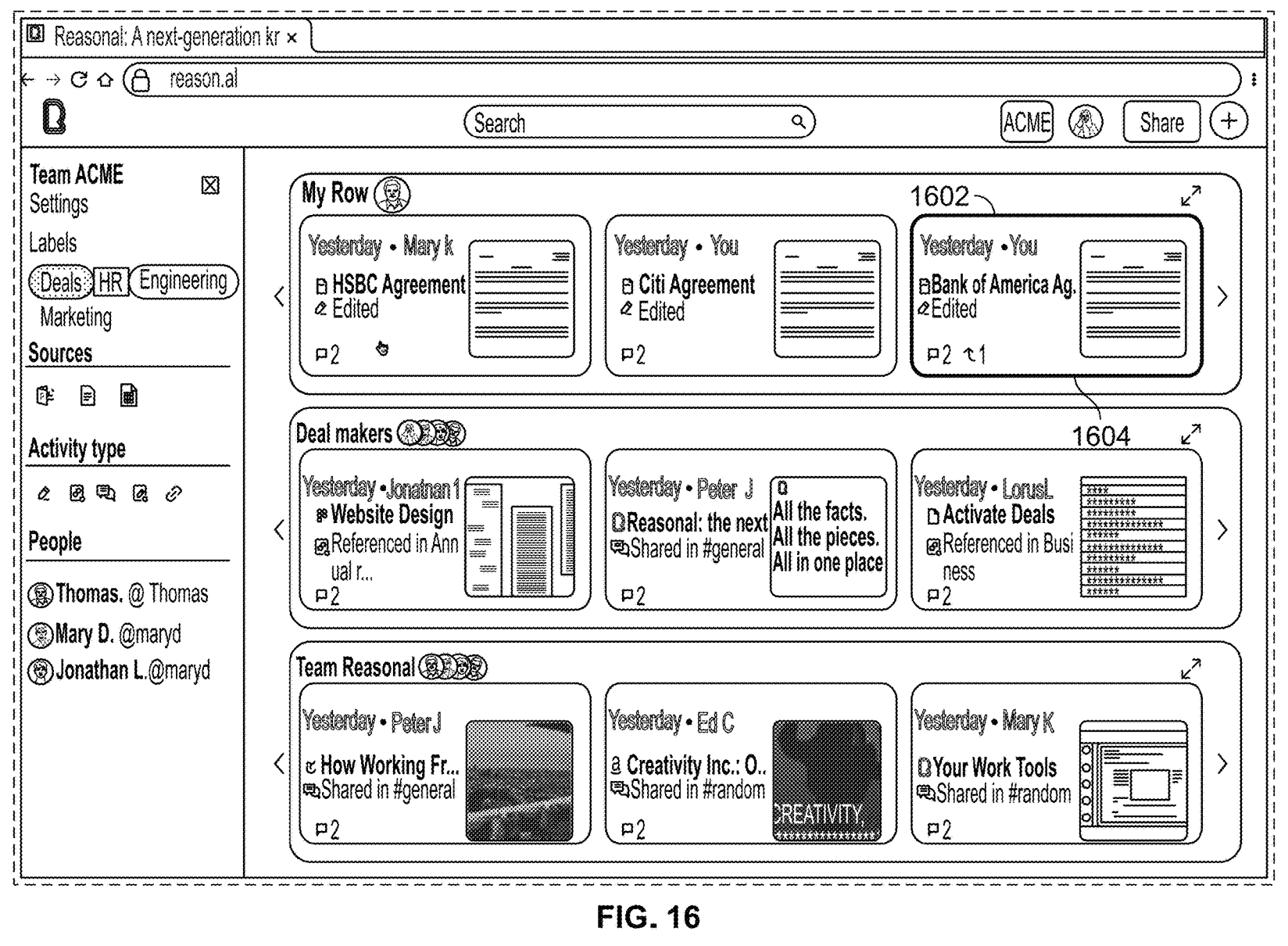

If Alice would like to propagate the change that she made in the HSBC document to the Citi Agreement she can click the checkmark (1508) to accept the change, or can reject the proposed change by selecting the x (1510). If she would instead or in addition like to review the change proposed by the predictive revision system to the Bank of America Agreement, she can return to the interface shown in FIG. 13 and select the appropriate link from region 1304 or 1306. She can also return to her dashboard (e.g., discussed in conjunction with FIG. 9), an updated view of which is shown in FIG. 16. Of note, content which has one or more outstanding recommended changes (such as the Bank of America Agreement) is now indicated in the interface with a box outline (1602) and also a badge (1604) indicating the number of outstanding proposed changes that Alice should review. Additional discussion of browser extension interactions are described below in Section V.

II. Example Infrastructure

Figure 17:
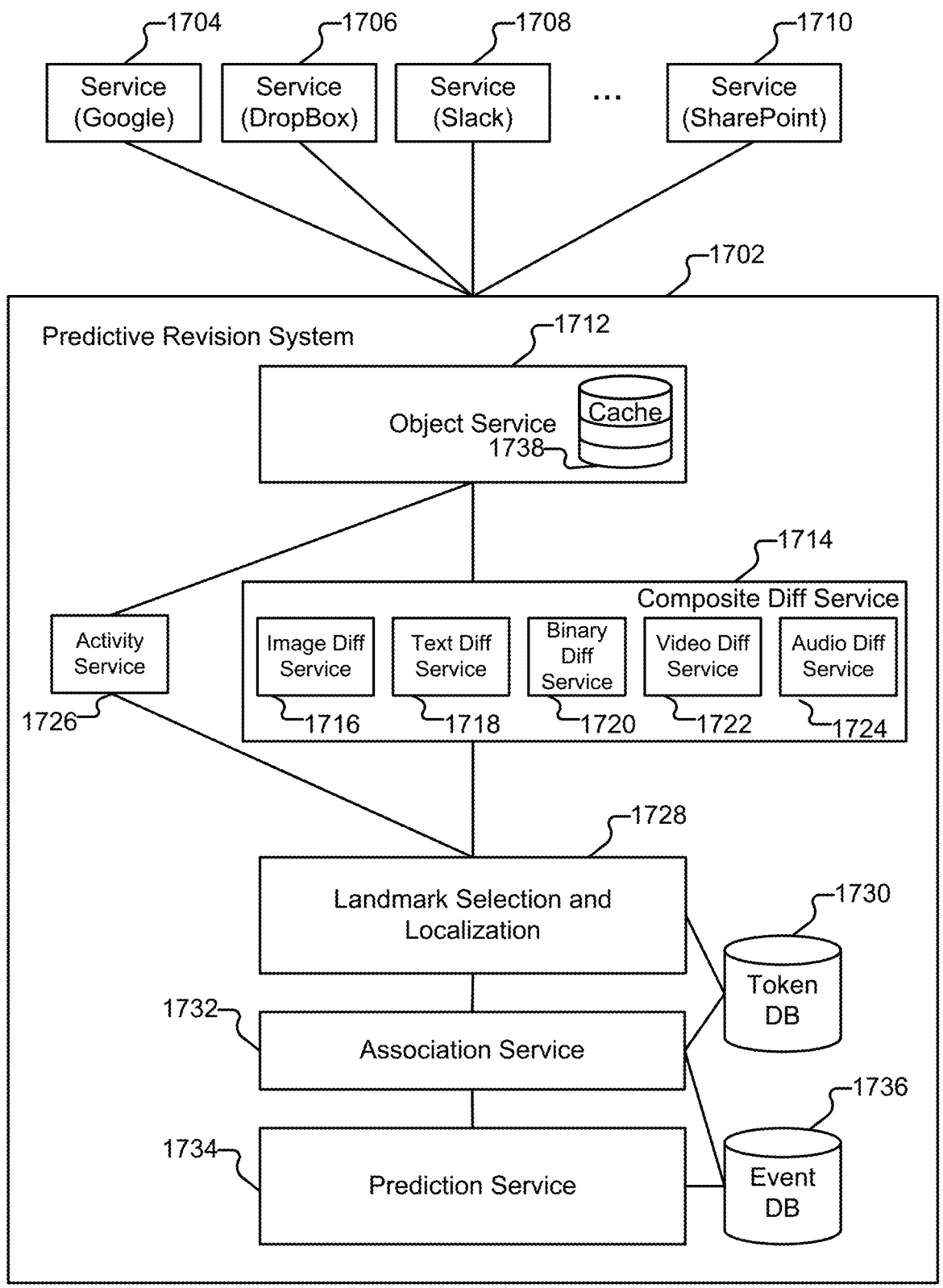
FIG. 17 illustrates an example of an embodiment of a predictive revision system.

FIG. 17 illustrates an example of an embodiment of a predictive revision system in accordance with various techniques described herein. In various embodiments, predictive revision system 1702 comprises one or more dedicated commercially available hardware servers (e.g., having multi-core processor(s), 32G+ of RAM, gigabit network interface adaptor(s), and hard drive(s)) running typical server-class operating systems (e.g., Linux). Predictive revision system 1702 (or portions thereof) can also be implemented across a scalable infrastructure comprising multiple such servers, solid state drives, and/or other applicable high-performance hardware. Predictive revision system 1702 can comprise several distributed components, including components provided by one or more third parties. For example, predictive revision system 1702 can be implemented as a set of microservices on a container orchestration cluster (e.g., built using the Flask micro web service framework with Kubernetes). Further, system 1702 makes use of a variety of types of storage, including scalable relational databases (e.g., Postgres or MySQL server), cloud object storage (e.g., Amazon S3, Google Cloud Storage, or Microsoft Azure Blob), and/or a key value pair store and associated indexing capabilities (e.g., Apache Cassandra, Amazon DynamoDB, Redis, or Elasticsearch). Whenever predictive revision system 1702 is referred to as performing a task, such as storing data or processing data, it is to be understood that a sub-component or multiple sub-components of predictive revision system 1702 may cooperate to perform that task.

Predictive revision system 1702 can work with a variety of third party content/collaboration services. Examples of such services are depicted as services 1704-1710 and include Google Drive (1704), DropBox (1706), Slack (1708), Microsoft SharePoint (1710), etc. As previously mentioned, examples of content that can be used in conjunction with techniques described herein include documents (e.g., Microsoft Word documents, Adobe Acrobat PDF documents, etc.), spreadsheets, images, videos, instant messages, emails, etc. Accordingly, while examples described herein are generally presented in the context of users editing documents, it is to be understood that the techniques described herein are not limited to documents and can be used with a variety of content, including mixed content (e.g., documents containing pictures or video).

As previously mentioned, during onboarding, historical revision information for any content associated with any of services 1704-1710 that a user has integrated with predictive revision system 1702 is imported into predictive revision system 1702. Any subsequent changes made to the user's content (e.g., as Alice authors a new document on service 1704 or revises an existing document on service 1704) are also tracked and analyzed by predictive revision system 1702, and can be incorporated into its predictions, as described in more detail below.

Some of services 1704-1710 provide updates about content revisions via a push-based (e.g., webhook) service, where the service informs system 1702 that an update to a content item (e.g., addition of new information or deletion of old information) has been made. One example is Slack (1708). Other services, such as Google (1704), provide pull-based updates. For these services, system 1702 periodically (e.g., every five or fifteen minutes) requests from the implicated service whether any updates are available, e.g., as a recurring Celery task. In various embodiments, object service 1712 is configured, for each of services 1704-1710, with instructions on how to retrieve content-related updates (e.g., via an applicable push or pull service). As applicable, object service 1712 can make use of one or more caches 1738 to minimize the number of calls made by object service 1712 to a given third party service (e.g., service 1704). When updates are received (e.g., as updated copies of content or as metadata describing the updates), object service 1712 provides the applicable information to composite diff service 1714.

Composite diff service 1714 determines differences between versions of content. Such differences can include the addition of elements, or the removal of elements. An example way of implementing composite diff service 1714 is using a standard diff code library, such as difflib (e.g., implemented in Python). As will be described in more detail below, the elements tracked by composite diff service 1714 are referred to herein as "tokens" (irrespective of file type). Composite diff service 1714 makes use of a variety of sub-services 1716-1724, each of which can determine differences between versions of different types of content. As illustrated in FIG. 17, examples of such sub-services include: image diff service 1716 (which can determine differences between two versions of an image), text diff service 1718 (which can determine differences between two versions of text), binary diff service 1720 (which can determine differences between two versions of a binary), video diff service 1722 (which can determine differences between two versions of a video), and audio diff service 1724 (which can determine differences between two versions of audio). As previously mentioned, a given piece of content might comprise multiple types of content. For example, an image file might include both text (which can be processed using optical character recognition) and pictures (e.g., of a corporate logo). Composite diff service 1714 analyzes the content and, as applicable, enlists sub-services 1716-1724 to assist in determining differences between versions of the content.

Some types of actions (e.g., creating a new document, moving a document from one folder to another, sending/receiving an email message, or sending/receiving an instant message) do not involve comparing two versions of content. When object service 1712 receives (e.g., via push or pull from an appropriate one of services 1704-1710) an indication that one of those types of actions has occurred, instead of passing that information on to composite diff service 1714, it is instead provided to activity service 1726.

Landmark selection and localization service 1728 identifies meaningful tokens in content and traces changes over time (e.g., through inserts of or updates to information about them in token database 1730). For example, "tokens" in a text document can comprise one or more characters; "tokens" in an image can comprise objects or superpixels; "tokens" in audio files can comprise phonemes, etc. One way of implementing landmark selection and localization service 1728 is (in the case of text-based information) the Python Natural Language Toolkit. As another example, OpenCV can be used to perform landmark selection and localization on images (e.g., via Scale-Invariant Feature Transform (SIFT)). In various embodiments, a token is a uniquely identifiable element in a document. A token can be added or deleted (as determined by composite diff service 1714), or it can appear in a message (as determined by activity service 1726).

Portions of two example documents that Alice is working on are illustrated, respectively, in FIGS. 18A and 18B. FIG. 18A depicts a portion of a document from ACME's product department showing price listings for various materials and services and FIG. 18B depicts a portion of a contract. Examples of tokens present in these two documents are "1489" (1802) and "Service support call" (1804). In various embodiments, token instances are name-spaced to documents they belong with. Token instance 1802 is different (and differentiable) from token instance 1852 even though they both comprise the amount, "$1489." Timelines for related tokens (e.g., additions and deletions) are tracked separately but can be associated with one another (e.g., by association service 1732) so that recommendations can be made (e.g., using prediction service 1734).

An example schema for storing tokens (using JSON and a DynamoDB) is depicted in FIG. 19. The "token" field is a combination of a unique identifier for an organization (e.g., ACME's identifier) and the token itself (e.g., "1489" or "Service support call"), separated by a slash. The "document id" field is an identifier for in which document the token entry takes place (e.g., an identifier for the price sheet or contract). The "document_prefix" field is a filepath prefix used for accessing a serialized document object (e.g., stored by object service 1712 in infrastructure such as Amazon's S3). The "token_instances" field is a list of variable length containing an instance tuple for each occurrence of the token in the document. The first portion of the tuple is "created_revision" which is a datetime identifier for the revisions in which the token instance was created in the document. The "created_start_index" is a character index within the document at which the token instance was created in the "created_revision." The key indicates the type of entry: "S" is a string, "N" is a number, "L" is a list, and "M" is a map. The table is indexed by tokens in each organization and each instance of a token is identified by referring to the revision the token was created (e.g., using a unique identifier provided by the storage provider) and the position (character index) of the token when it was first introduced. The same token, or a similar token (as determined by association service 1732 as applicable), may be present in more than one file (e.g., token 1802 is also present as token 1852). As applicable, other kinds of indexing schemes can also be used for different types of content (e.g., images).

Suppose that as Alice initially works on the contract document illustrated in FIG. 18B, the stated price of the "Silver Package" is "$2489 Per Annum." She learns (e.g., from a colleague, Bob) that the price of the package has changed and that she needs to update her document to reflect that. She makes the change (e.g., from "2489" to "1489") to what is also referred to herein as the "source document" as illustrated in FIG. 20A. Any other locations (e.g., in related content), also referred to herein as "target documents," where that change should be surfaced as recommended changes can then be identified by predictive revision system 1702 and presented as update notifications, as illustrated in FIG. 20B.

FIG. 21 illustrates sample JSON for representing an update notification in connection with the recommended action shown in FIG. 20B. In this example, the "LOCATION" in the case of textual differences is represented as the character index in the document, ignoring the whitespace and formatting. The same JSON can be used to cancel previously generated update notifications when, e.g., the recommended change has been made (e.g., to the target document) or the change has been undone in the source document, by modifying the "action" field from "initiate" to "cancel." The "activity.metadata.changes" field contains contextual data (e.g., what text appears before or after the added/deleted token) to visually represent the differences for the user in an interface (e.g., served by predictive revision system 1702). The core change that has been made is saved in "activity.metadata.contents."

A variety of approaches can be used to tokenize content and find landmarks. One example way (which can, e.g., be used by landmark selection and localization service 1728) is as follows and is described in the context of text documents. Similar and/or other approaches can be used for other types of content (e.g., images, sounds, videos, etc.). Example input (e.g., to landmark selection and localization service 1728) is as follows:

- A previous (old) and current version of the document (converted or exported to HyperText Markup Language (HTML) or other appropriate format reducible to text). The old version of the document can be blank (e.g., where a new document is being created).
- An identifier that uniquely identifies the particular version of the file (e.g., assigned by a cloud storage platform).
- A unique identifier for the organization.

Next, predictive revision system 1702 (e.g., via landmark selection and localization service 1728) performs any applicable pre-processing of the input current version of the file. Examples of this can include:

- Extract all embedded images and replace them with a data UI-based hyperref.
- Extract all embedded hyperref links in the document and include them as plain-text in the body of the text.
- Convert the text into a series of tokens by separating based on word boundaries.
- Calculate a difference between the tokens of the old and new versions by using an appropriate tool (e.g., difflib).

Now, for each "n" in [1, 2, . . . , N], for all n-sized consecutive tokens in the new additions:

- Check if the token is a landmark (e.g., is likely to be a relevant token that can be traced). Example criteria for being a landmark include: (1) is its inverse-documentfrequency less than a threshold? (2) is it an International Bank Account Number? (3) is it a currency amount? (4) is it a recognizable date/time? (5) is it a URL? As applicable, landmark selection can be customized (e.g., per tenant, per industry, etc.).

If the n-gram token is a landmark, insert the token into the token table (e.g., stored in token database 1730). The location of each token is tied to both the revision it first appears in and its character position in the document. As previously mentioned, examples of tokens that can be processed in accordance with this approach include token 1802 ("1489") and token 1804 ("Service support call"). Less relevant tokens (e.g., ones not identified as a landmark) are not inserted. A document can itself be a token (e.g., by using its URL as a token). If, for example, Bob emails Alice a link to a particular document and Alice has configured predictive revision system 1702 to work with her email provider, activity service 1726 can associate the action of the URL appearing in the email as associated with the token.

In this example, only additions are processed. Due to the indexing scheme (remembering the character location and revision identifier of when a token was introduced in a document), deleted tokens do not need to be re-localized. Further, multiple tokens with different lengths can start at the same location in a text document (e.g., "Service, "Service support," and "Service support call" could all be valid tokens determined by landmark selection and localization service 1728 and stored in token database 1730 for the document shown in FIG. 18A).

Returning to the example infrastructure depicted in FIG. 17, association service 1732 is configured to take the set of tokens that have a changed state (e.g., as determined by landmark selection and localization service 1728) and generate a set of events that it stores in event database 1736. One way of implementing association service 1732 is as a Python program running inside a container, configured to receive information from landmark selection and localization service 1728 via Amazon Simple Queue Service. And, in an example implementation, event database 1736 is a DynamoDB database and each token has an array of events that are associated with the token. The keys in the DynamoDB table are the organization's identifier, the revision identifier, the file identifier, and the actual token identity. Examples of state changes include the addition of a token to a document, the deletion of a token from a document, and the movement of a token from one position to another within a document. Association service 1732 can use occurrence of those events to identify other instances of tokens (whether those tokens are present within the same document or in other documents) for which that state change may be relevant. As one example, when Alice modifies the price of the Silver Package in one document (e.g., as shown in FIG. 20A), association service 1732 can identify other associated tokens (e.g., other instances of "2489 Per Annum" elsewhere in ACME's documentation corpus).

A variety of approaches can be used to implement association service 1732 to identify sets of tokens that should be associated with one another. A first example way would be for association service 1732 to locate instances of tokens in other documents that are exact content matches (e.g., with a change to a source document causing association service 1732 to locate any other documents containing the same string (e.g., "$1489 Per Annum")). An alternate way is for association service 1732 to use a threshold Jacquard similarity in determining whether two tokens should be associated (e.g., "$1489 Per Annum" as a token occurring in one document might be associated with "$1489 Annually" in another document). Other techniques can also be used, whether based on heuristics, machine learning, or combinations thereof.

In various embodiments, prediction service 1734 generates/updates predictions whenever new events are added to event database 1736. A variety of techniques can be used to implement prediction service 1734. One example is to use a neural-backed decision tree approach. As previously mentioned, predictive revision system 1702 can potentially access all revision history information for a corpus, including revisions made by Alice prior to onboarding with predictive revision system 1702. And, if Alice does not herself have a revision history (e.g., suppose she is a brand new ACME employee), other revision histories (e.g., made by other ACME employees to the corpus previously) can be used initially. As applicable, inductive bias can be used by prediction service 1734 so that if insufficient data exists (e.g., there is little or no timeline information available), recommendations are not surfaced to a user (e.g., until a threshold amount of confidence in the quality of the predictions is met). As one example of inductive bias, predictive revision system 1702 can be used to analyze a user's complete corpus for initial training, but only consider recently changed documents when making predictions. Further, the revision histories of different kinds of content hosted with a plurality of services can be interleaved by predictive revision system 1702 (e.g., to correlate deletion of a token in a document hosted by service 1704 with a recommendation that a file on service 1710 be created or moved, etc.).

Prediction service 1734 uses revision history information (e.g., by using it to train a model) to predict when a change will likely be made to a first token based on a change made to another token. If a change meets appropriate criteria, it can be used to generate a suggestion for the user. As one example, suppose ACME is acquired by a new company (Beta Corp.) and that one of Alice's tasks is to revise ACME documentation to reflect the acquirer's name. When Alice edits a first document to remove references to ACME and insert references to Beta Corp., prediction service 1734 will potentially not have high confidence that ACME should be replaced with Beta Corp. in other documents/locations. However, as she continues to modify ACME's document corpus in a similar manner, prediction service 1734's confidence that ACME should be replaced with Beta Corp. will likely increase, and prediction service 1734 can help Alice identify documents where the change should also be made. Prediction service 1734 can also take other actions in addition to/instead of, for example, providing recommended changes (e.g., as are illustrated in FIG. 20B). As one example, prediction service 1734 can generate alerts (e.g., using service 1708) that particular changes meeting a set of criteria have occurred or are likely to occur. As another example, prediction service 1734 (e.g., upon identifying that the addition of a token to one document (e.g., "Final offer") correlates highly with the creation of a new document (e.g., "new customer onboarding")) can help automate workflows (e.g., by creating documents or recommending documents be created).

One approach to training prediction service 1734 is to fix association service 1732 and train by replaying events. Model accuracy can be measured by checking predictions against ground truth outcomes. Complementarily, if prediction service 1734 is fixed, it can be used to improve association service 1732. Other sources of training data can also be used in addition to/instead of user data obtained from services 1704-1710. As one example, Wikipedia contains a large amount of history-tracked textual additions and deletions and can also be used, e.g., to generate models used by embodiments of prediction service 1734. An example approach to implementing training for prediction service 1734 is to use a point process-based modeling tool (e.g., Python PySAL). Additional information regarding embodiments of predictive editing models that can be used in conjunction with techniques described herein are provided below in Section IV.

III. Example Process

Figure 22:
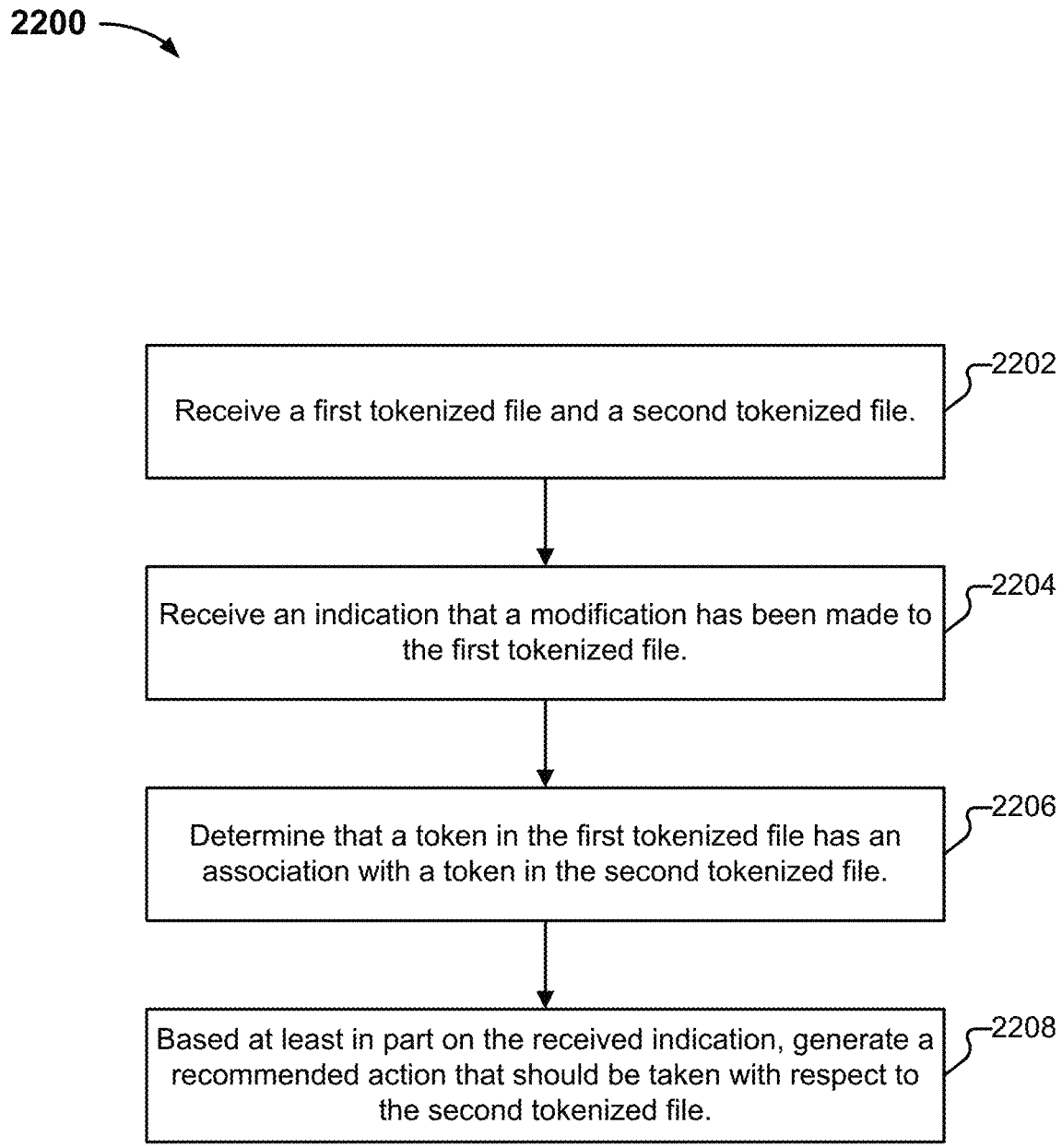
FIG. 22 illustrates an example of a process for determining a recommendation to make regarding a file, based on a prediction.

FIG. 22 illustrates an example of a process for determining a recommendation to make regarding a file based on a prediction. In various embodiments, process 2200 is performed by predictive revision system 1702. The process begins at 2202 when a first and second tokenized file are received. As one example, such files are received at 2202 when Alice onboards with predictive revision system 1702 and the documents depicted in row 904 of interface 900 are processed by predictive revision system 1702 (e.g., by landmark selection and localization service 1728). At 2204, an indication is received that a modification has been made to the first tokenized file. An example of receipt of such an indication is described in conjunction with the update notification depicted in FIG. 21. At 2206, a determination is made that the first token in the first file has an association with a second token in the second file. Techniques for performing such a determination of such an association are described, for example, as being performed by association service 1732 above. Finally, at 2208, a recommended action to take with respect to the second tokenized file is generated. An example of such a recommended action being presented to a user is described throughout and illustrated, for example, in FIG. 20B.

IV. Predictive Editing Models

This section provides additional information regarding various aspects of predictive editing models usable in conjunction with embodiments of techniques described herein. The following are notions used in the discussion:

Org (o): An organisation which scopes all the predictions.

Document (d): A collection of tokens which may be added or removed over time. An organisation can have many documents.

Token instance ($\tau$): An atomic element in the document. Tokens can overlap and can vary based on the kind of document: sequence of alpha numeric characters for text documents, super-pixels or objects identified for image documents, sequence of phoneme for audio files, etc.

As previously explained, one task that can be performed by association service 1732 is identifying which token instances are associated with one another. The association can be based on whether the tokens are exactly the same (e.g., unique names such as "Wells Fargo"), have high semantics similarity (e.g., using SBERT embeddings), if they are visually similar (e.g., histogram distance), or metadata information (e.g., edits made by the same person or to the same document). Whenever two instances are connected, the events happening to one token instance (e.g., an addition and possibly a deletion) will appear on the timeline of the other instance. The evolution of one document and one token instance in that document is illustrated in FIG. 23.

Figure 23:
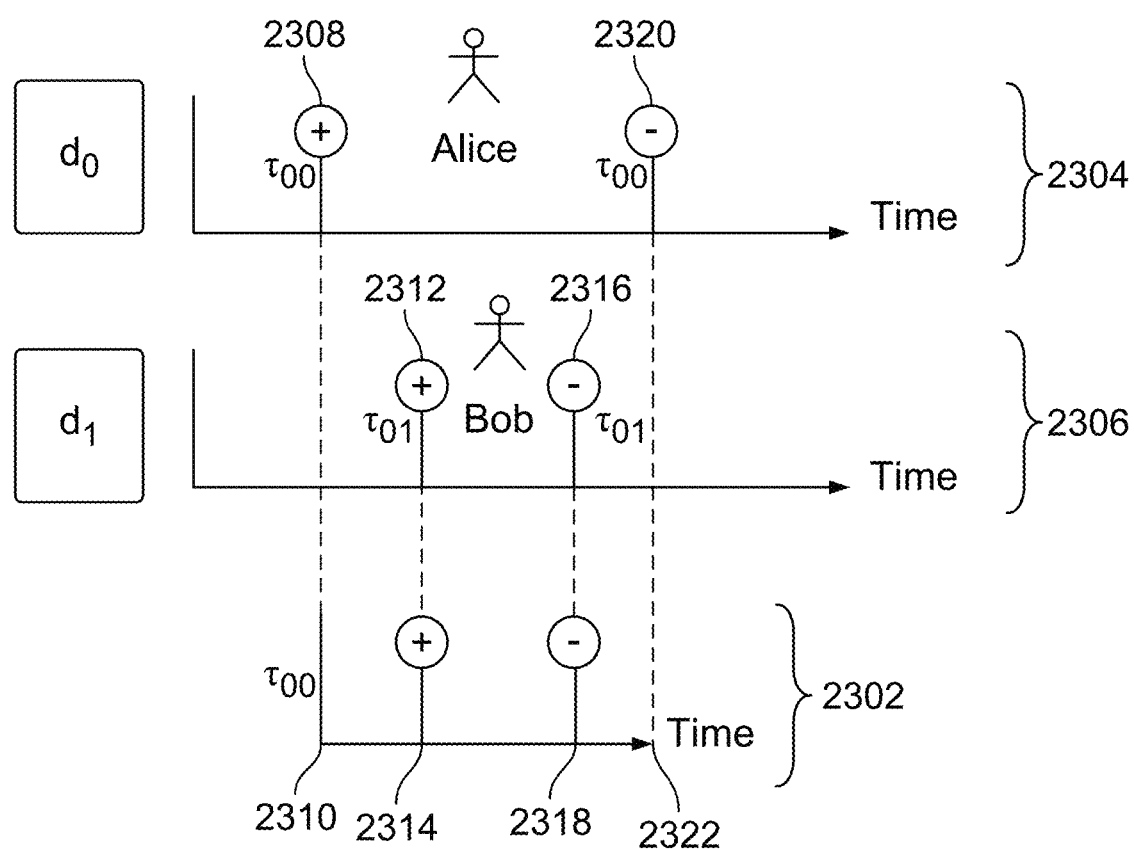
FIG. 23 is a schematic representation of a timeline of a token instance.

FIG. 23 is a schematic representation of a timeline (2302) of a token instance. The events are extracted from modifications made by Alice and Bob in two different documents, $d_0$ (2304) and $d_1$ (2306), showing respective events of an associated token. As illustrated, Alice adds a token, $\tau_{00}$ to document $d_0$ (2308). In this notation, $\tau_{00}$ is an instance of a token $\tau_0$ added to document $d_0$. Next, a timeline is created for $\tau_{00}$ (2310). Subsequently, another user, Bob, adds the same token, $\tau_{01}$ to another document $d_1$ (2312). This event is registered on the timeline of token $\tau_{00}$ (2314). At some later stage, Bob updates document $d_1$ and removes the token $\tau_{01}$ (2316). This deletion event is also registered on the timeline of $\tau_{00}$ (2318). Finally, Alice removes token $\tau_{00}$ from document $d_0$ (2320). At this point, the timeline of $\tau_{00}$ terminates (2322) and no new event is registered on this timeline.

A predictive task in this scenario is to determine when the deletion event occurs for token $\tau_{00}$. The process of deletion event can be modeled with the following temporal point process model:

$$\lambda(t) = \{\text{event in}[t, t+dt]\} = E[dN(t)]$$

In this formulation, $N(t) \in \{0,1\}$ indicates a number of deletion events for a particular token. A token can only be deleted once and, therefore, this point process is an instance of a survival model.

The likelihood function, or the utility function for which maximization is sought, for this model can be written as:

$$\text{Log Likelihood}(\{\tau_1, \tau_2, \ldots, \tau_n\}) = \Sigma \log \lambda_i(\tau_i | H(t)) - \int_0^{\tau_i} \lambda_i(\tau_i | H(t)) dt$$

Here $H(t)$ denotes the history of events appearing on a token's timeline and the sum is taken across all tokens in the entire Org.

If this function is differentiable, learning the parameters of the model from historical data can always be done using stochastic gradient descent efficiently. The following are different example ways that the intensity function can be formulated:

Model A

The function can be defined as follows:

$$\lambda_i(t) = (1 - N(t)) f_\theta(\tau_i)$$

In this model, the likelihood that a token is deleted is solely determined by characteristics of the token itself. In other words, any events associated with the timeline of the token $\tau_i$ are ignored. The function $f_\theta(\cdot)$ has parameters $\theta$ and can either be analytical or represented as a neural network. The token itself can be represented using a feature derived from its content (e.g., the words and characters) and its metadata (e.g., the document it belongs to, the time of edit, identity of the editor, etc.).

Model B

In this model, the likelihood of a token being deleted by the token $\tau_i$ is characterized, as all other events and associated contexts on the timeline of the token $\tau_i$. Both $\theta$ and $\omega$ are learnable parameters and $f_\theta(\cdot)$ and $g_\omega(\cdot)$ are any differentiable function:

$$\lambda_i(t | H(t)) = (1 - N(t)) f_\theta(\tau_i) + \sum_{(\tau_j, t_j) \in H(t)} g_\omega(\tau_j, t_j)$$

Model C

The likelihood function of a point process depends on the rate function $\lambda$ and its integral over time t, $$Z_i = \int_0^T \lambda_i(t | H(t)) dt.$$

in this approach, $Z_i$ is directly modeled. The derivative with respect to time can then be taken to find the implied rate of events:

$$\lambda_i(t) = \frac{dZ_i(t)}{dt}.$$

Figure 24:
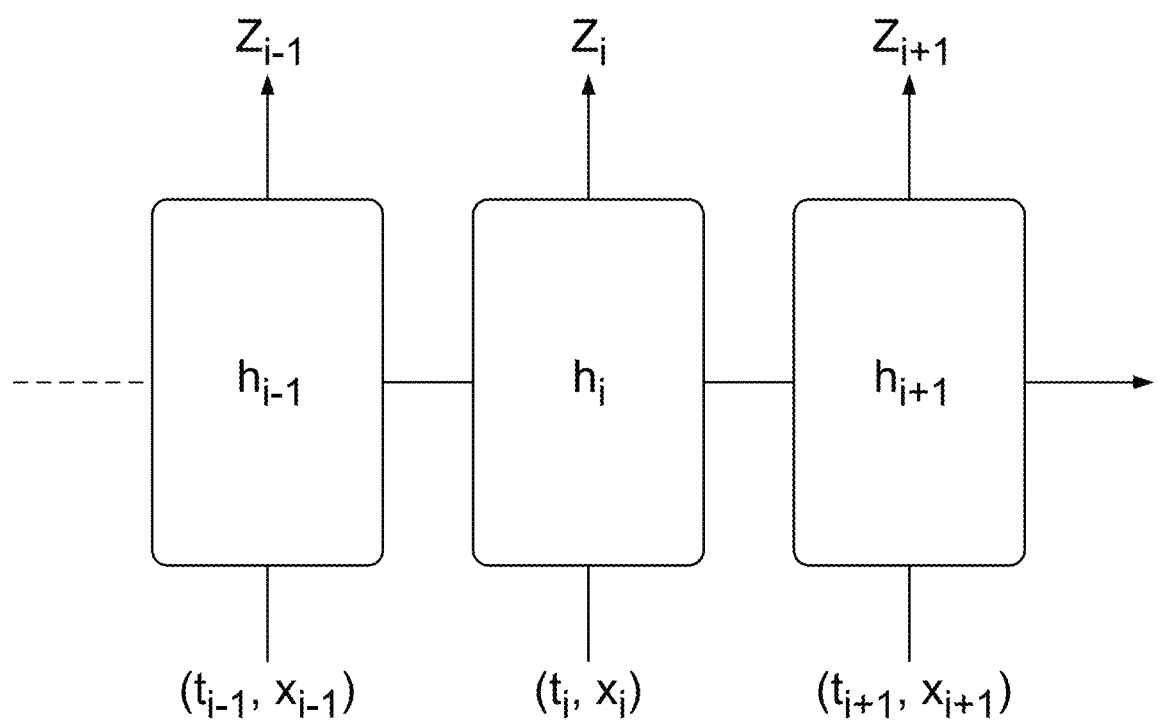
FIG. 24 is a schematic representation of a recurrent neural network.

A Recurrent Neural Network (RNN) model can then be used to learn $Z_i$, where for each time step, a vector representing the state predicts the variable $Z_i$ as shown in FIG. 24. The $t_i$ indicates the time the event happened and $x_i$ indicates a unified feature vector representation of the event, which may contain information about the token (e.g., SBERT embedding) and the metadata (e.g., identity of the user making the edit). As a very similar model, the recurrent neural network can be replaced with a transformer network to similarly learn $Z_i$.

V. Additional Browser Extension Information

Figure 25:
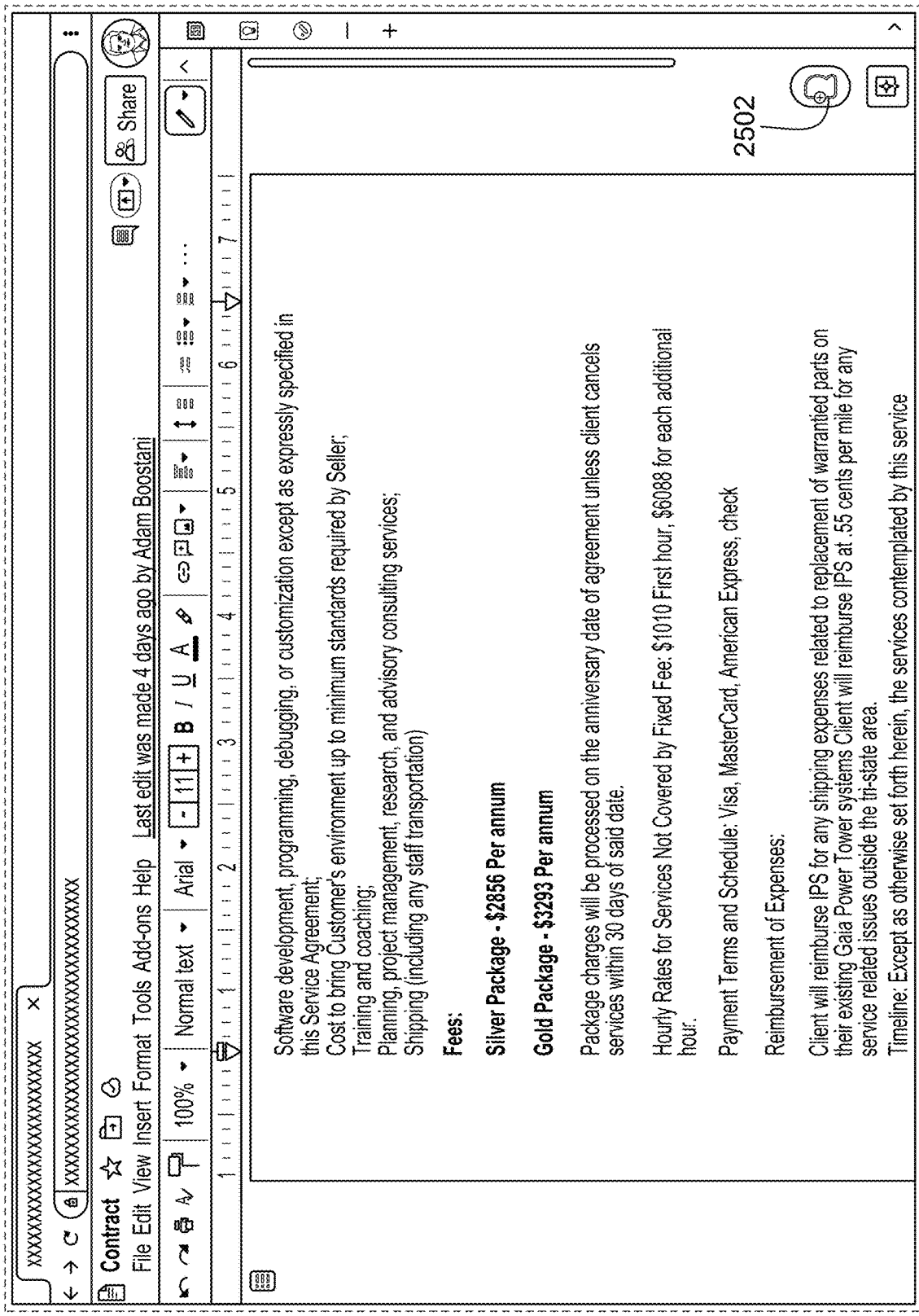
Figure 26:
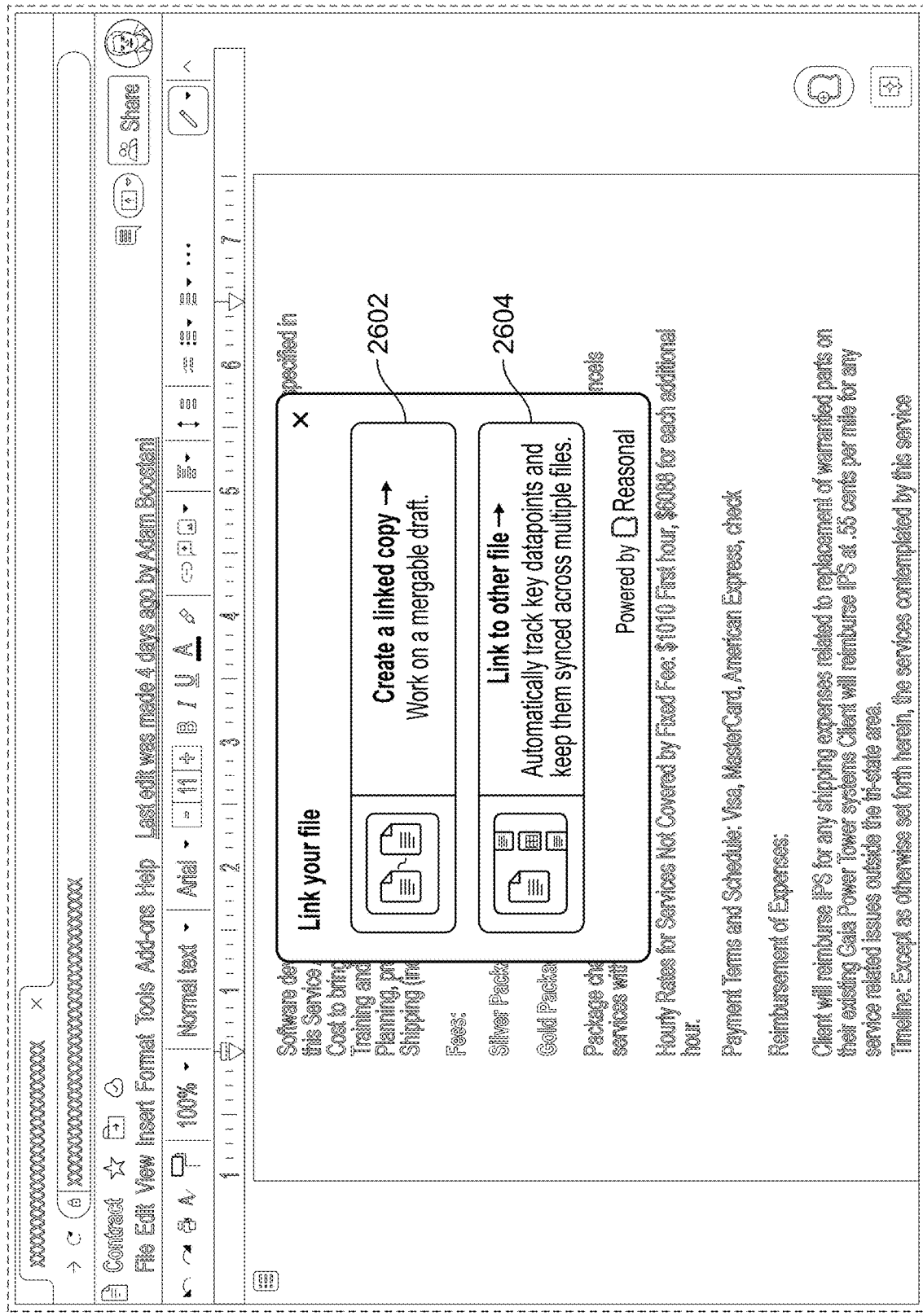

This section describes various alternate/additional functionality provided by embodiments of a browser extension working in conjunction with system 1702. Suppose Alice is editing a document, a portion of which is depicted in FIG. 25. Alice would like to make a copy of the document (pertaining to a first customer) and revise it so that it is applicable to a second customer. When Alice clicks on the icon in region 2502, she will be shown the interface depicted in FIG. 26. If she selects option 2602, a sandboxed copy of the existing document will be created, where she can make edits (e.g., changing references to customer names). If she selections option 2604, she can link the document shown in FIG. 25 to an existing copy of a document. Depending on which choice she makes, the document shown in FIG. 25 will be linked to either a new document or an existing document, and common elements (e.g., localized pricing information tokens) will be linked in accordance with techniques described above (e.g., by association service 1732).

Figure 27:
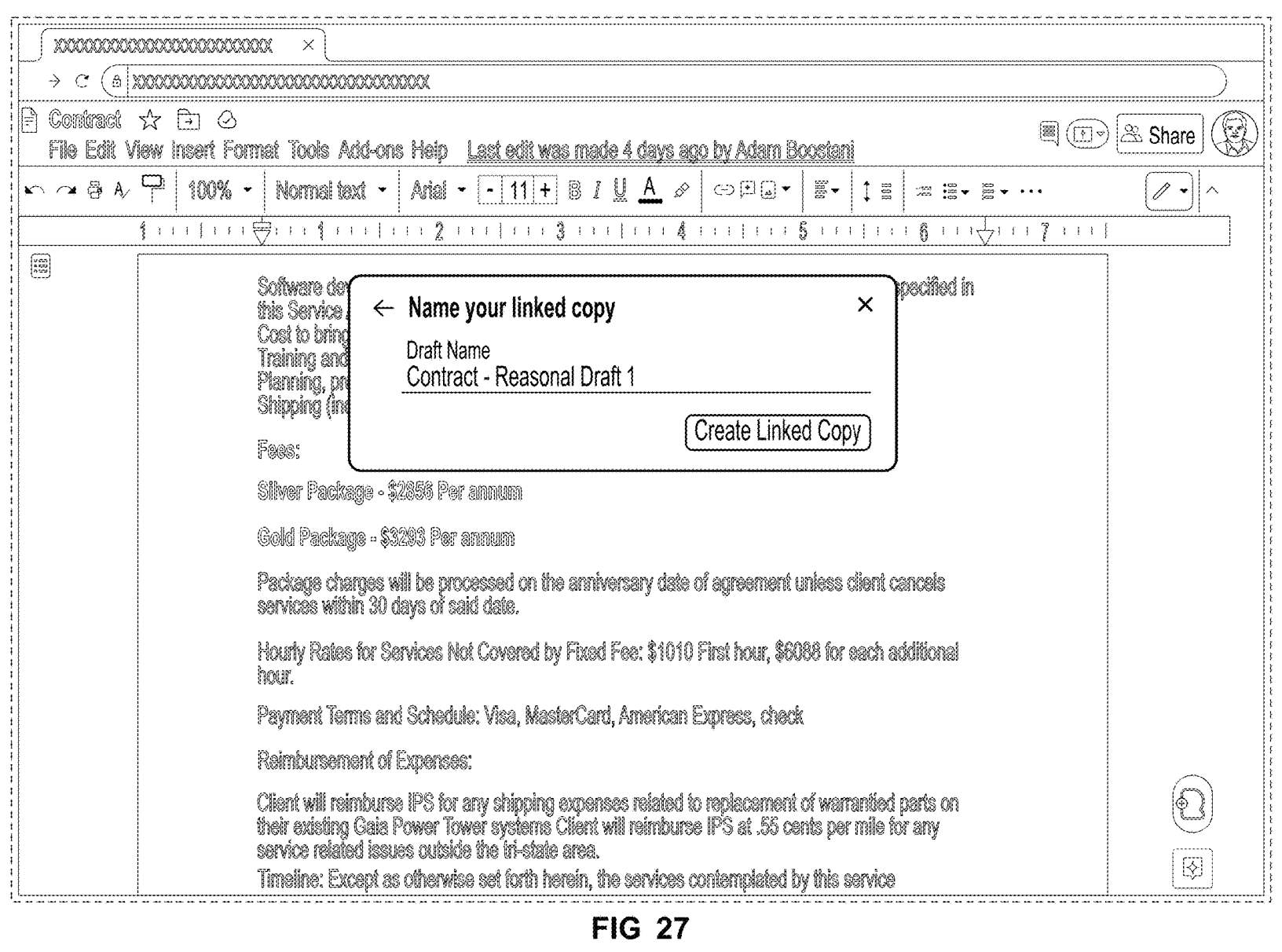
Figure 28:
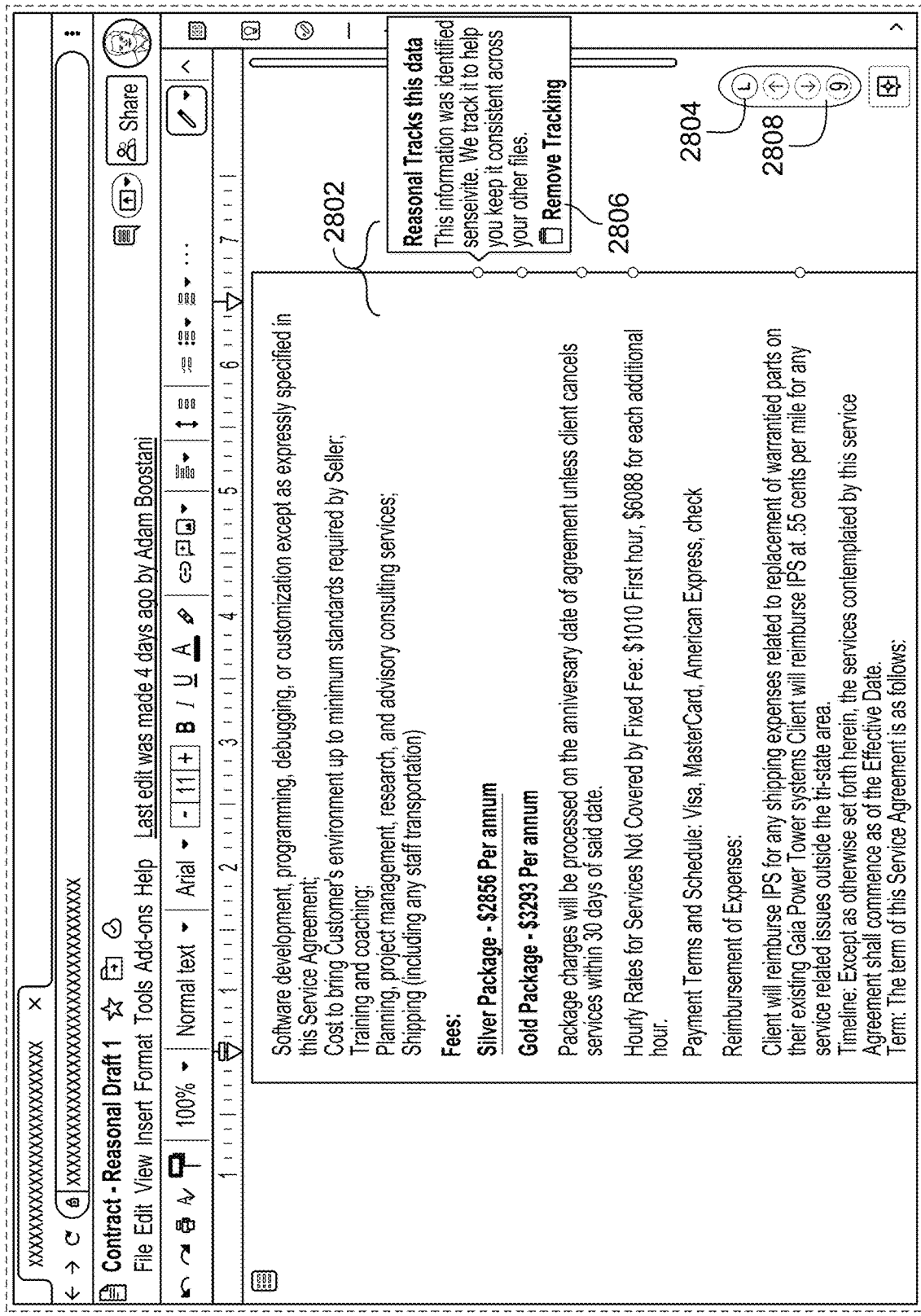
Figure 29:
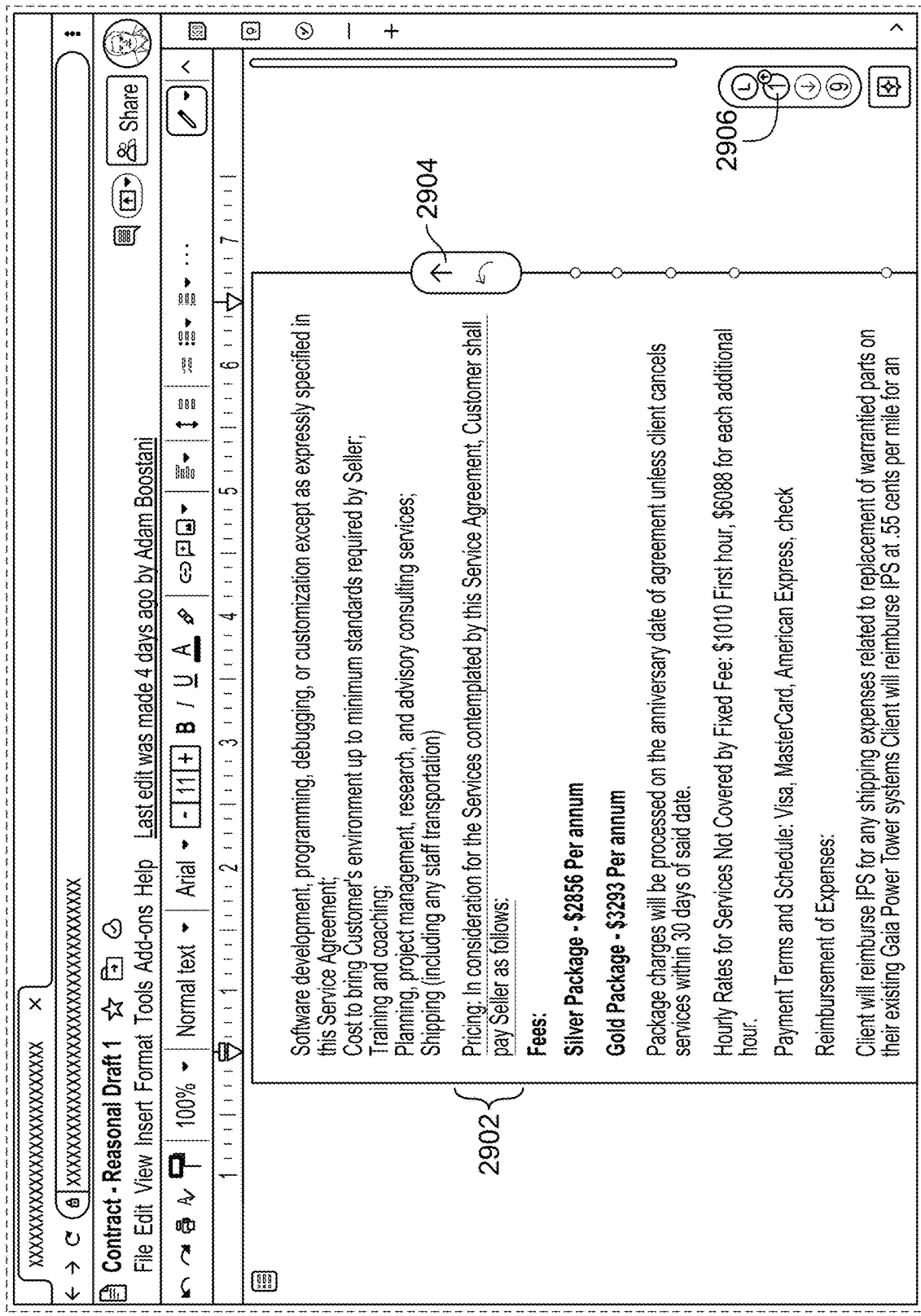
Figure 30:
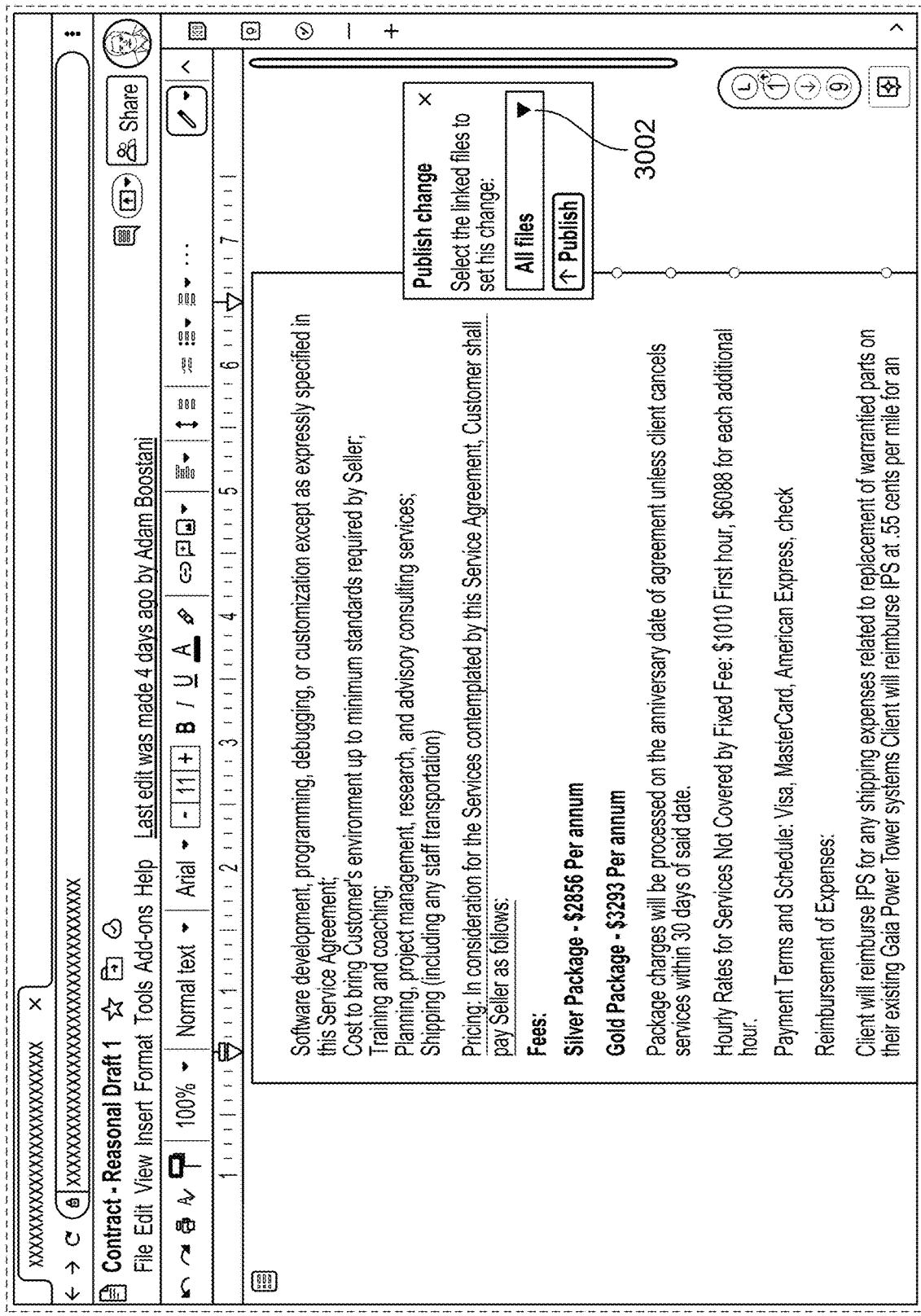
Figure 31:
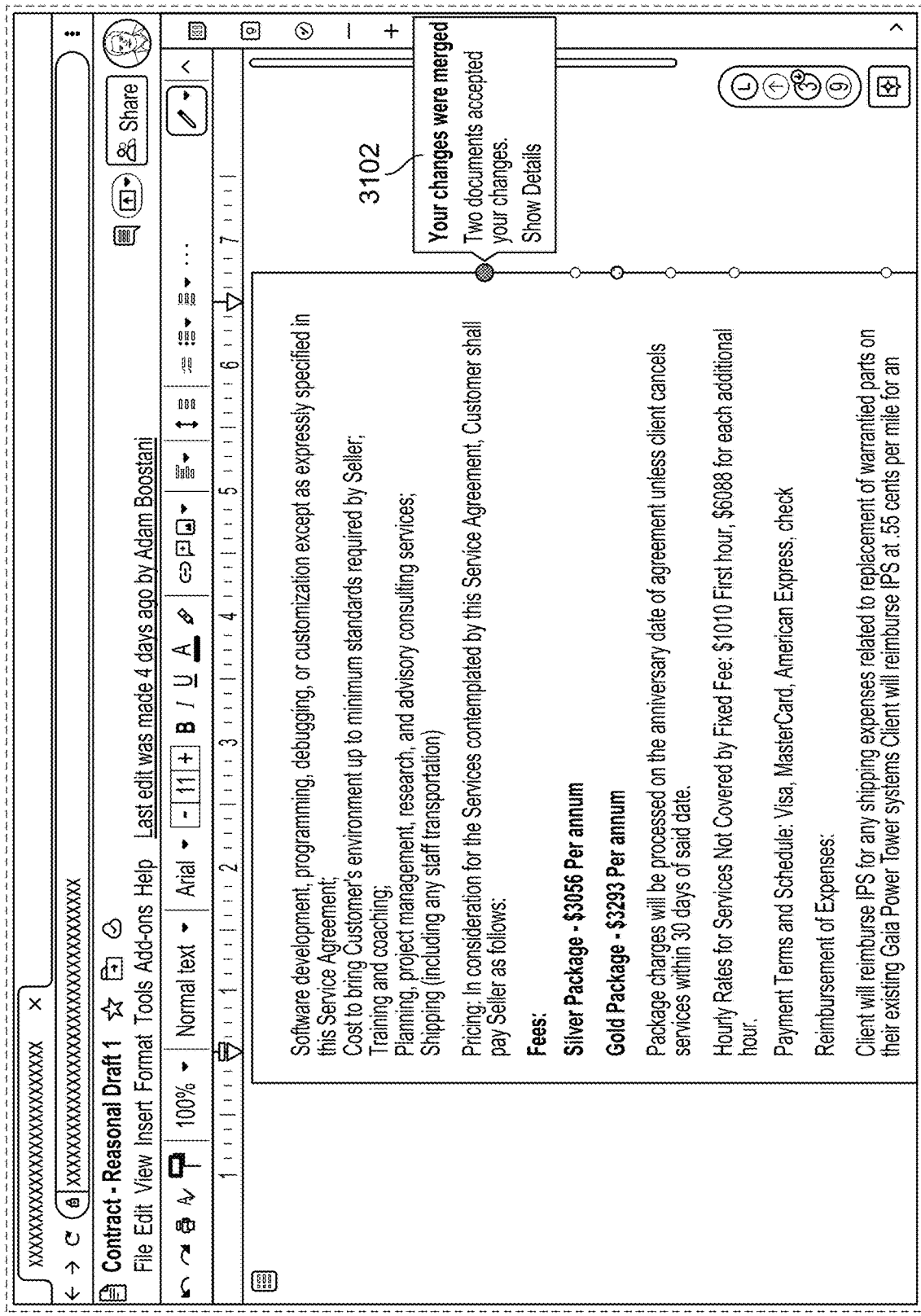

As shown in FIG. 27, Alice has selected option 2602. She is asked to provide a name for the new document. FIG. 28 illustrates Alice editing a copy of the document shown in FIG. 25. Portions of the document that are tracked are indicated by dots in region 2802. The dots shown in region 2802 can be determined by the association service, and, in various embodiments, can also be determined by simulating changes in other documents and tracking the impact in those other documents (e.g., if the change to "Silver package" is made in other documents, where do the updates occur). The "L" in region 2804 indicates that the current document is linked to one or more other documents. The "9" in region 2808 indicates the total number of tracked tokens in the document. If Alice does not wish for certain portions of the current document to be linked with other documents, she can interact with region 2806. Suppose, as illustrated in FIG. 29, Alice inserts a new sentence into region 2902 of her document. When she does so, the browser extension will offer her the ability to make a similar change to any linked documents, by clicking on the up arrow in region 2904. The count of total number of available edits to push to linked documents is also indicated in region 2906. As shown in FIG. 30, Alice has clicked on the up arrow indicated in region 2904 of FIG. 29. She can choose to push the change to all linked documents, or to a subset of linked documents, by interacting with region 3002. If/when the proposed changes are accepted into other documents, Alice will be presented with a notification such as is shown in region 3102 of FIG. 31.

Figure 32:
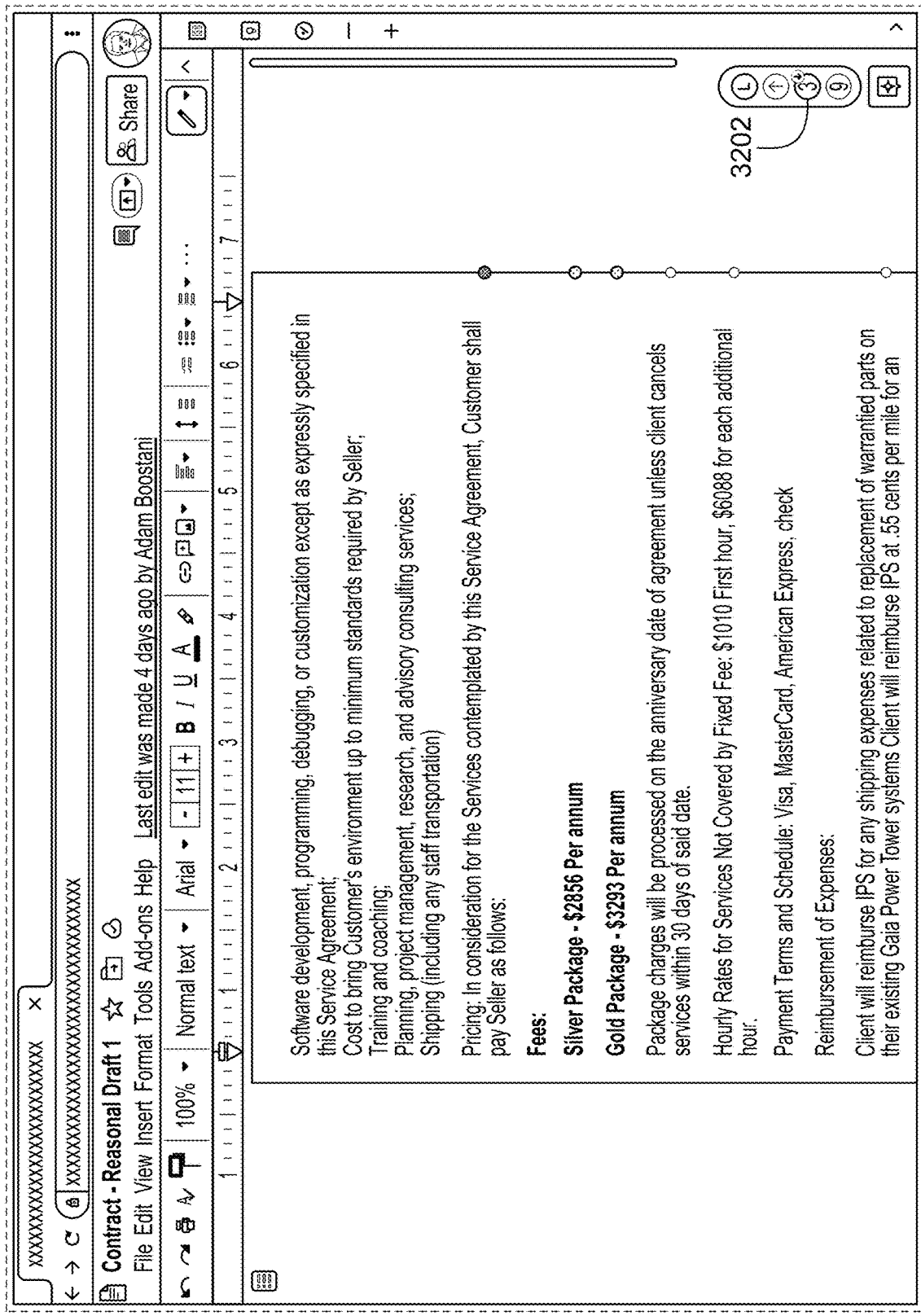
Figure 33:
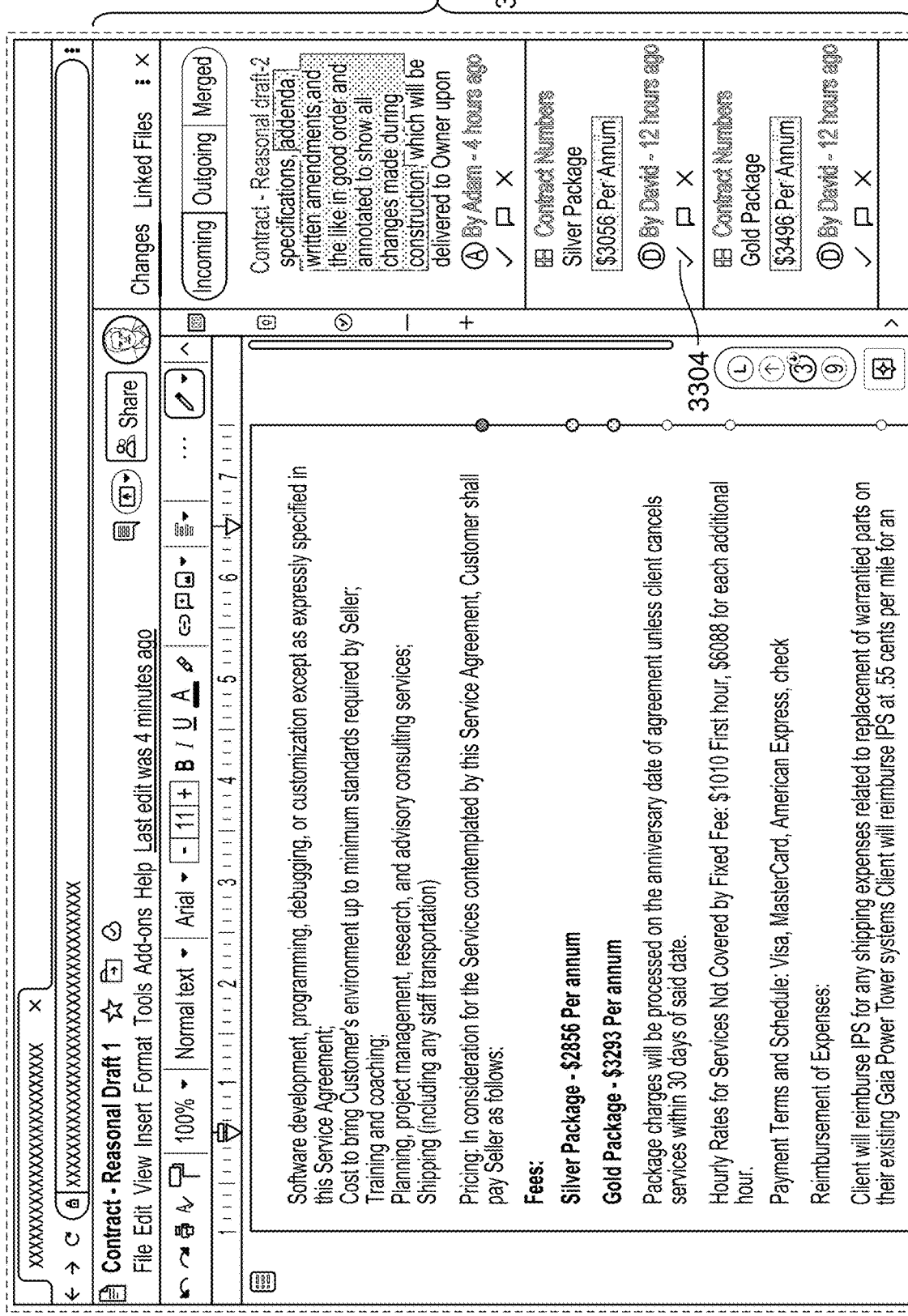
Figure 34:
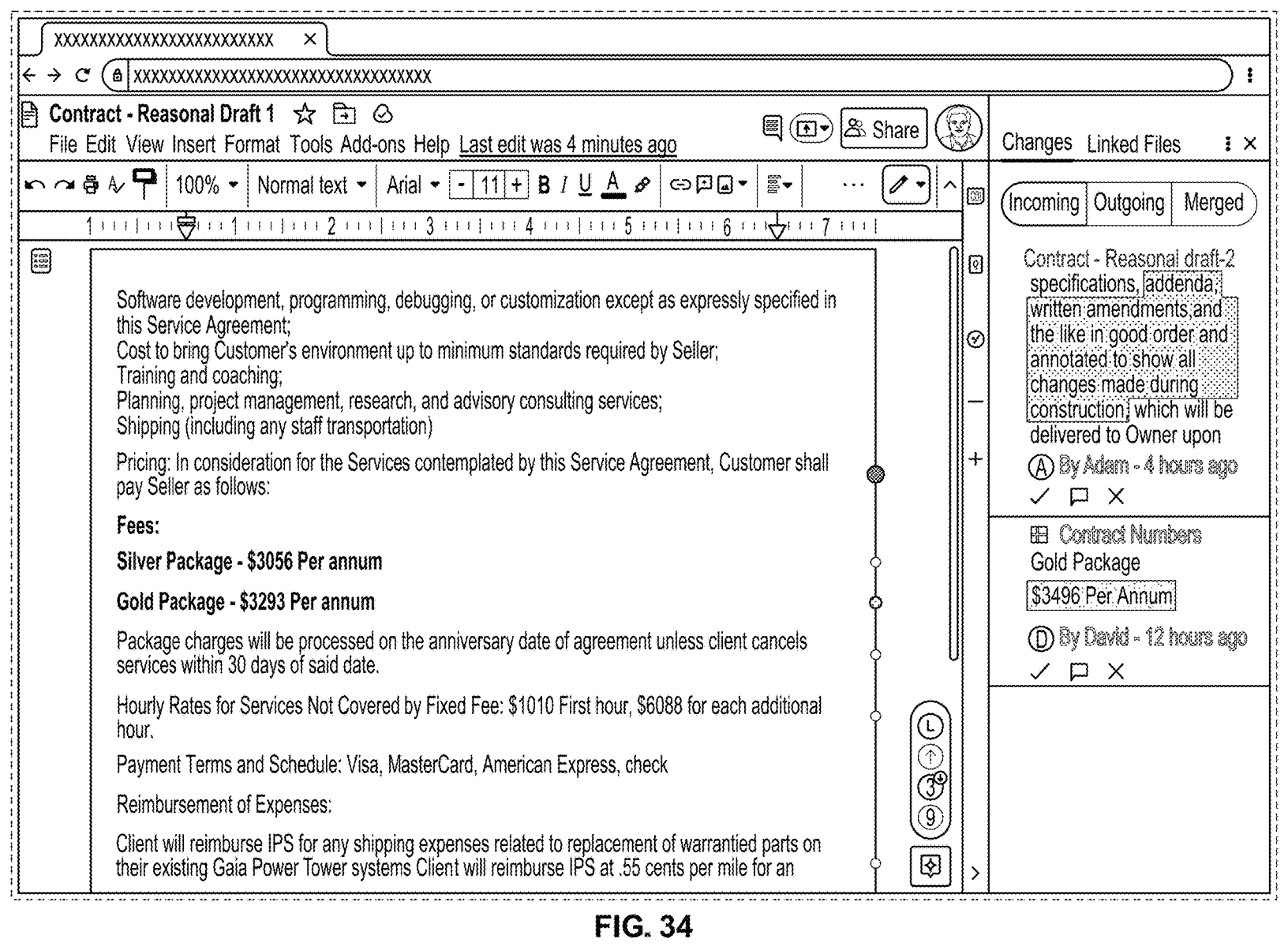
Figure 35:
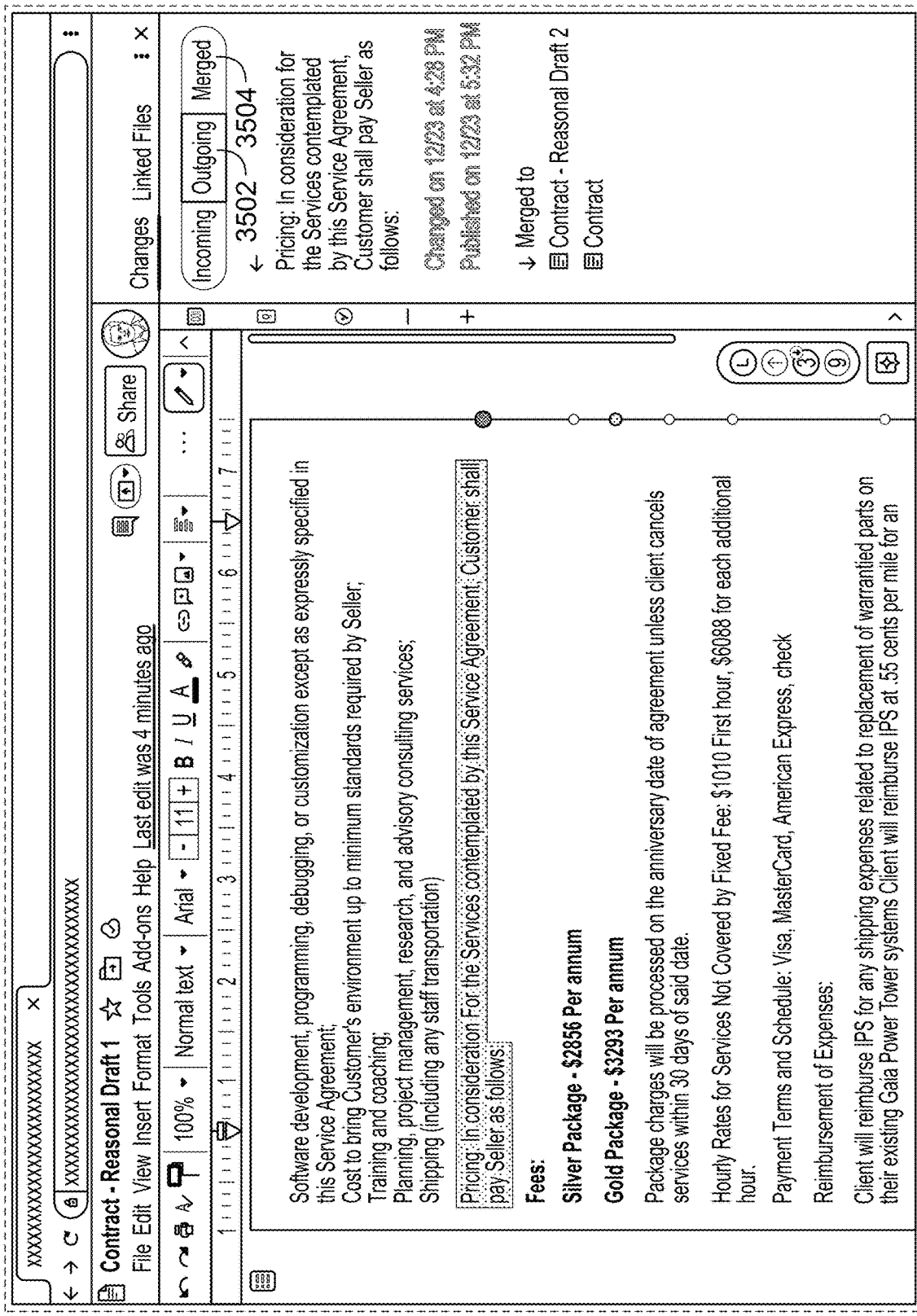
Figure 1:
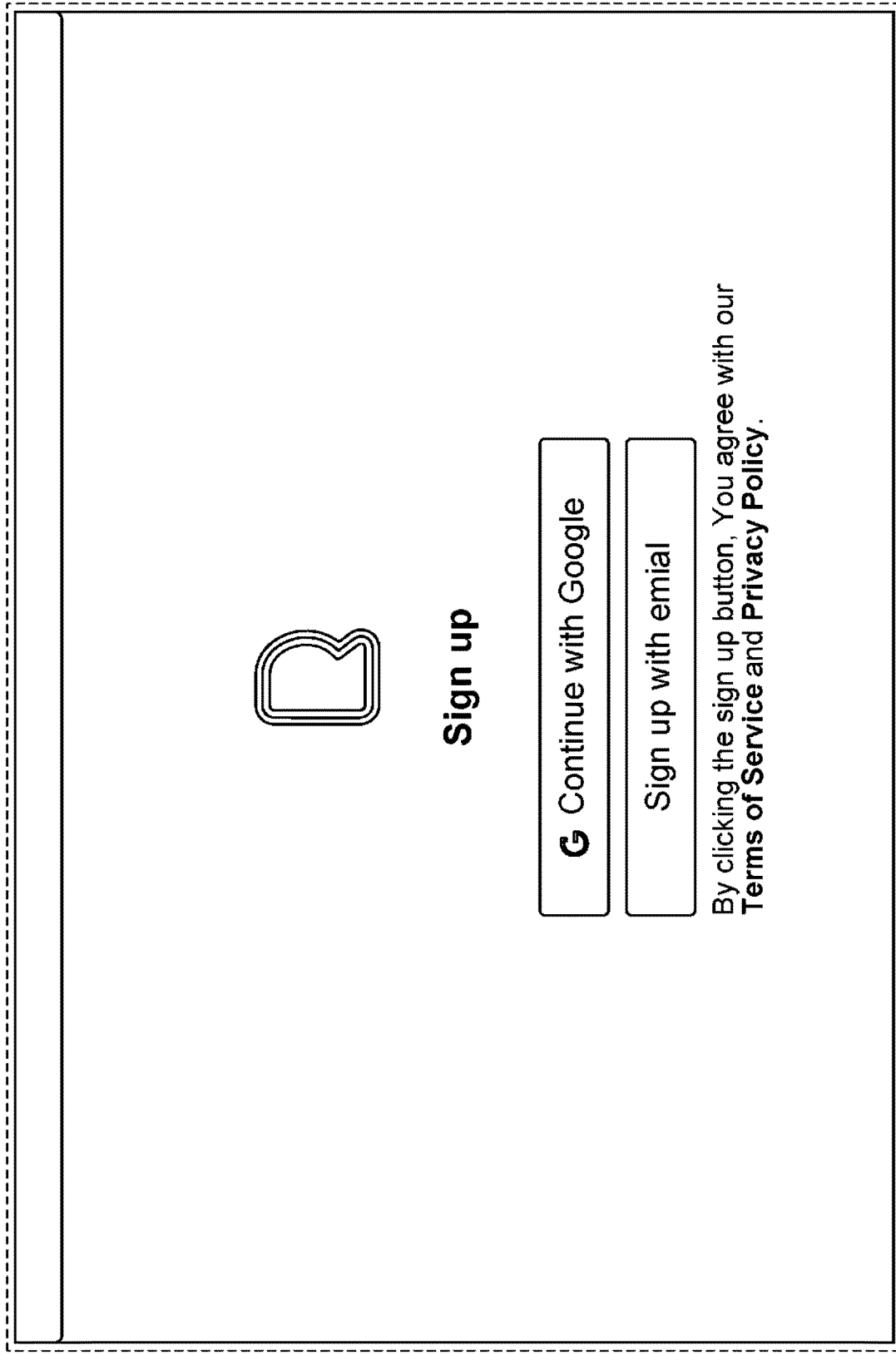
Figure 2:
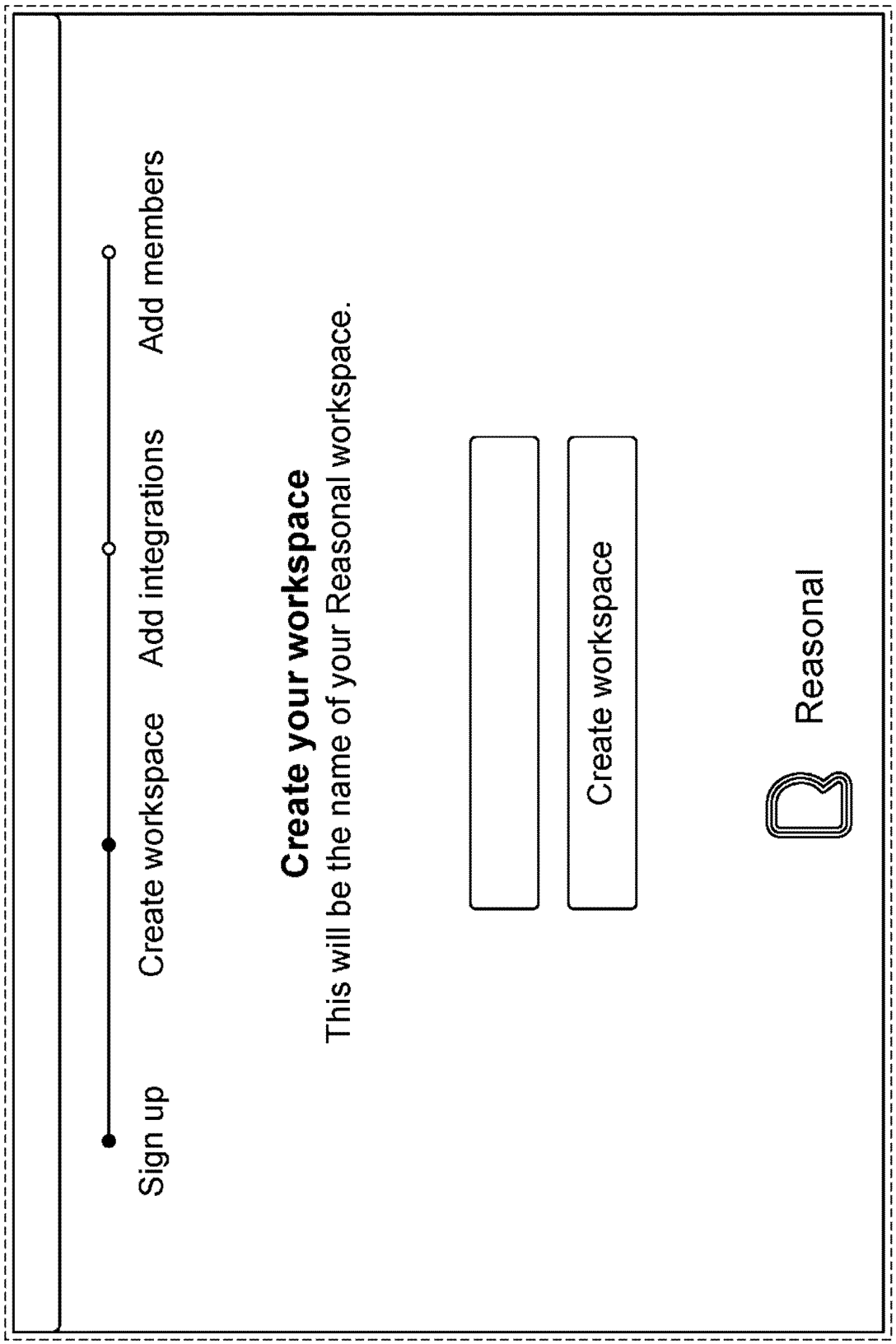
Figure 3:
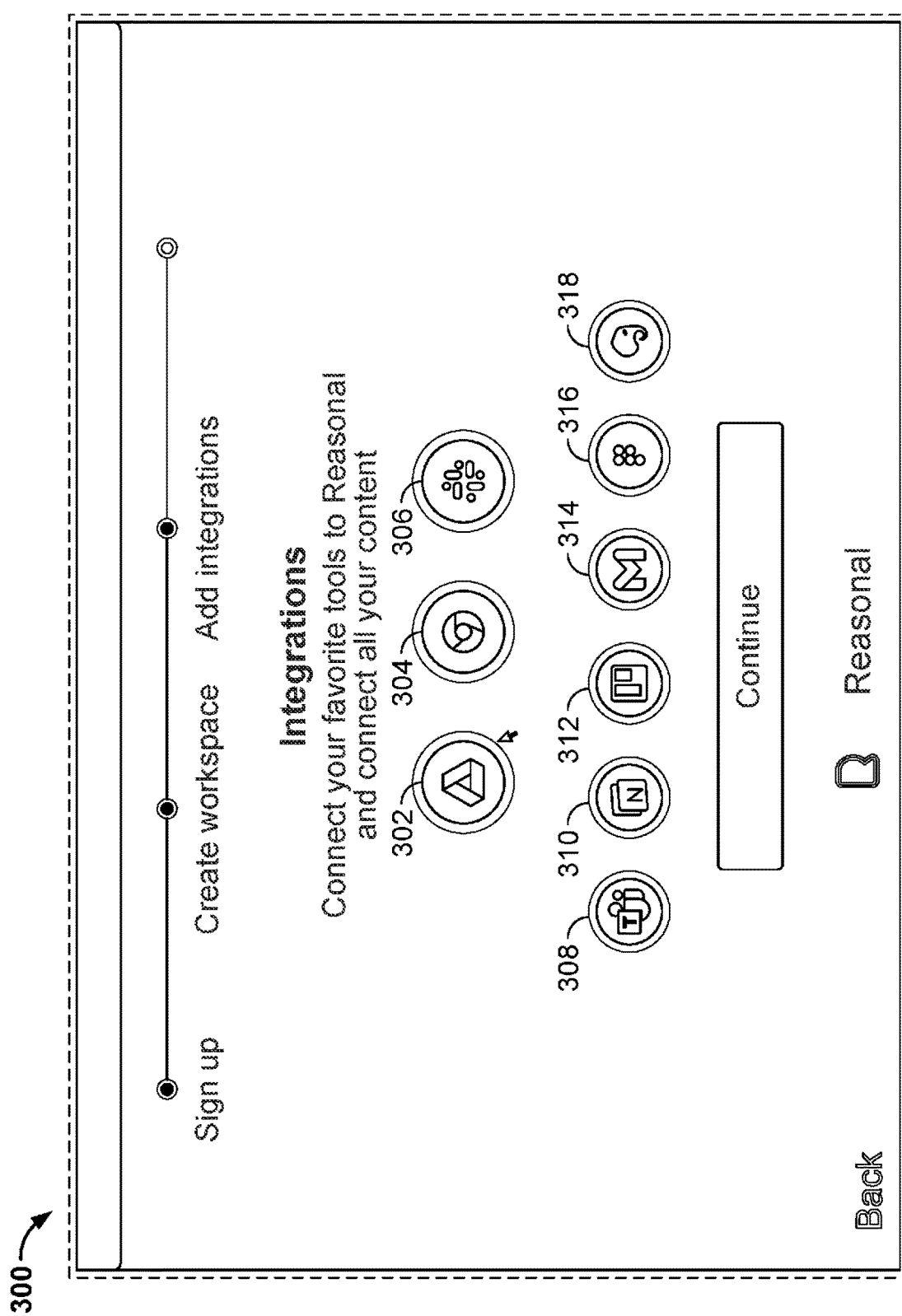

Now suppose that, while Alice is editing the document shown in FIG. 30 (or at a later time, as applicable), Bob makes various changes to a document linked to the document depicted in FIG. 30. When Alice (or another person with access to the document depicted in FIG. 30) accesses the document, region 3202 will indicate that there are relevant changes available to be made to the current document. As shown in FIG. 32, three changes are available. Alice can see details about the three available changes by clicking on region 3202, which will result in her seeing the interface shown in FIG. 33. Region 3302 of FIG. 33 indicates recommendations of changes that can be made to the currently viewed document based on changes made to linked documents. If Alice clicks on link 3304, "Silver Package— $2856 Per Annum" in the current document will be updated to "Silver Package—$3056 Per Annum" based on a change made to another document (Contract Numbers) by David. FIG. 34 illustrates a view of the interface shown in FIG. 33 after link 3304 is clicked. Alice can similarly see which changes of hers have been recommended as changes to linked documents by clicking on region 3502. And, Alice can see which other documents are linked with the current document by clicking on region 3504.

Although the foregoing embodiments have been described in some detail for purposes of clarity of understanding, the invention is not limited to the details provided. There are many alternative ways of implementing the invention. The disclosed embodiments are illustrative and not restrictive.

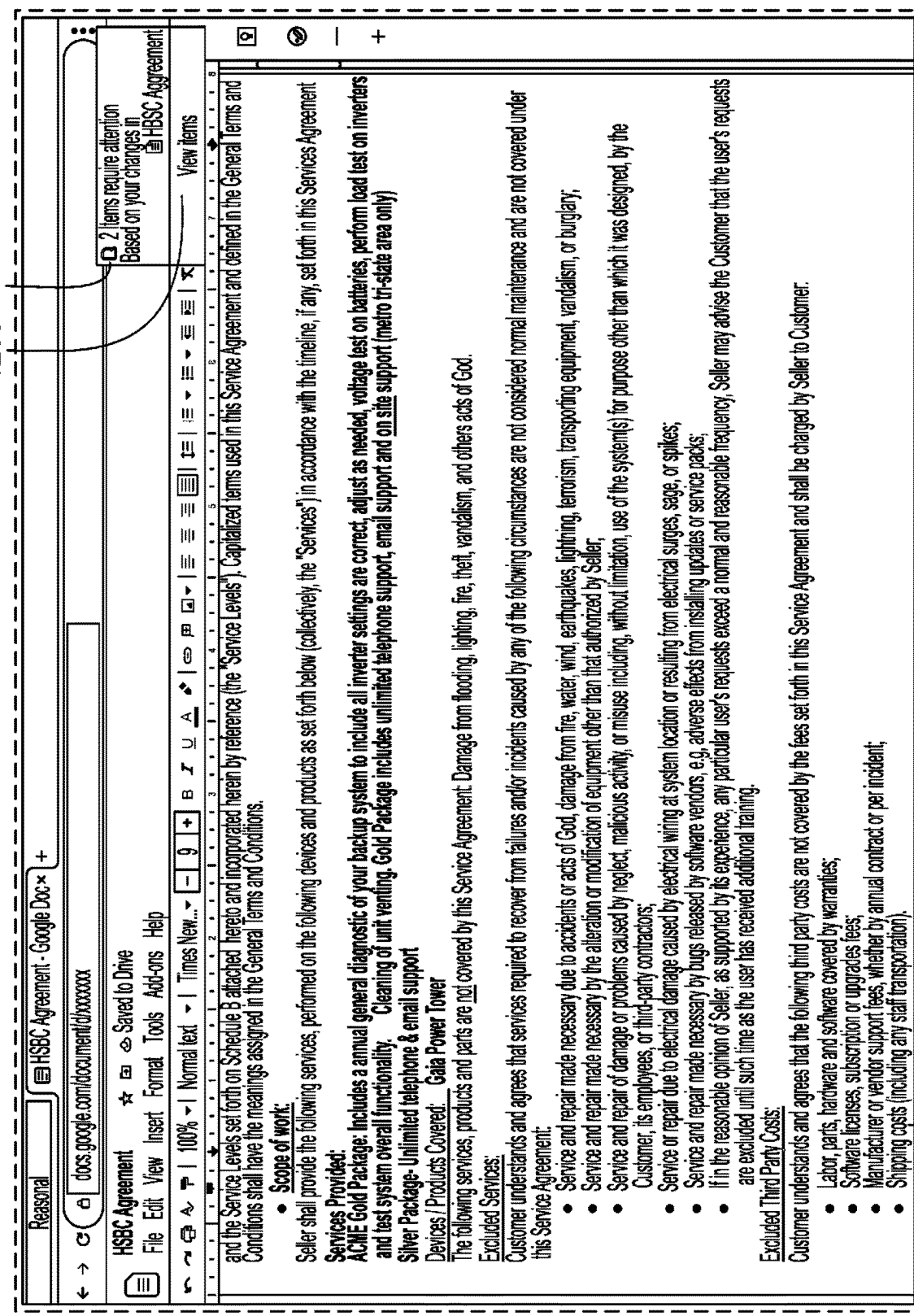

What is claimed is:

1. A system, comprising:
  a processor configured to:
    receive a first tokenized file comprising a first plurality of tokens and a second tokenized file comprising a second plurality of tokens;
    receive an indication that a modification has been made to the first tokenized file;
    determine that a first token included in the first plurality of tokens has an association with a second token included in the second plurality of tokens; and
    based at least in part on the received indication that the modification has been made to the first tokenized file, generate a recommended modification action that should be made to the second tokenized file, wherein the recommended modification action is generated based at least in on a prediction provided, at least in part, by a model built using a past history of correlated events that involve at least some of the first plurality of tokens; and
  a memory coupled to the processor and configured to provide the processor with instructions.

2. The system of claim 1, wherein the first tokenized file and the second tokenized file are received from different services.

3. The system of claim 1, wherein the first tokenized file and the second tokenized file have two different filetypes.

4. The system of claim 1, wherein the processor is further configured to tokenize the first tokenized file.

5. The system of claim 1, wherein the first tokenized file is tokenized at least in part by determining whether a candidate token comprises a landmark.

6. The system of claim 1, wherein the indication that the modification has been made to the first tokenized file is received as a serialized revision history.

7. The system of claim 1, wherein the prediction includes that the second token in the second tokenized file will be modified within a given time period.

8. The system of claim 1, wherein the prediction is based at least in part on a past history of related events occurring to the first token and a third token, wherein the third token is present in a third tokenized file.

9. The system of claim 1, wherein the first token in the first tokenized file is uniquely identifiable.

10. The system of claim 9, wherein a modification event taken with the first token is traceable.

11. The system of claim 10, wherein the modification event comprises an addition of the first token to a file.

12. The system of claim 10, wherein the modification event comprises a removal of the first token from a file.

13. The system of claim 10, wherein the modification event comprises moving the first token from a first position to a second position in a file.

14. The system of claim 1, wherein the processor is further configured to use fixed token association information to improve the model.

15. The system of claim 1, wherein the processor is further configured to use fixed predictive information to improve token association information.

16. The system of claim 1, wherein generating the recommended modification action includes using an application interface of a provider of the second tokenized file to implement the generated recommended modification action.

17. A method, comprising:
receiving a first tokenized file comprising a first plurality of tokens and a second tokenized file comprising a second plurality of tokens;
receiving an indication that a modification has been made to the first tokenized file;
determining that a first token included in the first plurality of tokens has an association with a second token included in the second plurality of tokens; and
based at least in part on the received indication that the modification has been made to the first tokenized file, generating a recommended modification action that should be made to the second tokenized file, wherein the recommended modification action is generated based at least in part on a prediction provided, at least in part, by a model built using a past history of correlated events that involve at least some of the first plurality of tokens.

18. A computer program product embodied in a non-transitory, tangible computer readable medium and comprising computer instructions for:
receiving a first tokenized file comprising a first plurality of tokens and a second tokenized file comprising a second plurality of tokens;
receiving an indication that a modification has been made to the first tokenized file;
determining that a first token included in the first plurality of tokens has an association with a second token included in the second plurality of tokens; and
based at least in part on the received indication that the modification has been made to the first tokenized file, generating a recommended modification action that should be made to the second tokenized file, wherein the recommended modification action is generated based at least in part on a prediction provided, at least in part, by a model built using a past history of correlated events that involve at least some of the first plurality of tokens.

19. The method of claim 17, wherein the first tokenized filed and the second tokenized file are received from different services.

20. The method of claim 17, wherein the first tokenized file and the second tokenized file have two different filetypes.

21. The method of claim 17, further comprising tokenizing the first tokenized file.

22. The method of claim 17, wherein the first tokenized file is tokenized at least in part by determining whether a candidate token comprises a landmark.

23. The method of claim 17, wherein the indication that the modification has been made to the first tokenized file is received as a serialized revision history.

24. The method of claim 17, wherein the prediction includes that the second token in the second tokenized file will be modified within a given time period.

25. The method of claim 17, wherein the prediction is based at least in part on a past history of related events occurring to the first token and a third token, wherein the third token is present in a third tokenized file.

26. The method of claim 17, wherein the first token in the first tokenized file is uniquely identifiable.

27. The method of claim 26, wherein a modification event taken with the first token is traceable.

28. The method of claim 27, wherein the modification event comprises an addition of the first token to a file.

29. The method of claim 27, wherein the modification event comprises a removal of the first token from a file.

30. The method of claim 27, wherein the modification event comprises moving the first token from a first position to a second position in a file.

31. The method of claim 17, wherein the processor is further configured to use fixed token association information to improve the model.

32. The method of claim 17, wherein the processor is further configured to use fixed predictive information to improve token association information.

33. The method of claim 17, wherein generating the recommended modification action includes using an application interface of a provider of the second tokenized file to implement the generated recommended modification action.

* * * * *

UNITED STATES PATENT AND TRADEMARK OFFICE
CERTIFICATE OF CORRECTION

PATENT NO. : 11,468,007 B1
APPLICATION NO. : 17/485230
DATED : October 11, 2022
INVENTOR(S) : Behzad Tabibian It is certified that error appears in the above-identified patent and that said Letters Patent is hereby corrected as shown below:

In the Drawings

Please replace Figs. 1 through 14 with the attached corrected Figs. 1 through 14.

Signed and Sealed this
Fourth Day of April, 2023

Katherine Kelly Vidal
*Director of the United States Patent and Trademark Office*

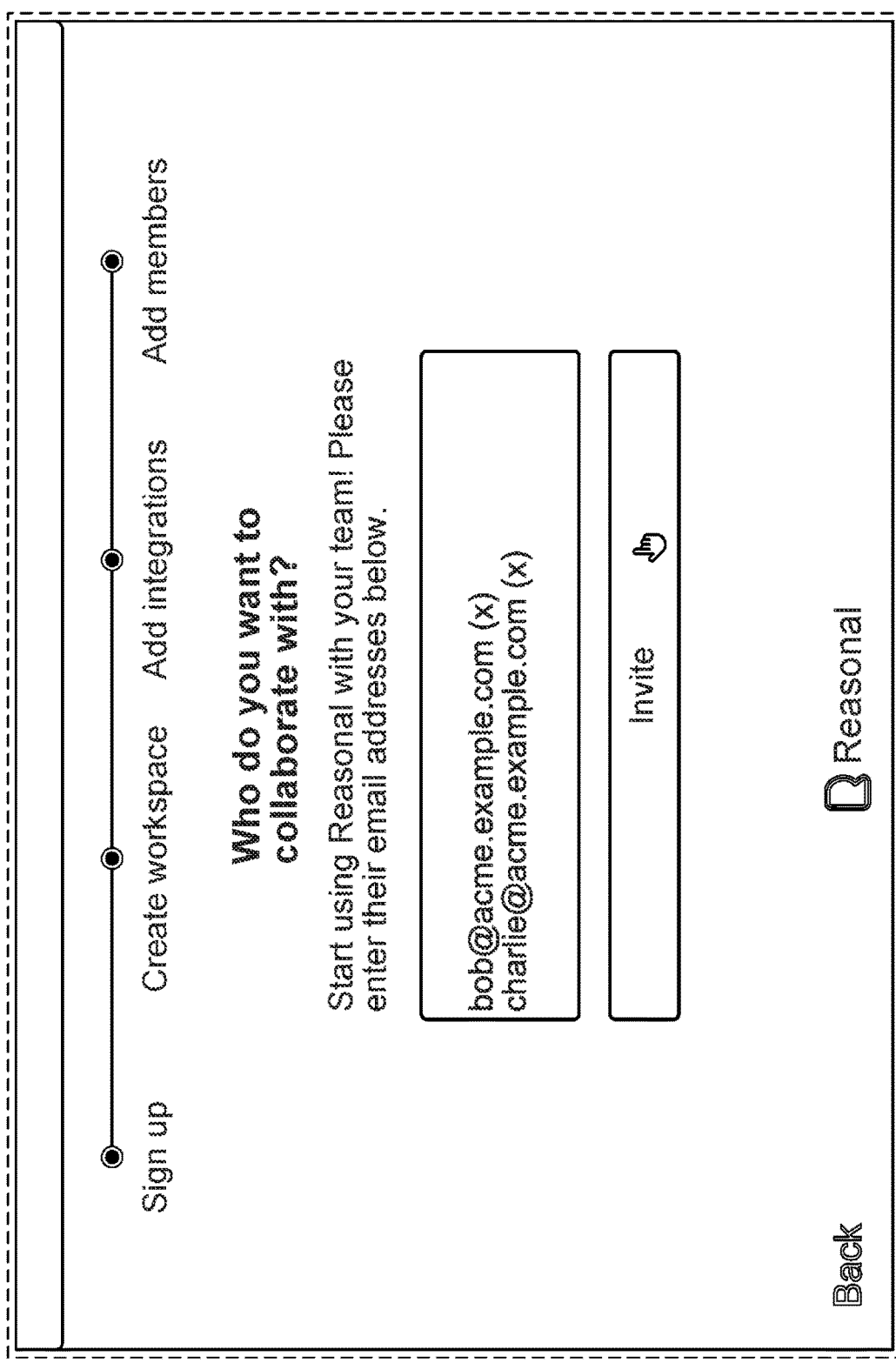

FIG. 9